(12) United States Patent
Hosobuchi

(10) Patent No.: US 7,128,460 B2
(45) Date of Patent: Oct. 31, 2006

(54) ILLUMINATION DEVICE AND ELECTRONIC APPARATUS

(75) Inventor: Hiroyuki Hosobuchi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 132 days.

(21) Appl. No.: 10/500,996

(22) PCT Filed: Dec. 11, 2003

(86) PCT No.: PCT/JP03/15876

§ 371 (c)(1),
(2), (4) Date: Jul. 7, 2004

(87) PCT Pub. No.: WO2004/055559

PCT Pub. Date: Jul. 1, 2004

(65) Prior Publication Data

US 2005/0111239 A1    May 26, 2005

(30) Foreign Application Priority Data

Dec. 16, 2002    (JP)    ............................. 2002-363235
Dec. 18, 2002    (JP)    ............................. 2002-366262

(51) Int. Cl.
| G02F 1/1335 | (2006.01) |
| G04B 19/30 | (2006.01) |
| F21L 4/02 | (2006.01) |
| F21V 8/00 | (2006.01) |

(52) U.S. Cl. .......................... 362/626; 362/26; 362/30; 362/561

(58) Field of Classification Search ................ 362/626, 362/26, 29, 30, 608, 609, 610, 612, 616, 362/617, 620, 555, 559, 561, 560, 601; 368/67, 368/227, 294–295, 83, 84
See application file for complete search history.

(56) References Cited

U.S. PATENT DOCUMENTS

| 2,262,930 | A | * | 11/1941 | Gasper | ........................ | 40/546 |
| 6,431,716 | B1 | * | 8/2002 | Kusakabe | .................... | 362/608 |
| 6,679,613 | B1 | * | 1/2004 | Mabuchi | ..................... | 362/600 |
| 2002/0036905 | A1 | | 3/2002 | Mabuchi | | |

FOREIGN PATENT DOCUMENTS

EP    0 884 525 A    12/1998

* cited by examiner

*Primary Examiner*—Sandra O'Shea
*Assistant Examiner*—Sharon Payne
(74) *Attorney, Agent, or Firm*—Frishauf, Holtz, Goodman & Chick, P.C.

(57) ABSTRACT

The present invention relates to an illumination device. When the light from the, light emitting element is guided to the first illuminating portion of the light guide plate, the light is radiated from the whole upper surface of the first illuminating portion to illuminate the upper surface side of the light guide plate. Also, when the light from the light emitting element is guided to the second illuminating portion of the light guide plate, the light is radiated from the whole lower surface of the second illuminating portion to illuminate the lower surface side of the light guide plate. The upper and lower surface sides of the light guide plate can be excellently illuminated with one light guide plate.

9 Claims, 58 Drawing Sheets

ILLUMINATION DEVICE AND ELECTRONIC APPARATUS

This application is a U.S. National Phase Application under 35 USC 371 of International Application PCT/JP03/15876 filed Dec. 11, 2003.

FIELD OF THE INVENTION

The present invention relates to an illumination device which is useful for applying to various apparatuses such as a wristwatch, a cellular phone and a gauge for automobile, and an electronic apparatus using the illumination device.

BACKGROUND ART

For example, a wristwatch which has an analogue display function for moving a hand above a dial, and a digital function for electrooptically displaying information such as time by a display element such as a liquid crystal display element has been well known. Both of the analogue and the digital functions are illuminated by one illumination device.

The wristwatch of this type is provided with a light guide plate on a lower side of a transparent or translucent dial, which receives light of a light-emitting diode from a side surface to guide the light in a surface direction of the light guide plate. The liquid crystal display element is disposed in the lower side of a notch-for-display corresponding to a display window portion of the dial. When making the light emitting diode emit light in this state, the light is received in the light guide plate and is guided in the surface direction. This guided light is radiated from the upper surface of the light guide plate and the end surface of the notch-for-display of the light guide plate, thereby illuminating the upper side thereof through the dial and also, illuminating the liquid crystal display element from periphery thereof.

DISCLOSURE OF THE INVENTION

However, in the wristwatch of this type, since the light guided in the light guide plate is radiated from the upper surface, although the upper surface side can be equally illuminated, a surface emission cannot be performed at the notch-for-display. Therefore, the light guided in the light guide plate is radiated from the end surface of the notch-for-display to illuminate the liquid crystal display element from periphery. Thus, there is a problem that the whole upper surface of the liquid crystal display element cannot be illuminated excellently.

An object of the present invention is to illuminate the upper and lower surface sides of the light guide plate excellently by performing surface emission with one light guide plate.

Another object of the present invention is to illuminate the whole display member such as the dial or the like approximately equally by performing surface emission from the light guide plate without any limitation for material of the display member.

To achieve the above object, the illumination device according to the present invention, in which light from a light source enters a light guide plate from a side surface thereof and is guided in a surface direction in the light guide plate to perform a surface emission from the light guide plate for illuminating a display member: wherein the light guide plate comprises a first illuminating portion for guiding light from the light source in the surface direction and radiating the light toward an upper surface side of the light guide plate, and a second illuminating portion for guiding light from the light source in the surface direction and radiating the light toward a lower surface side of the light guide plate; and the display member is disposed in each of the upper surface side and the lower surface side of the light guide plate.

The illumination device according to another invention, in which light from a light source enters a light guide plate from a side surface thereof and is guided in a surface direction in the light guide plate to perform a surface emission from the light guide plate for illuminating a display member: wherein the light guide plate has a light transmission property in a thickness direction thereof, a plurality of line-shaped prisms having reflection surfaces for reflecting light guided in the light guide plate in a surface direction toward a lower surface side of the light guide plate are formed on a whole upper surface of the light guide plate, and the display member is disposed at least in a lower surface side of the light guide plate.

BEST MODE FOR CARRYING OUT THE INVENTION

[First Embodiment]

The first embodiment in which the present invention is applied to a wristwatch will be explained below referring to FIGS. 1–6.

Figure 1:
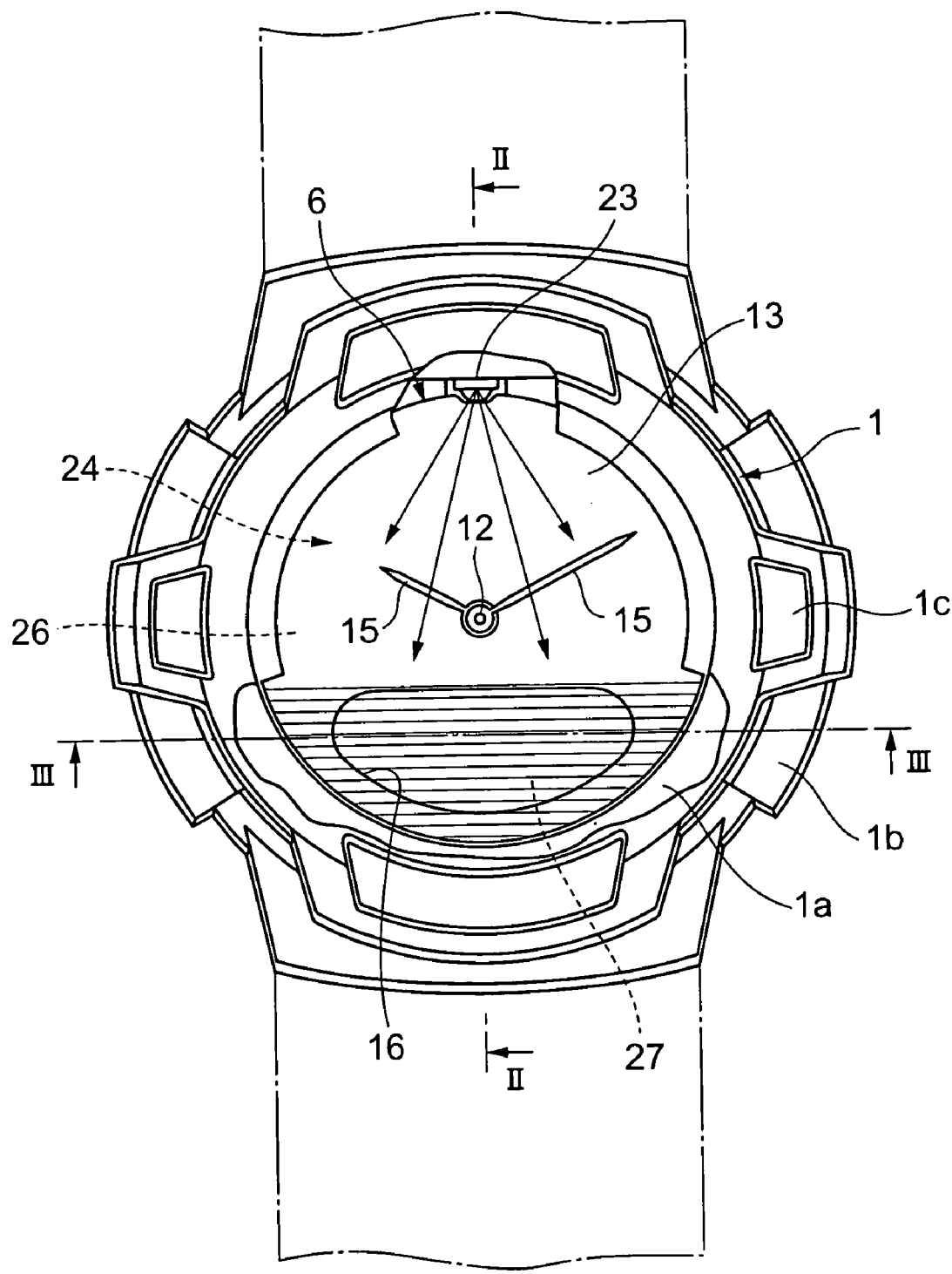
FIG. 1 is a front view showing the first embodiment in which the present invention is applied to a wristwatch.
Figure 2:
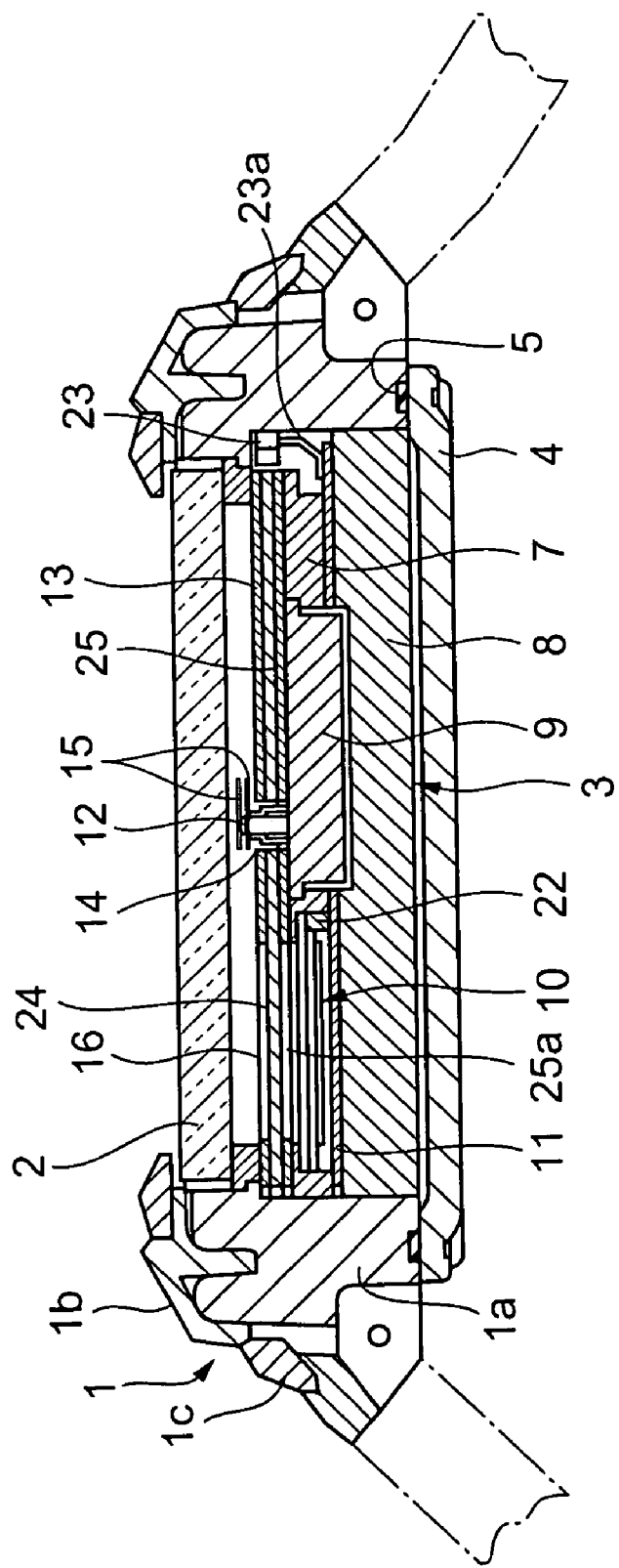
FIG. 2 is an expanded sectional view taken along the line II—II in FIG. 1.
Figure 3:
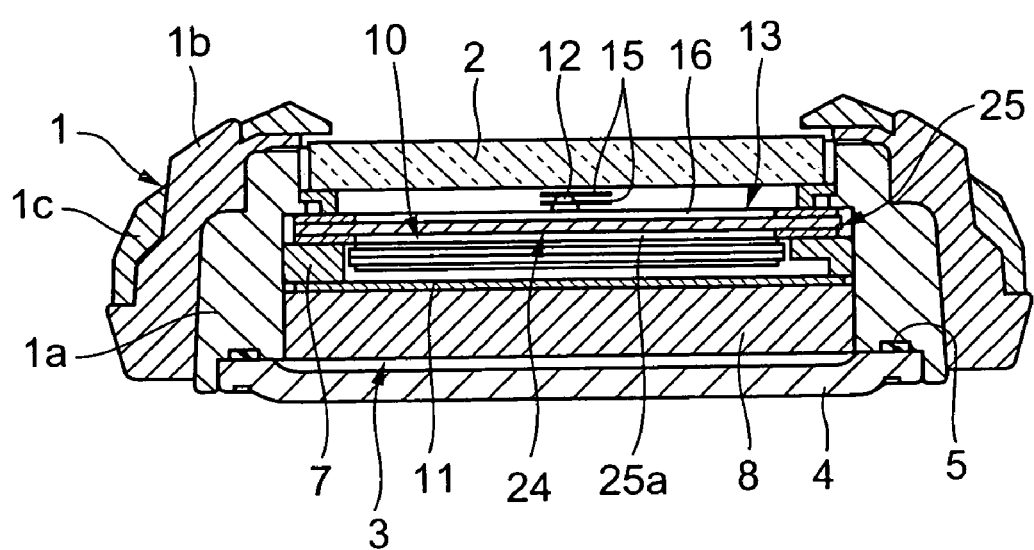
FIG. 3 is an expanded sectional view taken along the line III—III in FIG. 1.

FIG. 1 is a front view of the wristwatch in the present invention, FIG. 2 is an expanded sectional view taken along the line II—II in FIG. 1, and FIG. 3 is an expanded sectional view taken along the line III—III in FIG. 1. As shown in FIGS. 1–3, the wristwatch comprises a wristwatch case 1. The wristwatch case 1 is configured to be provided with first and second bezels 1b, 1c made of synthetic resin on the outer peripheral surface of a case body 1a made of metal. A watch glass 2 is attached to the upper portion of the wristwatch case 1, and a watch module 3 is contained inside the wristwatch case 1. A back lid 4 is attached to the lower portion of the wristwatch case 1 through a waterproof ring 5.

The watch module 3 is configured to have both of an analogue function and a digital function as well as an illumination device 6. That is, as shown in FIG. 2, the watch module 3 comprises an upper housing 7 and a lower housing 8. The upper housing 7 is provided with an analogue movement 9 and a liquid crystal display element 10, and a circuit board 11 is provided between the upper housing 7 and the lower housing 8. Various types of electronic components (not shown) which form an electronic circuit for electrically driving the analogue movement 9, the liquid crystal display element 10 and the illumination device 6 are mounted on the circuit board 11.

In the analogue movement 9, a hand shaft 12 thereof protrudes upward through each through hole 14 of a light guide plate 24 of the illumination device 6 to be hereinafter described and of a dial 13, which are disposed in the upper side of the upper housing 7, hands 15 such as a minute hand, a second hand or the like are attached to the upper end of the protruded hand shaft 12, and these hands 15 move above the dial 13. The dial 13 is formed of transparent or translucent material having a light transmission property. As shown in FIGS. 2–5, an opening portion 16 is provided at predetermined position corresponding to the liquid crystal display element 10. A hand display portion comprises the dial 13 and the hands 15, which corresponds to the first display member.

Figure 6:
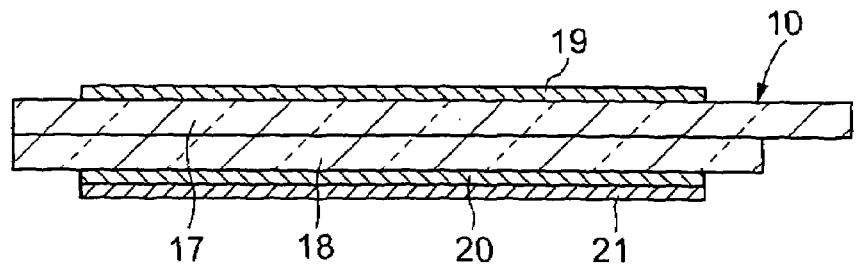
FIG. 6 is an expanded sectional view showing a liquid crystal display element of FIGS. 2 and 3.

As shown in FIG. 6, the liquid crystal display element 10 is of a reflection type, which comprises an enclosed liquid crystal (not shown) sandwiched between a pair of transparent upper and lower electrode substrates 17, 18, polarizers 19, 20 are provided on the upper surface of the upper electrode substrate 17 and the lower surface of the lower electrode substrate 18, respectively, and a reflection plate 21 is provided on the lower surface of the polarizer 20. As shown in FIG. 2, the end of the upper electrode substrate 17 is supported in a state of being electrically connected to the circuit board 11 by an interconnector 22. In this state, voltage is selectively applied between the pair of upper and lower electrode substrates 17, 18 to electrooptically display information such as time or the like. The liquid crystal display element 10 corresponds to the second display member.

Figure 4:
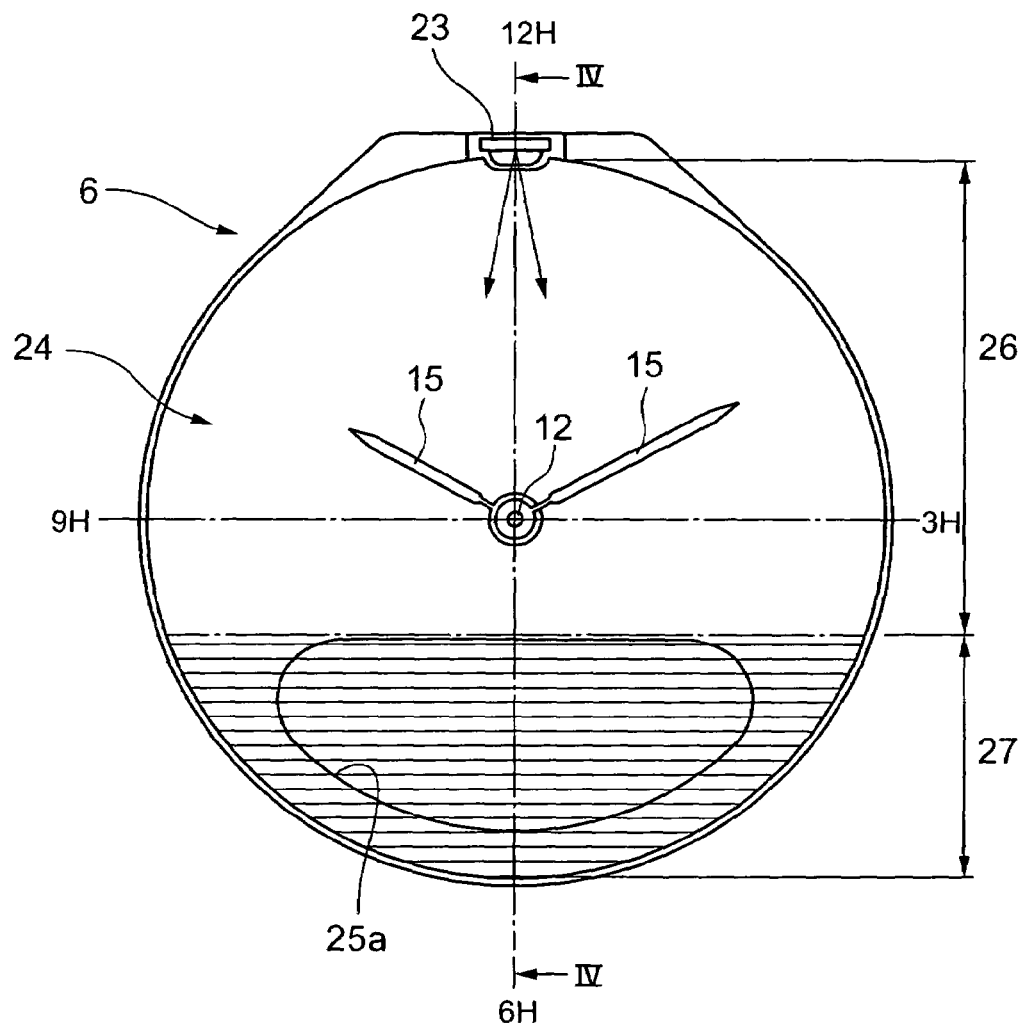
FIG. 4 is a front view showing an expanded watch module in FIGS. 2 and 3.
Figure 5:
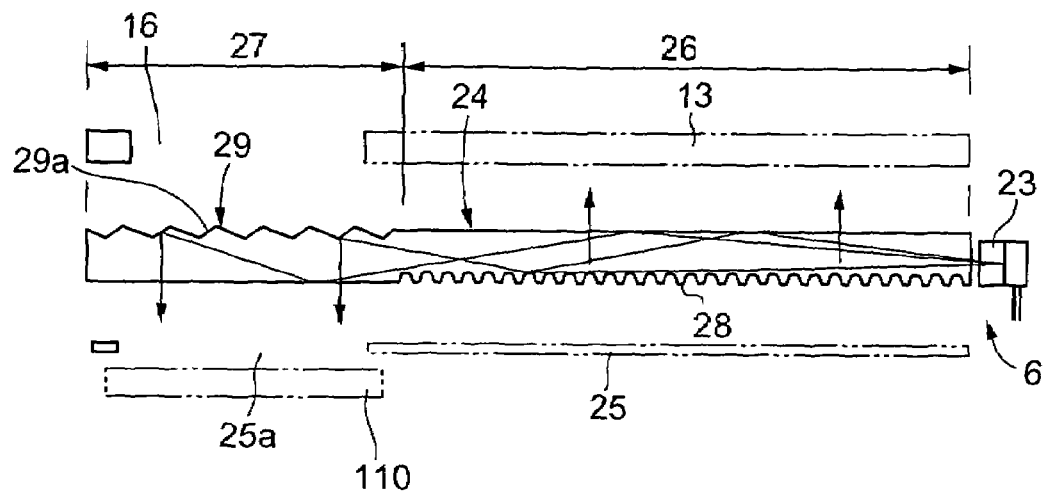
FIG. 5 is an expanded sectional view of a light guide plate taken along the line IV—IV in FIG. 4.

As shown in FIGS. 4 and 5, the illumination device 6 comprises a light emitting element 23 as a light source, a light guide plate 24 for receiving light emitted from the light emitting element 23 from the side surface to guide the light in the surface direction of the light guide plate 24, and a reflection plate 25 disposed on the lower surface of the light guide plate 24. The light emitting element 23 comprises a light emitting diode (LED) or the like which emits light in the visible light range and is disposed corresponding to a portion located in the 12 o'clock side on the side surface of the light guide plate 24. The lead wire 23a of the light emitting element 23 is electrically connected to the circuit board 11 as shown in FIGS. 1 and 2. The light guide plate 24 formed of a transparent material makes the light pass through in a thickness direction thereof or in up-and-down directions and also, receives light from the light emitting element 23 from the side surface to guide the light in the surface direction. As shown in FIGS. 4 and 5, the guide plate 24 comprises a first illuminating portion 26 in which light from the light emitting element 23 is radiated toward the upper surface side of the light guide plate 24 and a second illuminating portion 27 in which light from the light emitting element 23 is radiated toward the lower surface side of the light guide plate 24, and is disposed between the reflection plate 25 on the upper housing 7 and the dial 13.

As shown in FIG. 5, in the first illuminating portion 26 of the light guide plate 24, a fine concavo-convex portion 28 is formed on the lower surface of the light guide plate 24. When light emitted from the light emitting element 23 enters the light guide plate 24 and is guided in the light guide plate 24, the light is diffusely reflected from the concavo-convex portion 28 and is radiated from the upper surface of the light guide plate 24 to perform a surface emission from the upper surface side of the light guide plate 24. The second illuminating portion 27 is configured to arrange a plurality of the line-shaped prisms 29 having reflection surfaces 29a for reflecting light guided from the light guide plate 24 toward the lower surface side of the light guide plate 24.

Each prism 29 of the second illuminating portion 27 is provided to be perpendicular to the line connecting the light emitting element 23 and a portion of the side surface of the light guide plate 24 which faces the light emitting element 23, that is, the line connecting 12 o'clock and 6 o'clock. The reflection surfaces 29a of the prisms 29 are provided to face the light emitting element 23 side or 12 o'clock side. Therefore, the light guided from the 12 o'clock side to the second illuminating portion 27 is reflected toward the lower surface side of the light guide plate 24, and is radiated from the lower surface of the light guide plate 24 to perform the surface emission from the lower surface side of the light guide plate 24.

The reflection plate 25 is provided with an opening portion 25a located at a position which corresponds to the liquid crystal display element 10 corresponding to the opening portion 16 of the dial 13. The reflection plate 25 is configured to reflect light radiated from the lower surface side of the light guide plate 24 toward the upper surface side excluding a portion corresponding to the opening portion 25a.

According to the wristwatch, the external light enters the wristwatch case 1 through the watch glass 2 in a bright place, and this external light is radiated to the hands 15 and the dial 13. Thus, time can be recognized by the hands 15 and the dial 13. The dial 13 is transparent or translucent and has a light transmission property, so that the external light passes through the dial 13 and the opening portion 16 thereof to be radiated to the light guide plate 24 of the illumination device 6 from the upper side, and this radiated external light passes through the light guide plate 24 from the upper surface side to the lower surface side. In the external light which passes through the light guide plate 24, the external light radiated to the reflection plate 25 disposed on the lower surface of the light guide plate 24 is reflected from the reflection plate 25. This reflected light passes through the light guide plate 24 and the dial 13 from the lower surface side to the upper surface side again, thereby illuminating the dial 13 and the hands 15 above the dial 13.

The external light which passes through the light guide plate 24 from the lower surface side to the upper surface side and is radiated to the opening portion 25a of the reflection plate 25 passes through the opening portion 25a directly to be radiated to the liquid crystal display element 10, so that the liquid crystal display element 10 can be illuminated. Therefore, information such as time or the like displayed on the liquid crystal display element 10 can be recognized. That is, in the liquid crystal display element 10, the external light passes through the upper polarizer 19, the upper and lower electrode substrates 17, 18 and the lower polarizer 20, and is reflected from the reflection plate 21. This reflected light passes through a light path which is opposite to the above, and is radiated to the light guide plate 24 from the lower surface side of the light guide plate 24 through the opening portion 25a in the reflection plate 25 again. This radiated light passes through the light guide plate 24 and the dial 13 from the lower surface side to the upper surface side to be radiated upward. Thus, information such as time or the like displayed on the liquid crystal display element 10 through the watch glass 2 can be recognized from outside of the wristwatch case 1.

When making the light emitting element 23 emit light in a dark place, the light from the light emitting element 23 enters the light guide plate 24 from the side surface, and this entered light is guided in the surface direction in the light guide plate 24. When this light is guided to the first illuminating portion 26 of the light guide plate 24, this guided light is diffusely reflected by the concavo-convex portion 28, and is radiated to the upper surface side of the light guide plate 24. Also, the light leaked from the lower surface side of the light guide plate 24 is reflected upward by the reflection plate 25. Thus, the surface emission is performed from the whole first illuminating portion 26 of the light guide plate 24, and the dial 13 can be illuminated from the lower surface side by the surface emission. Moreover, the hands 15 which move above the dial 13 can also be illuminated because the light by the surface emission passes through the dial 13. Therefore, time can be recognized by the dial 13 and the hands 15 even in the dark place.

When the light from the light emitting element 23 is guided to the second illuminating portion 27 of the light guide plate 24 in the dark place, this guided light is reflected toward the lower surface side of the light guide plate 24 from the reflection surfaces 29a of the each prism 29 of the second illuminating portion 27. Thus, the surface emission is performed from the whole second illuminating portion 27 of the light guide plate 24, and this surface-emitted light is radiated to the whole upper surface of the liquid crystal display element 10 at the lower side of the second illuminating portion 27. Therefore, the whole liquid crystal display element 10 is illuminated approximately equally. Accordingly, information such as time or the like displayed on the liquid crystal display element 10 can be recognized even in the dark place.

According to the wristwatch, when making the light emitting element 23 emit light in the dark place, the light enters the light guide plate 24 from the side surface and is guided in the surface direction in the light guide plate 24, and the light guided to the first illuminating portion 26 of the light guide plate 24 is radiated toward the upper surface side of the light guide plate 24 of the first illuminating portion 26. Thus, the surface emission is performed from the first illuminating portion 26 to illuminate the upper surface side of the light guide plate 24. The light guided to the second illuminating portion 27 of the light guide plate 24 is radiated toward the lower surface side of the light guide plate 24 of the second illuminating portion 27. Thus, the surface emission is performed from the second illuminating portion 27 to illuminate the lower surface side of the light guide plate 24. Therefore, both of the upper and lower surface sides of the light guide plate 24 can be illuminated with one light guide plate 24. Accordingly, the dial 13 and the hands 15 denoting the first display member and the liquid crystal display element 10 denoting the second display member disposed in each of the upper and lower surface sides of the light guide plate 24 can be excellently illuminated, and time can be recognized in both of the bright and the dark places.

In the wristwatch, since the upper and lower surface sides of the light guide plate 24 can be illuminated with one light guide plate 24, there is no need to use a flat backlight device such as an EL element (electroluminescence element) on the lower surface of the liquid crystal display element 10 even when disposing the liquid crystal display element 10 on the lower side of the light guide plate 24. Thus, a thin shape and space-saving watch module 3 as a whole can be achieved, so that the wristwatch as a whole can be a small size and a thin shape. Since the liquid crystal display element 10 can be disposed adjacent to the second illuminating portion 27 of the light guide plate 24, it can be suppressed that the outline of information displayed on the liquid crystal display element 10 by the refraction of light at the light guide plate 24 blurs. Therefore, information displayed on the liquid crystal display element 10 can be clearly recognized.

Figure 7:
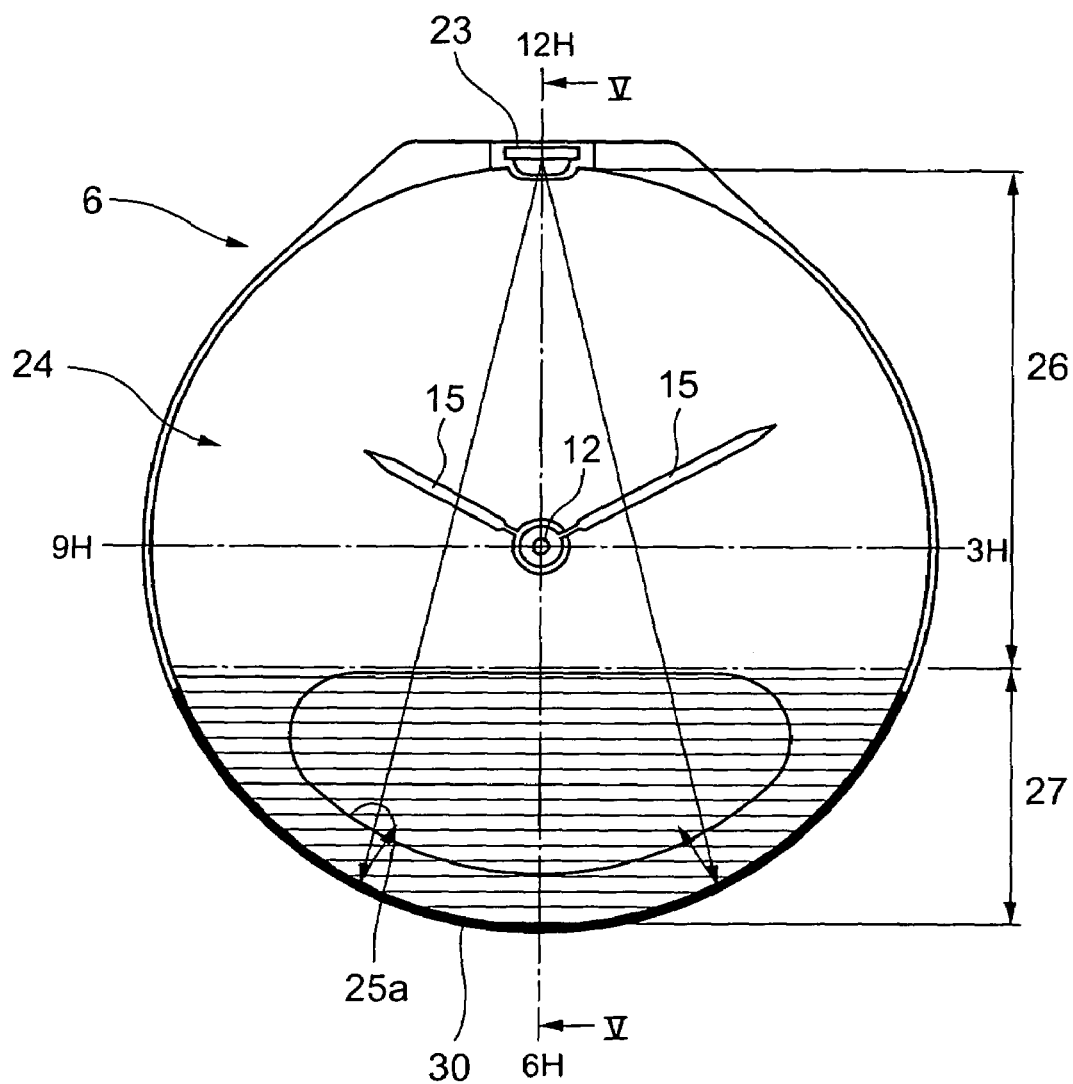
FIG. 7 is an expanded front view of a watch module showing a first modification of the first embodiment.
Figure 8:
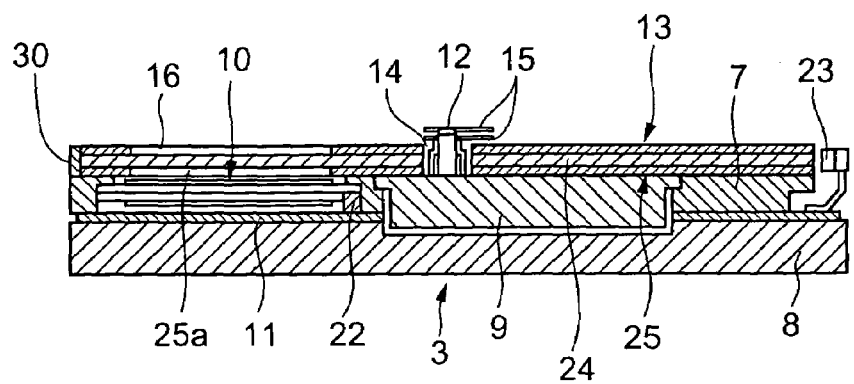
FIG. 8 is a sectional view taken along the line V—V in FIG. 7.
Figure 9:
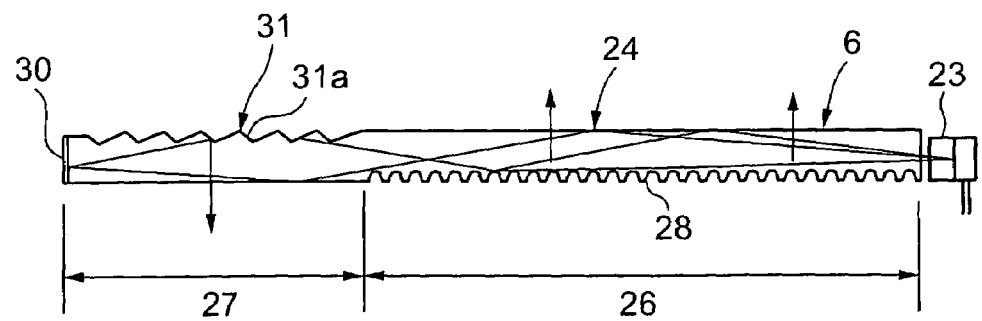
FIG. 9 is a sectional view of an expanded light guide plate of FIG. 8.

In the above described first embodiment, it is described about the case where the light emitted from the light emitting element 23 runs straight in the light guide plate 24, and is reflected toward the lower surface side of the light guide plate 24 by the prisms 29 of the second illuminating portion 27. However, it is not limited thereto. For example, the second illuminating portion 27 of the light guide plate 24 may be configured as in the first modification shown in FIGS. 7–9. That is, the second illuminating portion 27 in the first modification is provided with line-shaped prisms 31 on the upper surface of the light guide plate 24, which is approximately perpendicular to the line connecting the light emitting element 23 and a portion of the side surface of the light guide plate 24 which faces the light emitting element 23, that is, the line connecting 12 o'clock and 6 o'clock. Each reflection surface 31a of the prisms 31 is provided to face the opposite side of the light emitting element 23 located in the 12 o'clock side, that is, the 6 o'clock side. In this case, a side surface reflection portion 30 is provided at a portion of the 6 o'clock side on the outer periphery of the light guide plate 24 which faces the light emitting element 23 of 12 o'clock side, for example, at a portion on the side surface from 4 o'clock to 8 o'clock through 6 o'clock.

In this configuration, even when the light which runs straight from the light emitting element 23 continues to run straight and directly reaches the end surface of the light guide plate 24, the light is reflected from the side surface reflection portion 30 provided on the side surface of the light guide plate 24 and enters the second illuminating portion 27 again. This entered light is reflected from each reflection surface 31a of the prisms 31 toward the lower surface side of the light guide plate 24, so that the lower surface side of the light guide plate 24 can be illuminated. Therefore, as with the first embodiment, the liquid crystal display element 10 can be illuminated by the light from the light emitting element 23, and the leakage of the light from the side surface of the light guide plate 24 can be prevented. Accordingly, the light from the light emitting element 23 can be efficiently utilized to brightly illuminate the liquid crystal display element 10.

Figure 10:
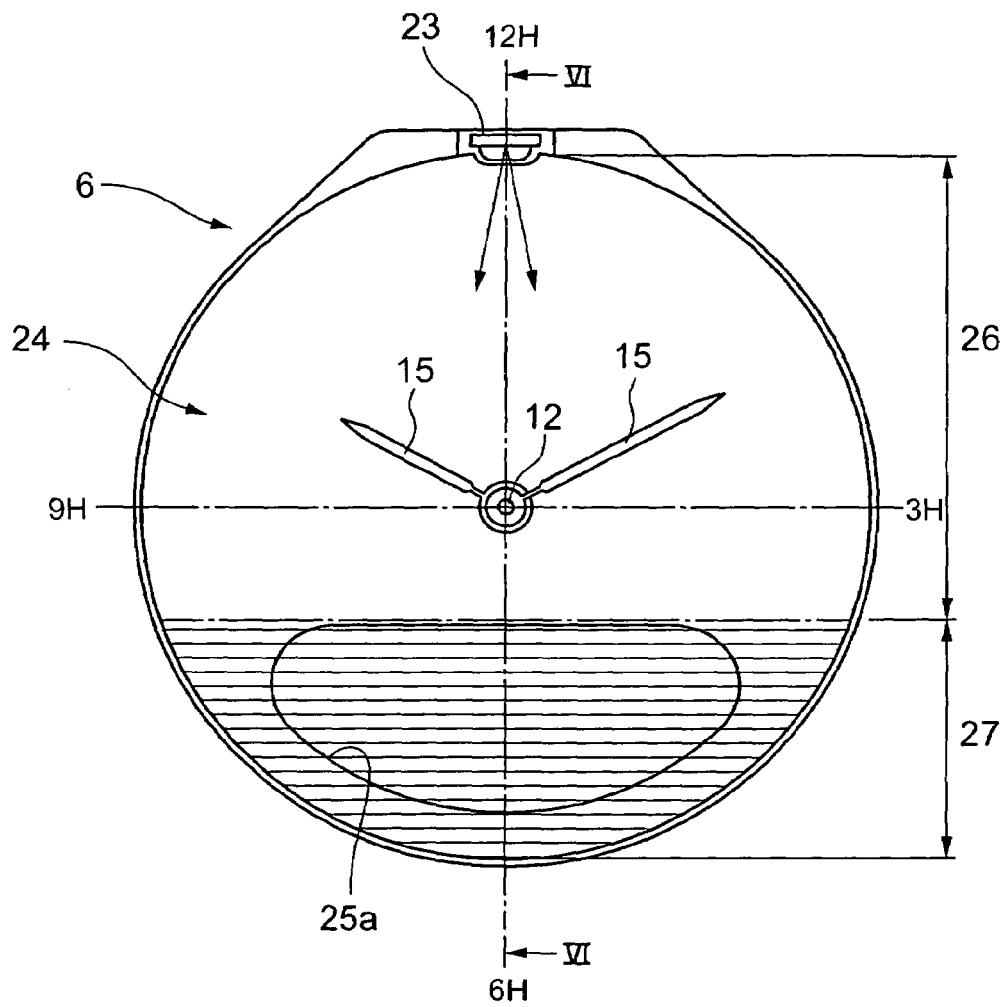
FIG. 10 is an expanded front view of a watch module showing a second modification of the first embodiment.
Figure 11:
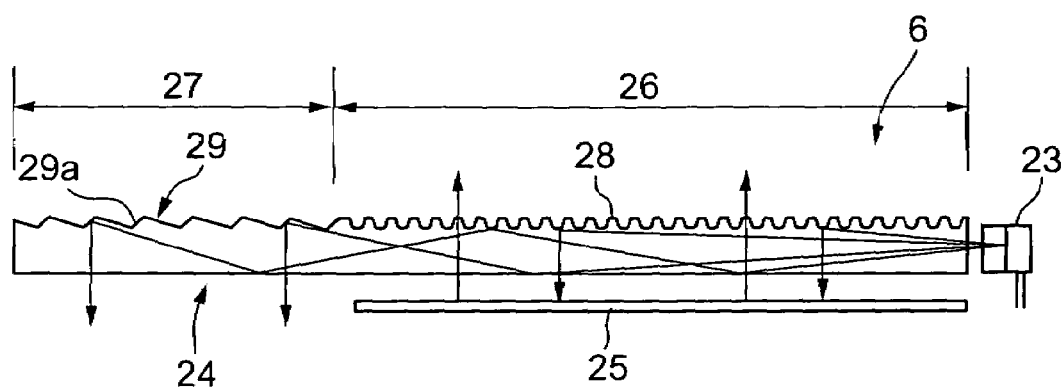
FIG. 11 is an expanded sectional view of a light guide plate taken along the line VI—VI in FIG. 10.

In the above described first embodiment and first modification, the first illuminating portion 26 of the light guide plate 24 comprises the fine concavo-convex portion 28 formed on the lower surface of the light guide plate 24, however, it is not limited thereto. For example, as in the second modification shown in FIGS. 10 and 11, the fine concavo-convex portion 28 may be formed on the upper surface of the light guide plate 24. In this configuration, when the light emitted from the light emitting element 23 is guided to the first illuminating portion 26 of the light guide plate 24, the light is diffusely reflected by the concavo-convex portion 28, and the diffusely reflected light is radiated to the upper and lower surface sides of the light guide plate 24. However, the light radiated to the lower surface side is reflected from the reflection plate 25 disposed on the lower surface of the light guide plate 24. Thus, the upper surface side of the light guide plate 24 can be excellently illuminated as with the first embodiment.

Figure 12:
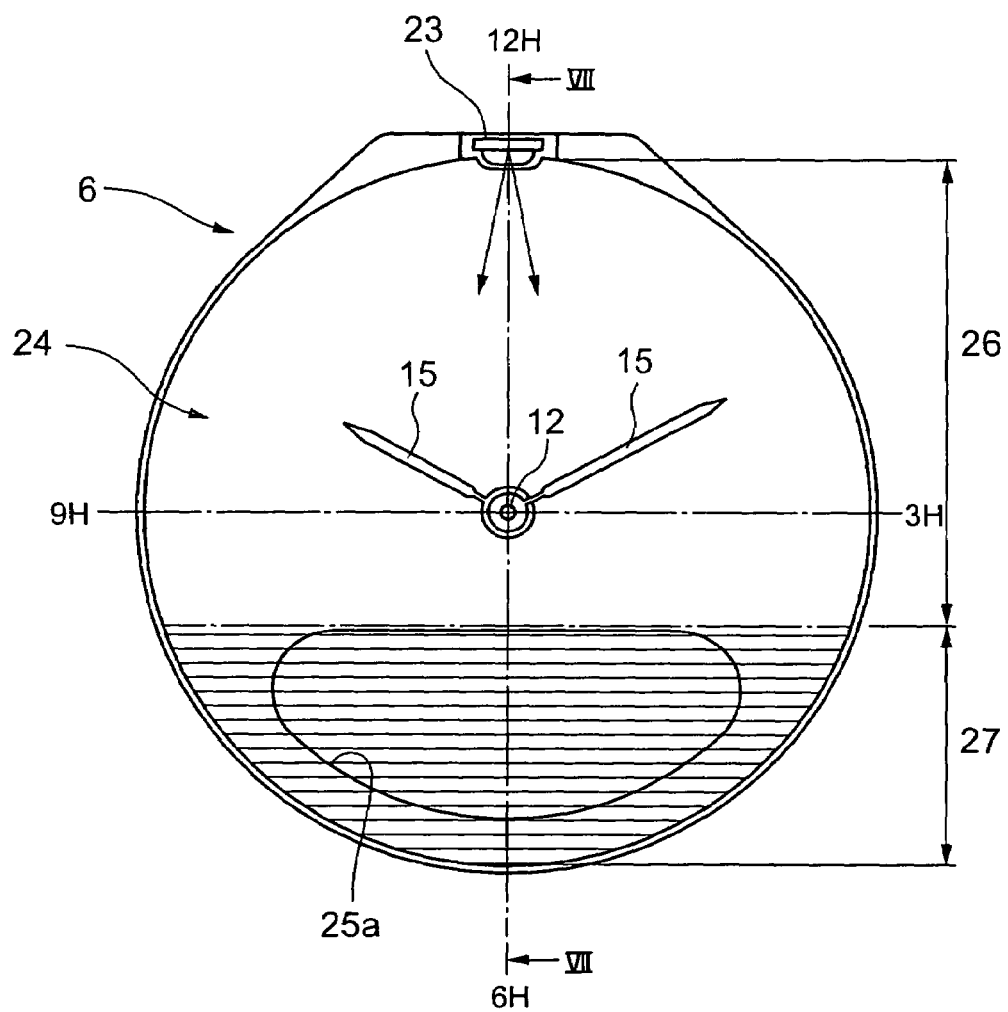
FIG. 12 is an expanded front view of a watch module showing a third modification of the first embodiment.
Figure 13:
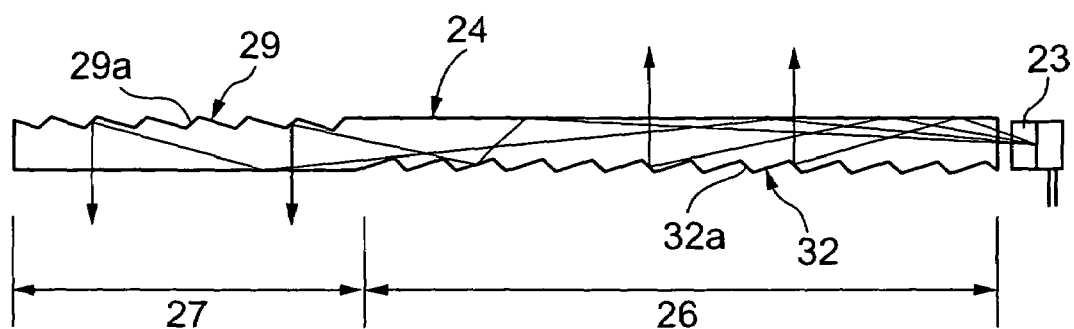
FIG. 13 is an expanded sectional view of a light guide plate taken along the line VII—VII in FIG. 12.

In the first embodiment and the first and second modifications, it is described about the case where the first illuminating portion 26 of the light guide plate 24 comprises the concavo-convex portion 28 formed on the lower surface or the upper surface of the light guide plate 24. However, it is not limited thereto. For example, the first illuminating portion 26 may be configured as in the third modification shown in FIGS. 12 and 13. That is, the first illuminating portion 26 in the third modification comprises a plurality of the line-shaped prism 32 arranged on the lower surface of the light guide plate 24. The prisms 32 are provided to be approximately perpendicular to the line connecting the light emitting element 23 and a portion of the side surface of the light guide plate 24 which faces the light emitting element 23, that is, the line connecting 12 o'clock and 6 o'clock.

Reflection surfaces 32a of the prisms 32 are provided to face the light emitting element 23 side, that is, the 12 o'clock side. Accordingly, the light entered the light guide plate 24 from the 12 o'clock side is reflected toward the upper surface side of the light guide plate 24.

In this configuration, when the light emitted from the light emitting element 23 is guided to the first illuminating portion 26 of the light guide plate 24, the light is reflected from the reflection surfaces 32a of the prisms 32 of the first illuminating portion 26 toward the upper surface side of the light guide plate 24 and the surface emission is performed from the first illuminating portion 26. The surface-emitted light is radiated from the upper surface of the light guide plate 24, so that the upper surface side of the light guide plate 24 can be excellently illuminated as with the first embodiment.

[Second Embodiment]

The second embodiment in which the present invention is applied to a wristwatch will be explained below referring to FIGS. 14–18. The constituent elements similar to those of FIGS. 1–6 in the first embodiment are designated by the same reference numerals for explanation.

Figure 14:
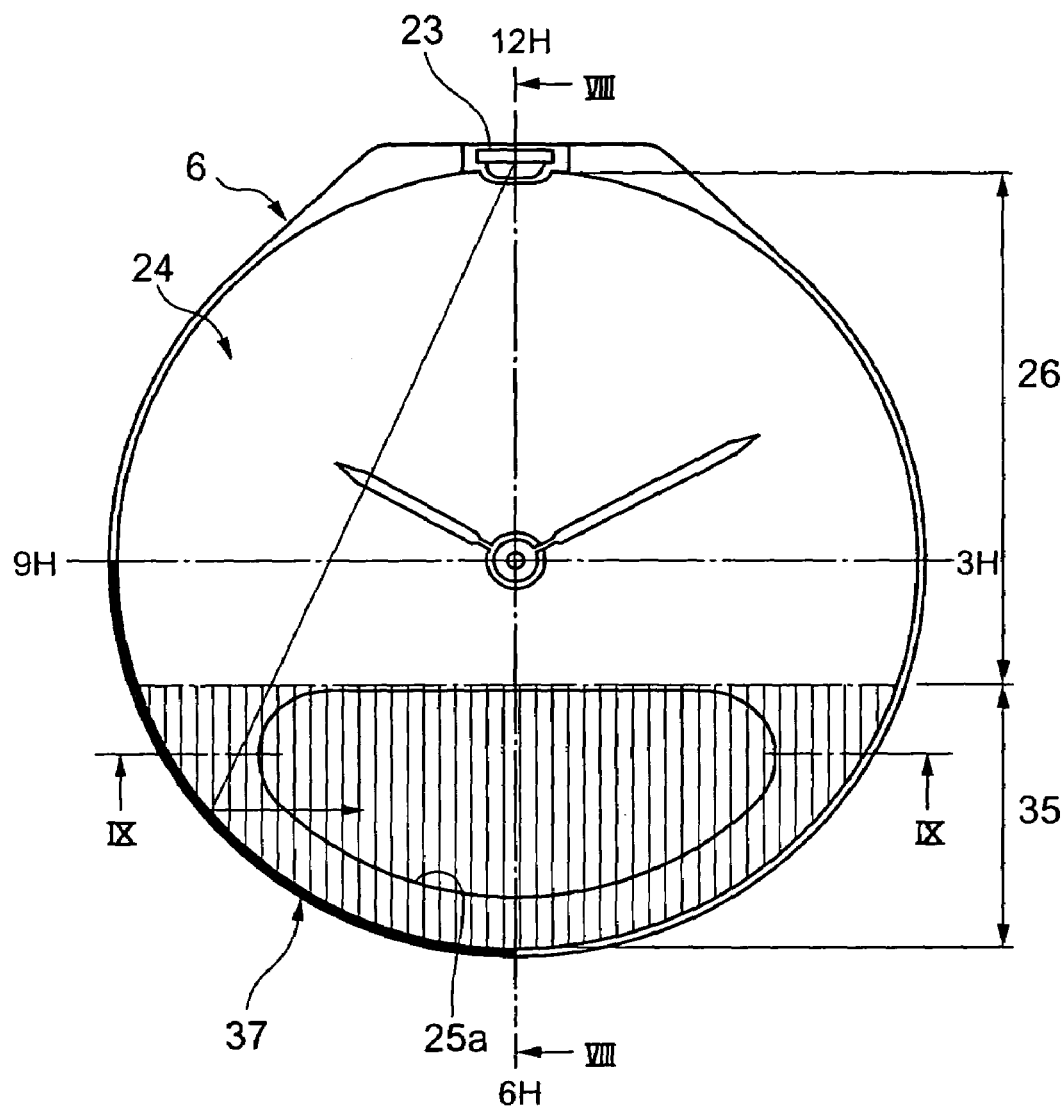
FIG. 14 is an expanded front view of a watch module in the second embodiment in which the present invention is applied to a wristwatch.
Figure 15:
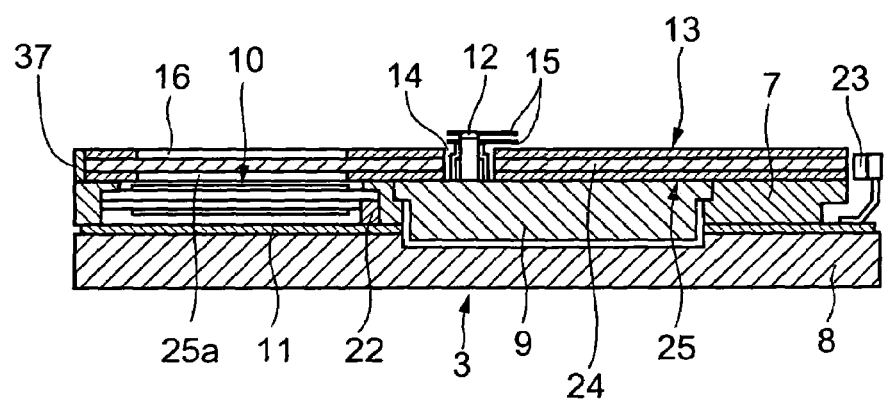
FIG. 15 is a sectional view taken along the line VIII—VIII in FIG. 14.
Figure 16:
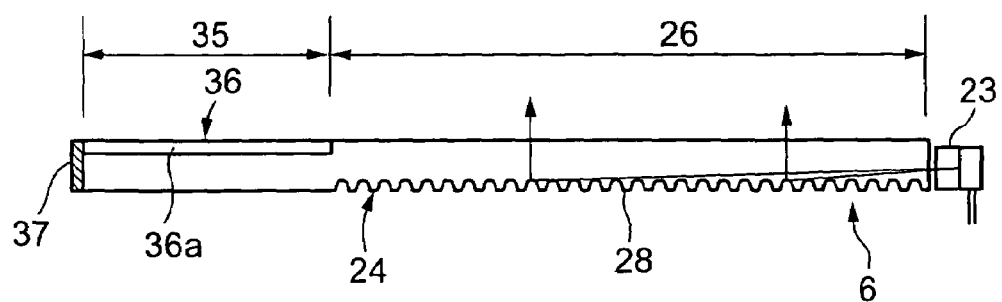
FIG. 16 is an expanded sectional view of a light guide plate taken along the line VIII—VIII in FIG. 14.
Figure 17:
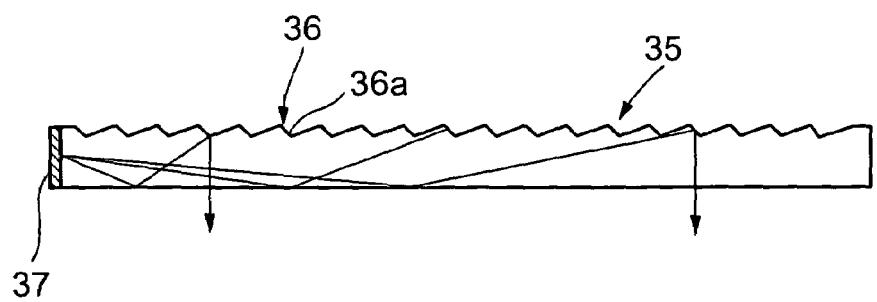
FIG. 17 is an expanded sectional view showing a second illuminating portion of a light guide plate taken along the line IX—IX in FIG. 14.

The wristwatch in the embodiment has substantially the same configuration as the first embodiment excluding the configuration of a second illuminating portion 35 provided in the light guide plate 24 of the illumination device 6. That is, the second illuminating portion 35, as shown in FIG. 14, is provided with line-shaped prisms 36, which is approximately in parallel with the line connecting the light emitting element 23 and a portion of the side surface of the light guide plate 24 which faces the light emitting element 23, that is, the line connecting 12 o'clock and 6 o'clock.

Reflection surfaces 36a of the prisms 36 are provided in the direction which is approximately perpendicular to the line connecting 12 o'clock and 6 o'clock, that is, one of the 3 o'clock side and the 9 o'clock side (the 9 o'clock side in the second embodiment). Therefore, the light radiated in the second illuminating portion 35 from the 9 o'clock side is reflected toward the lower surface side of the light guide plate 24. In the second illuminating portion 35, the light which enters the light guide plate 24 from the light emitting element 23 and runs straight in the light guide plate 24 is hardly reflected from the reflection surfaces 36a of the prisms 36, and continues to run straight. Therefore, a side surface reflection portion 37 is provided at a portion located between 6 o'clock and 9 o'clock on the side surface of the light guide plate 24, which reflects the light which runs straight in the light guide plate 24 and reaches the end surface of the light guide plate 24 toward the second illuminating portion 35 of the light guide plate 24.

According to the wristwatch, as with the first embodiment, since the external light is radiated to the hands 15 and the dial 13, time can be recognized by the hands 15 and the dial 13. The external light radiated to the dial 13 passes through the dial 13 and the light guide plate 24 from the upper surface side to the lower surface side to be reflected from the reflection plate 25, and passes through the opening 25a of the reflection plate 25 to be radiated to the liquid crystal display element 10, so that, as with the first embodiment, information such as time or the like displayed on the liquid crystal display element 10 can be recognized.

When making the light emitting element 23 emit light in a dark place, the light from the light emitting element 23 enters the light guide plate 24 from the side surface and is guided in the surface direction in the light guide plate 24. The light guided to the first illuminating portion 26 of the light guide plate 24 is diffusely reflected by the concavo-convex portion 28 of the first illuminating portion 26 to perform the surface emission as with the first embodiment. The surface-emitted light is radiated toward the upper surface side of the light guide plate 24, so that the dial 13 and the hands 15 above the dial 13 can be illuminated. The light guided to the second illuminating portion 35 is not reflected from the reflection surfaces 36a of each prism 36 of the second illuminating portion 35, and is directly guided in the surface direction in the second illuminating portion 35.

That is, each prism 36 of the second illuminating portion 35 is approximately in parallel with the line connecting the light emitting element 23 and a portion of the side surface of the light guide plate 24 which faces the light emitting element 23, that is, the line connecting 12 o'clock and 6 o'clock, so that the light guided to the second illuminating portion 35 is hardly reflected from the reflection surfaces 36a of the prisms 36, and directly runs straight in the surface direction in the second illuminating portion 35. In the light which runs straight, when the light reflected from the side surface reflection portion 37 provided at a portion located between 6 o'clock and 9 o'clock on the side surface enters the second illuminating portion 35 again, this entered light is reflected from the reflection surfaces 36a of each prism 36 of the second illuminating portion 35 toward the lower surface side of the light guide plate 24 to perform the surface emission, and the surface-emitted light is radiated to the liquid crystal display element 10. Thus, information such as time or the like displayed on the liquid crystal display element 10 can be recognized even in the dark place as described above.

Figure 18:
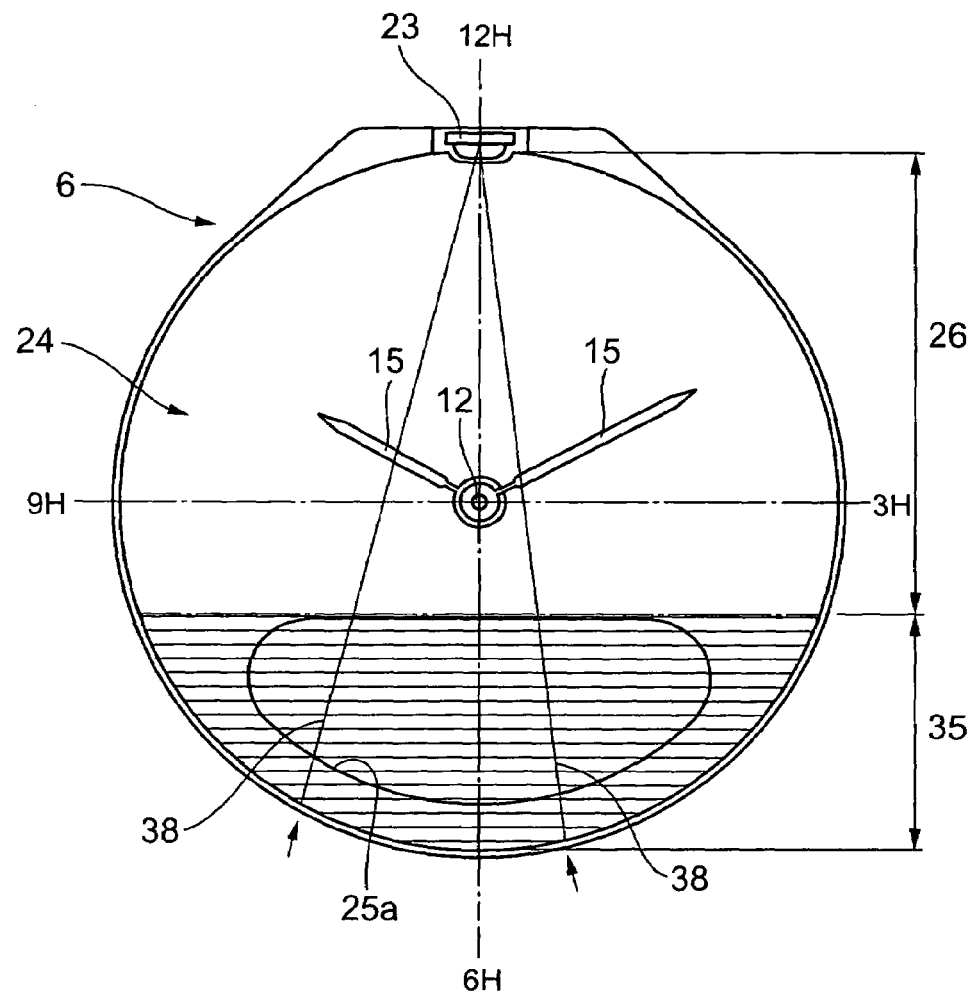
FIG. 18 is a view showing a state of generation of a bright line spectrum in the first embodiment.
Figure 19:
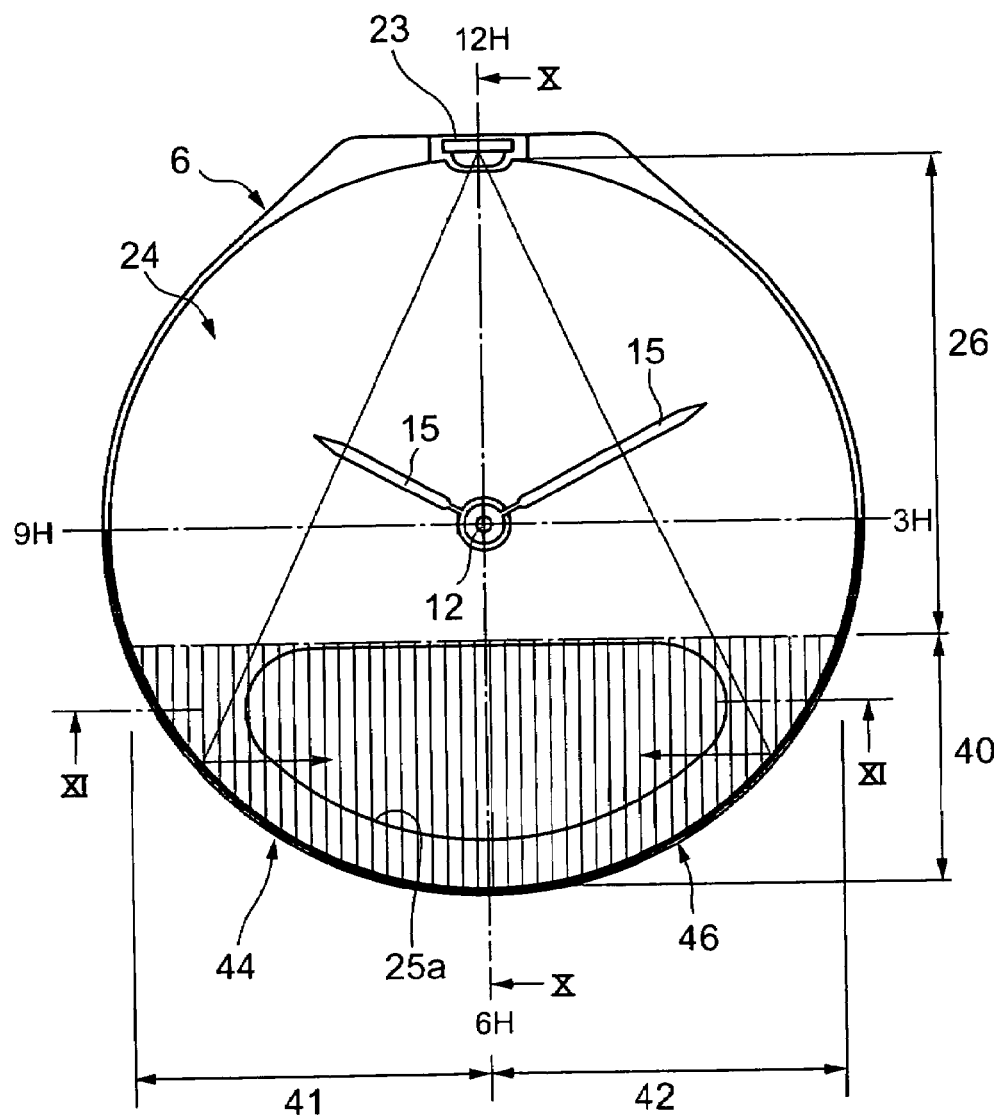
FIG. 19 is an expanded front view of a watch module in the third embodiment in which the present invention is applied to a wristwatch.

Since the light guided to the second illuminating portion 35 from the light emitting element 23 directly runs straight in the surface direction in the second illuminating portion 35, bright line spectrums 38 as shown in FIG. 18 are not generated. That is, when the each prism 29 of the second illuminating portion 27 is provided to be perpendicular to the line connecting the light emitting element 23 and a portion of the side surface of the light guide plate 24 which faces the light emitting element 23, that is, the line connecting 12 o'clock and 6 o'clock as described in the first embodiment, the light from the light emitting element 23 is guided to the second illuminating portion 27 and is reflected from the reflection plate 29a of the each prism 29. Thus, as shown in FIG. 18, when portions from which the light is reflected is seen from a travelling direction of the light, the portions are formed in a shape of dotted-lines and look as the bright line spectrums 38. However, in the second embodiment, since the light guided to the second illuminating portion 35 from the light emitting element 23 is not reflected from the reflection surfaces 36a of each prism 36 of the second illuminating portion 35 and directly runs straight in the surface direction, so that the bright line spectrums 38 are not generated.

According to the wristwatch, when making the light emitting element 23 emit light in the dark place, the light is guided to the first illuminating portion 26 of the light guide plate 24 and is reflected toward the upper surface side of the light guide plate 24. Thus, the surface emission is performed from the first illuminating portion 26 to illuminate the upper surface side of the light guide plate 24. Moreover, the light guided to the second illuminating portion 35 of the light guide plate 24 and reflected from the side surface reflection portion 37 is reflected downward of the light guide plate 24 from the second illuminating portion 35, so that the surface emission is performed from the second illuminating portion 35 to illuminate the lower surface side of the light guide plate 24. Accordingly, both of the upper and lower surface sides can be excellently illuminated with one light guide plate 24 as with the first embodiment. Therefore, the dial 13 and the hands 15 denoting the first display member and the liquid crystal display element 10 denoting the second display member which are disposed in each of the upper and lower surface sides of the light guide plate 24 can be excellently illuminated, and time can be recognized in both of the bright and the dark places. Moreover, a thin shape and space-saving watch module 3 can be achieved and also, it can be suppressed that the outline of information displayed on the liquid crystal display element 10 by the refraction of light at the light guide plate 24 blurs. Therefore, information on the liquid crystal display element 10 can be clearly recognized.

[Third Embodiment]

The third embodiment in which the present invention is applied to a wristwatch will be explained below referring to FIGS. 19–22. The constituent elements similar to those of FIGS. 14–18 in the second embodiment are designated by the same reference numerals for explanation.

The wristwatch in the embodiment has substantially the same configuration as the second embodiment excluding the configuration of a second illuminating portion 40 provided in the light guide plate 24 of the illumination device 6. That is, the second illuminating portion 40 is divided into a first illuminating region 41 on the 9 o'clock side and a second illuminating region 42 on the 3 o'clock side by the line connecting the light emitting element 23 and a portion of the side surface of the light guide plate 24 which faces the light emitting element 23, that is, the line connecting 12 o'clock and 6 o'clock as a boundary.

Figure 22:
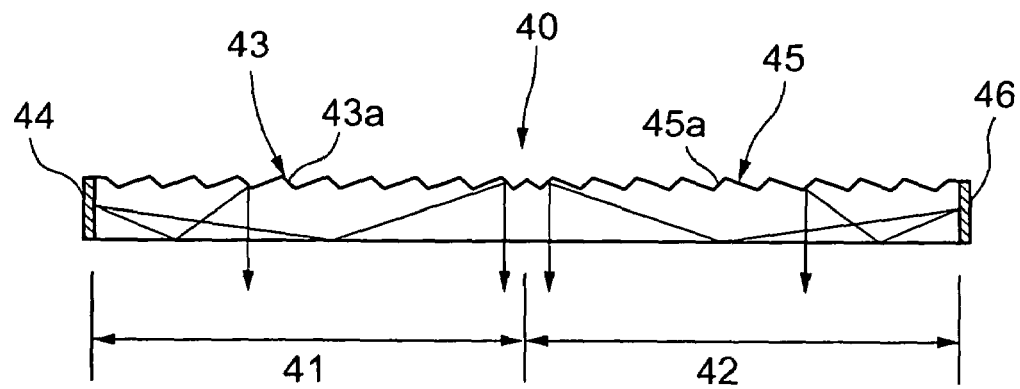
FIG. 22 is an expanded sectional view showing a second illuminating portion of a light guide plate taken along the line XI—XI in FIG. 19.

The first illuminating region 41, as shown in FIG. 22, comprises first prisms 43 and a first side surface reflection portion 44, which is provided on the 9 o'clock side. As with the second embodiment, the first prisms 43 are provided to be approximately in parallel with the line connecting the light emitting element 23 and a portion of the side surface of the light guide plate 24 which faces the light emitting element 23, that is, the line connecting 12 o'clock and 6 o'clock, and reflection surfaces 43a thereof face the 9 o'clock side. Therefore, the light guided to the second illuminating portion 40 from the 9 o'clock side is reflected toward the lower surface side of the light guide plate 24. As with the second embodiment, the first side surface reflection portion 44 is provided at a portion located between 6 o'clock and 9 o'clock on the side surface of the light guide plate 24. When the light from the light emitting element 23 runs straight in the light guide plate 24 and reaches the end surface of the light guide plate 24, the light is reflected from the first side surface reflection portion 44 toward the inside of the second illuminating portion 40 of the light guide plate 24.

The second illuminating region 42, as shown in FIG. 22, comprises second prisms 45 and a second side surface reflection portion 46, which is provided on the 3 o'clock side. The second prisms 45 are provided to be approximately in parallel with the line connecting the light emitting element 23 and a portion of the side surface of the light guide plate 24 which faces the light emitting element 23, that is, the line connecting 12 o'clock and 6 o'clock, and reflection surfaces 45a thereof face the 3 o'clock side. Therefore, the light guided to the second illuminating portion 40 from the 3 o'clock side is reflected toward the lower surface side of the light guide plate 24. The second side surface reflection portion 46 is provided at a portion located between 3 o'clock and 6 o'clock on the side surface of the light guide plate 24. When the light from the light emitting element 23 runs straight in the light guide plate 24 and reaches the end surface of the light guide plate 24, the light is reflected from the second side surface reflection portion 46 toward the second illuminating portion 40 of the light guide plate 24.

According to the wristwatch, as with the second embodiment, the dial 13 and the hands 15 denoting the first display member, and the liquid crystal display element 10 denoting the second display member can be excellently illuminated by the external light in the bright place. In the dark place, by making the light emitting element 23 emit light, the light from the light emitting element 23 is guided in the light guide plate 24 of the illumination device 6 to illuminate the dial 13 and the hands 15 denoting the first display member on the first illuminating portion 26 and the liquid crystal display element 10 denoting the second display member on the second illuminating portion 40.

The second illuminating portion 40 is divided into the first and the second illuminating regions 41, 42, and each prism 43, 45 of the first and the second illuminating regions 41, 42 are provided to be approximately in parallel with the line connecting the light emitting element 23 and a portion of the side surface of the light guide plate 24 which faces the light emitting element 23, that is, the line connecting 12 o'clock and 6 o'clock. Thus, as with the second embodiment, when the light guided to the second illuminating portion 40 from the light emitting element 23 directly runs straight through the first and the second illuminating regions 41, 42 of the second illuminating portion 40 and reaches the end surface of the light guide plate 24, the light is reflected from the first and the second side surface reflection portions 44, 46 provided on the outer peripheral surface of the light guide plate 24 and enters the first and the second illuminating regions 41, 42 in the second illuminating portion 40 again.

As shown in FIG. 22, since the reflection surfaces 43a of the first prisms 43 in the first illuminating region 41 face the 9 o'clock side, when the light reflected from the first side surface reflection portion 44 located between 6 o'clock and 9 o'clock enters the first illuminating regions 41, the light is reflected from the reflection surfaces 43a of the first prisms 43 toward the lower surface side of the light guide plate 24 to perform the surface emission in the first illuminating region 41. Since the reflection surfaces 45a of the second prisms 45 in the second illuminating region 42 face the 3 o'clock side, when the light reflected from the second side surface reflection portion 46 located between 3 o'clock and 6 o'clock enters the second illuminating regions 42, the light is reflected from the reflection surfaces 45a of the second prisms 45 toward the lower surface side of the light guide plate 24 to perform the surface emission in the second illuminating region 42. Therefore, the surface emission is performed in each of the first and the second illuminating regions 41, 42, and the light is radiated to the whole upper surface of the liquid crystal display element 10, so that the light from the light emitting element 23 can efficiently be radiated to the liquid crystal display element 10. Thus, the liquid crystal display element 10 can be illuminated brighter than in the second embodiment.

[Fourth Embodiment]

The fourth embodiment in which the present invention is applied to a wristwatch will be explained below referring to FIGS. 23–25. The constituent elements similar to those of FIGS. 14–18 in the second embodiment are designated by the same reference numerals for explanation.

The wristwatch in the embodiment has substantially the same configuration as the second embodiment excluding that the wristwatch is provided with first and second light emitting elements 50, 51 as light sources which are located at 12 o'clock and 6 o'clock, respectively, and a side surface reflection portion 52 between 3 o'clock and 6 o'clock on the outer periphery surface of the light guide plate 24.

Figure 24:
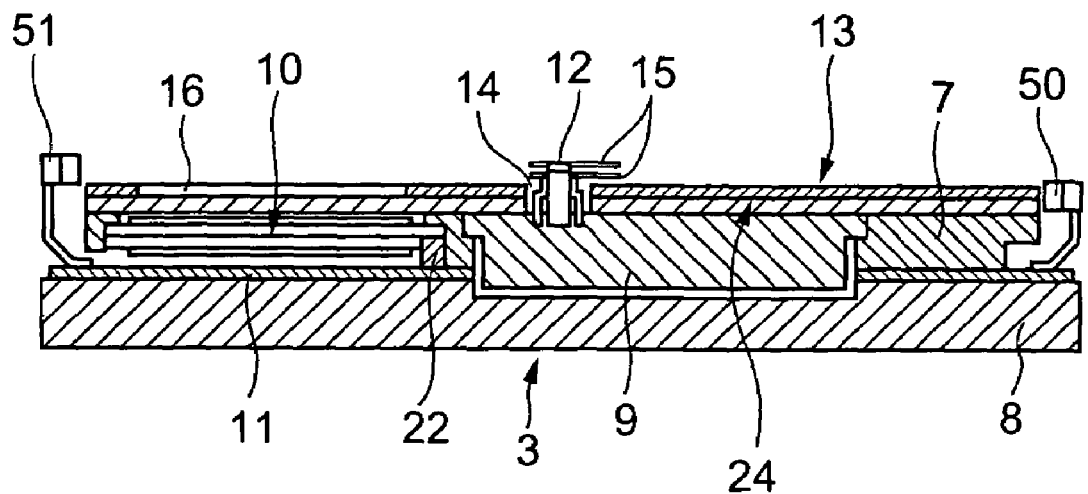
FIG. 24 is a sectional view taken along the line XII—XII in FIG. 23.

That is, in the first and second light emitting elements 50, 51, the first light emitting element 50 located at 12 o'clock of the light guide plate 24, as with the first embodiment, comprises a light emitting diode or the like which emits light in the visible ray region, and is disposed to face the side surface of the light guide plate 24 as shown in FIG. 24. The light emitted from the first light emitting element 50 enters the light guide plate 24 from the side surface of the light guide plate 24. The second light emitting element 51 located at 6 o'clock of the light guide plate 24 comprises of a ultraviolet (UV) light emitting diode, a black light or the like which emits light in the UV-ray region having a wavelength of between 365–385 nm (nm: One nanometer (nm) is equal to one billionth of a meter), and is disposed to be located above the side portion of the dial 13 as shown in FIG. 24. The second light emitting element 51 is configured to radiate the emitted light in the UV-ray region to the upper surface of the dial 13 from above of the side portion thereof.

Figure 23:
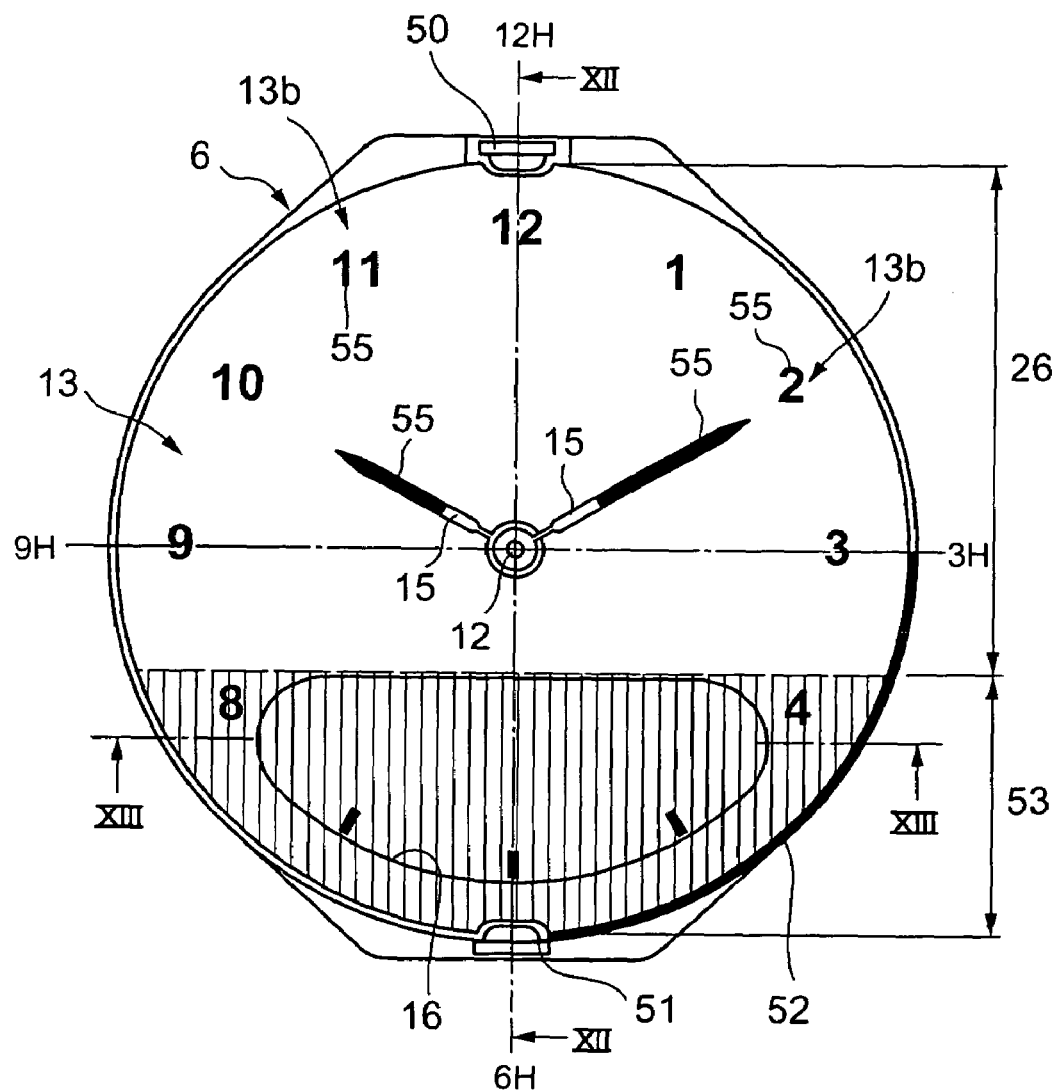
FIG. 23 is an expanded front view of a watch module in the fourth embodiment in which the present invention is applied to a wristwatch.
Figure 25:
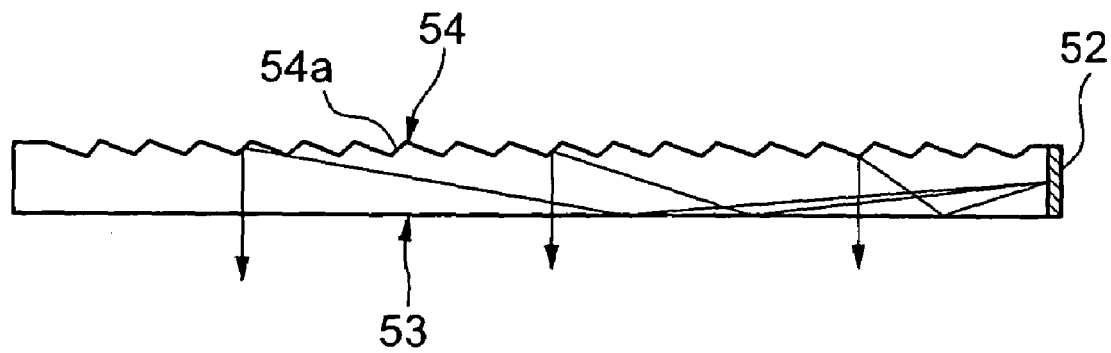
FIG. 25 is an expanded sectional view showing a second illuminating portion of a light guide plate taken along the line XIII—XIII in FIG. 23.

As shown in FIGS. 23 and 25, in a second illuminating portion 53 of the light guide plate 24, each line-shaped prism 54 is provided to be approximately in parallel with the line connecting the first and second light emitting elements 50, 51, that is, the line connecting 12 o'clock and 6 o'clock, and reflection surfaces 54a of each prism 54 face the 3 o'clock side. Therefore, the second illuminating portion 53 of the light guide plate 24 is configured to reflect the light which entered the second illuminating portion 53 from the 3 o'clock side to the lower surface side of the light guide plate 24. A side surface reflection portion 52 is provided at a portion located between 3 o'clock and 6 o'clock on the side surface of the light guide plate 24. When the light from the first light emitting element 50 runs straight in the light guide plate 24 and reaches the end surface of the light guide plate 24, the side surface reflection portion 52 reflects the light toward the inside of the second illuminating portion 53 of the light guide plate 24. Hour numerals 13b on the dial 13 and the hands 15 denoting the first display member are provided with a light emitting portion 55 which emits light in the visible ray region in response to the light in the UV-rays region as shown in FIG. 23.

According to the wristwatch, as with the second embodiment, not only the dial 13 and the hands 15 but also the liquid crystal display element 10 are illuminated by the external light in the bright place. In the dark place, when making the first light emitting element 50 emit light, the first light emitting element 50 emits the light in the visible ray region which is perceptible to human vision. Thus, the light in the visible ray region is guided in the light guide plate 24 so as to illuminate the dial 13 and hands 15 in the first illuminating portion 26 and to illuminate the liquid crystal display element 10 in the second illuminating portion 53. As with the second embodiment, when the light guided to the second illuminating portion 53 directly runs straight through the second illuminating portion 53 in the surface direction and reaches the end surface of the light guide plate 24, the light is reflected from the side surface reflection portion 52 provided on the side surface of the light guide plate 24 and enters the second illuminating portion 53 again to be reflected from the reflection surfaces 54a of each prism 54 toward the lower surface side of the light guide plate 24. Therefore, the surface emission is performed from the second illuminating portion 53 to illuminate the liquid crystal display element 10.

When making the second light emitting element 51 emit light, the second light emitting element 51 emits light in the UV-ray region which is not perceptible to human vision to be radiated to the upper surface side of the dial 13. The light emitting portion 55 provided on the hour numerals 13b of the dial 13 and the hands 15 emits light in the visible ray region in response to the light in the UV-ray region, so that the hour numerals 13b on the dial 13 and the hands 15 can be recognized by the light emitting portion 55 even in the dark place, and thereby time being recognized. The light in the UV-rays region emitted from the second light emitting element 51 passes through the dial 13 and the light guide plate 24, and is radiated to the liquid crystal display element 10 as the light in the UV-ray region which is not perceptible to human vision, so that information displayed on liquid crystal display element 10 cannot be recognized. However, information displayed on the liquid crystal display element 10 can be recognized by emitting the first and second light emitting elements 50, 51 at the same time.

Accordingly, in the wristwatch, as with the second embodiment, since one light guide plate 24 can guide the light from the first light emitting elements 50 to illuminate the upper and lower surface sides thereof, the dial 13 and the hands 15 denoting the first display member and the liquid crystal display element 10 denoting the second display member disposed in each of the upper and lower surface sides of the light guide plate 24 can be excellently illuminated, and time can be recognized in both of the bright and the dark places. Specially, by also emitting the second light emitting element 51 to irradiate the dial 13 and the hands 15 with the light in the UV-rays region, each light emitting portion 55 provided on the hour numerals 13*b* of the dial 13 and the hands 15 can be emitted by the light in the visible ray region. Therefore, the wristwatch which is excellent in fanciness can be obtained.

In the above described fourth embodiment, the line-shaped prisms 54 are formed in the second illuminating portion 53 of the light guide plate 24, and the reflection surfaces 54*a* of the prisms 54 are provided to face the 3 o'clock side for reflecting the light guided to the second illuminating portion 53 from the 3 o'clock side toward the lower surface side of the light guide plate 24, however, it is not limited thereto. The reflection surfaces 54*a* of the prisms 54 may be provided to face the 9 o'clock side for reflecting the light guided to the second illuminating portion 53 from the 9 o'clock side toward the lower surface side of the light guide plate 24. In this case, the side surface reflection portion 52 is provided at a portion located between 6 o'clock and 9 o'clock on the surface side of the light guide plate 24. When the light from the first light emitting element 50 runs straight in the light guide plate 24 and reaches the end surface of the light guide plate 24, the light is reflected toward the inside of the second illuminating portion 53 of the light guide plate 24. In this configuration, the same effect as in the fourth embodiment can be obtained.

The configuration is not limited to the above described configurations. For example, as with the third embodiment shown in FIGS. 19–22, the second illuminating portion 53 may be divided into the first illuminating region 41 on the 9 o'clock side and the second illuminating region 42 on the 3 o'clock side. In this case, the first illuminating region 41 comprises of the first prisms 43 and the first side surface reflection portion 44, and the second illuminating region 42 comprises the second prisms 45 and the second side surface reflection portion 46. According to this configuration, when the light guided to the second illuminating portion 53 is reflected from the first and second side surface reflection portions 44, 46 of the first and second illuminating regions 41, 42, and enters the first and second illuminating regions 41, 42 in the second illuminating portion 53 again, this entered light is reflected from each of the reflection surfaces 43*a*, 45*a* of the first and second prisms 43, 45 toward the lower surface side of the light guide plate 24. Thus, the surface emission is performed in the first and second illuminating regions 41, 42 to illuminate the liquid crystal display element 10. Accordingly, the liquid crystal display element 10 can be illuminated more brightly.

[Fifth Embodiment]

Figure 26:
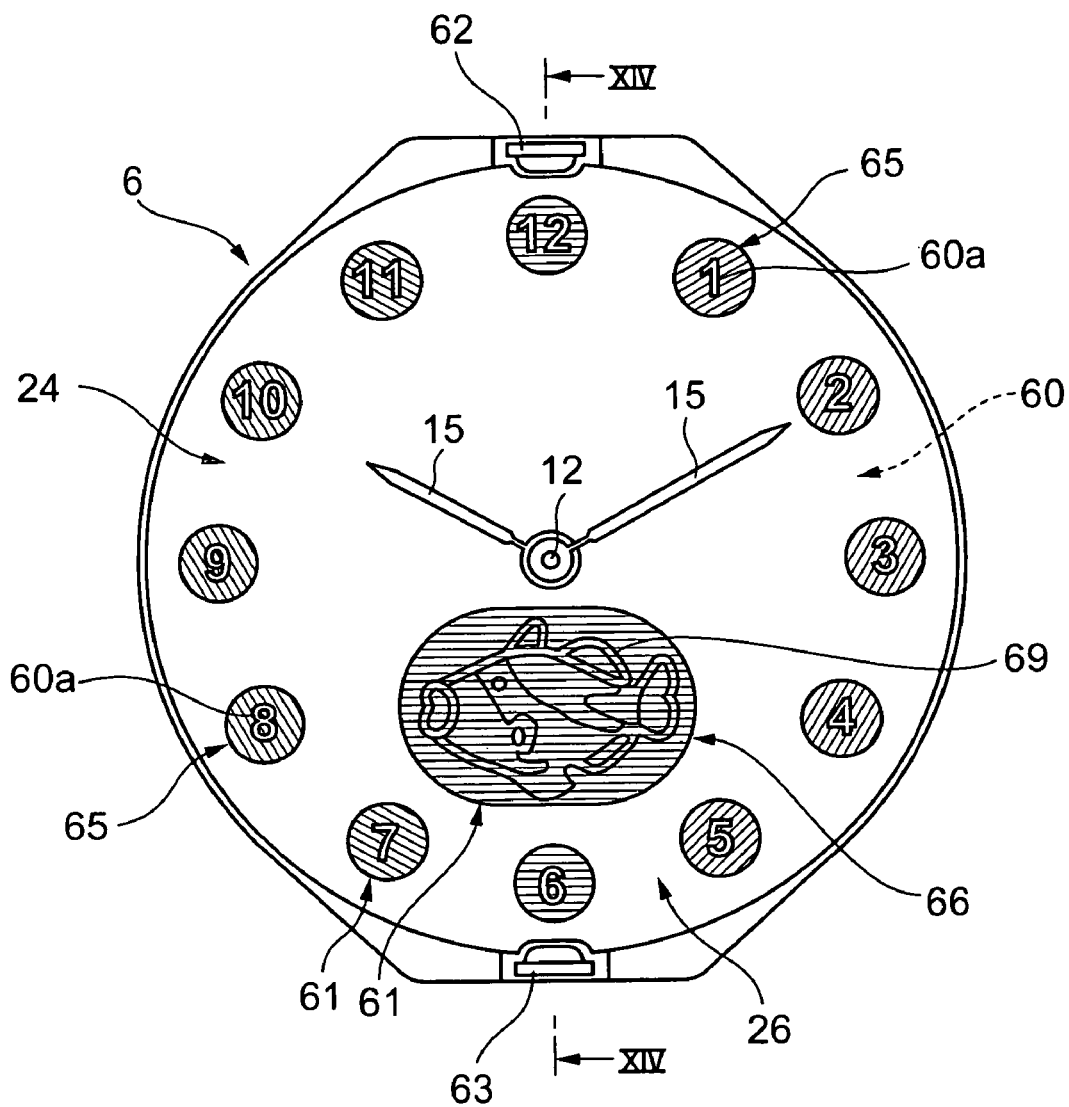
FIG. 26 is an expanded front view of a watch module in the fifth embodiment in which the present invention is applied to a wristwatch.

The fifth embodiment in which the present invention is applied to a wristwatch will be explained below referring to FIGS. 26–28. The constituent elements similar to those of FIGS. 1–6 in the first embodiment are designated by the same reference numerals for explanation.

In the wristwatch, the watch module 3 has an analogue function and the illumination device 6. The dial 60 which comprises a material with non-transmission property such as metal or the like is disposed on the lower surface of the light guide plate 24 of the illumination device 6. The second illuminating portions 61 are provided at a plurality positions of the light guide plate 24, and the first and second light emitting elements 62, 63 are provided to face portions on the side surface of the light guide plate 24 located at 12 o'clock and 6 o'clock, respectively. Other configuration is as same as that in the first embodiment.

Figure 27:
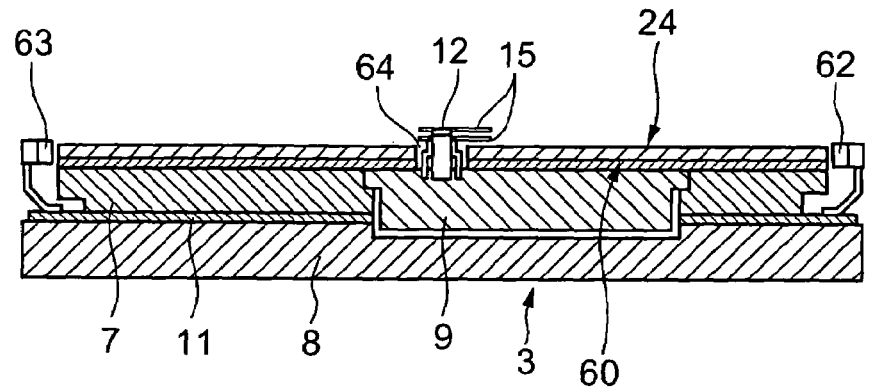
FIG. 27 is a sectional view taken along the line XIV—XIV in FIG. 26.
Figure 28:
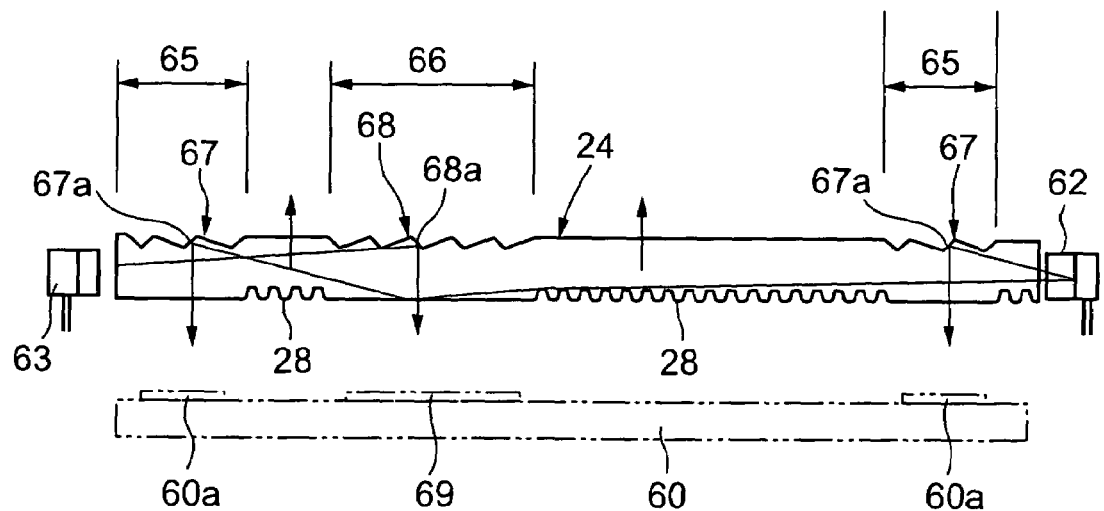
FIG. 28 is an expanded sectional view of a light guide plate taken along the line XIV—XIV in FIG. 26.

That is, in the watch module 3, as shown in FIG. 27, the upper housing 7 is provided with the analogue movement 9, the dial 60 made of a material with non-transmission property such as metal is disposed on the upper surface of the analogue movement 9 and the upper housing 7, and the light guide plate 24 of the illumination device 6 is disposed on the dial 60. In this case, the hand shaft 12 of the analogue movement 9 protrudes upward through each through hole 64 of the dial 60 and the light guide plate 24, and the hands 15 are attached to the upper end of the protruded hand shaft 12. These hands 15 move above the light guide plate 24.

The dial 60 is provided with the through hole 64 at the center thereof through which the hand shaft 12 of the movement 9 is inserted and also, provided with hour numerals 60*a* on the outer periphery portion of the upper surface. Each of the hour numerals 60*a* corresponds to 1–12 o'clock, as shown in FIG. 26. The dial 60*a* is configured to reflect the light which passes through the light guide plate 24 from the upper surface side toward the lower surface side by the whole upper surface thereof. Therefore, in the fifth embodiment, the hands 15 which correspond to the first display member is located upward of the light guide plate 24, and the dial 60 which corresponds to the second display member is located downward of the light guide plate 24.

Both of the first and second light emitting elements 62, 63 of the illumination device 6 comprises a light emitting diode or the like which emits light in the visible ray region, and are configured to emit light with a color different to each other. For example, the first light emitting element 62 is configured to be provided at the position of 12 o'clock and emit red light, and the second light emitting element 63 is configured to be provided at the position of 6 o'clock and emit blue light. The light guide plate 24 of the illumination device 6 is provided with the second illuminating portions 61 at a plurality of positions on the upper surface thereof, and is provided with the first illuminating portion 26 which has the same configuration as in the first embodiment on the whole surface excluding a portion corresponding to the second illuminating portions 61 as shown in FIG. 26. The second illuminating portions 61 comprises a first illuminating region 65 and a second illuminating region 66 as shown in FIG. 26.

Each of the first illuminating regions 65 is provided at a position corresponding to the hour numeral 60*a* on the dial 60, and each line-shaped prism 67 is provided to be approximately perpendicular to the light which is radiated from the first light emitting element 62. As shown in FIG. 28, reflection surfaces 67*a* of each prism 67 are provided to face the first light emitting element 62 side. Accordingly, the light from the first light emitting element 62 is reflected toward the lower surface side. The second illuminating region 66, as shown in FIG. 26, is provided between the hand shaft 12 and the hour numeral 60*a* of 6 o'clock on the upper surface of the dial 60, and each line-shaped prism 68 is provided to be approximately perpendicular to the light which is radiated from the first light emitting: element 63. As shown in FIG. 28, reflection surfaces 68*a* of each prism 68 are provided to face the second light emitting element 63 side. Accordingly, the light from the second light emitting element 63 is reflected toward the lower surface side. As shown in FIG. 26, a decorative portion 69 such as a figure, drawing, symbol or the like is provided at a portion corresponding to the second illuminating region 66 on the upper surface of the dial 60.

According to the wristwatch, as with the first embodiment, the external light illuminates the dial 60 and the hands 15 in the bright place, so that time can be recognized by the dial 60 and the hands 15. Moreover, the hour numerals 60a and the decorative portion 69 on the dial 60 can be recognized. When making the first and second light emitting elements 62, 63 emit light in the dark place, the light is guided in the light guide plate 24 and is radiated to the upper surface side at the first illuminating portion 26. Thus, the hands 15 can be illuminated from the lower surface side. Since the light guided by the light guide place 24 is also radiated to the lower surface side at the first illuminating portion 26, the dial 60 can be illuminated from the upper surface side. Therefore, time can be recognized by the dial 60 and the hands 15 even in the dark place.

When making only the first light emitting element 62 emit light, light with a specific color, for example, red light is emitted. The red light is guided in the light guide plate 24 to illuminate the hands 15 in the upper surface side of the first illuminating portion 26 with red color and to illuminate the hour numerals 60a on the dial 60 in the lower surface side of the first illuminating region 65 of the second illuminating portion 61 with red color. However, since the red light directly runs straight in the second illuminating region 66, the decorative portion 69 on the dial 60 is less illuminated. When making only the second light emitting element 63 emit light, light with a color different from that of the first light emitting element 62, for example, blue light is emitted. The blue light is guided in the light guide plate 24 to illuminate the hands 15 in the upper surface side of the first illuminating portion 26 with blue color and to illuminate the decorative portion 69 on the dial 60 in the lower surface side of the second illuminating region 66 of the second illuminating portion 61 with blue color. However, the blue light directly runs straight in the first illuminating region 65, the hour numerals 60a on the dial 60 is less illuminated.

When making both of the first and second light emitting elements 62, 63 emit light at the same time, the hands 15 in the upper surface side of the light guide plate 24 is illuminated with a mixed color of light-emitting colors of both the first and second light emitting elements 62, 63 at the first illuminating portion 26 of the light guide plate 24. However, only the hour numerals 60a on the dial 60 located on the lower side of the light guide plate 24 is illuminated with a light-emitting color of the first light emitting element 62, for example a red color, at the first illuminating region 65 of the second illuminating portion 61, and only the decorative portion 69 on the dial 60 located in the lower side of the light guide plate 24 is illuminated with a light-emitting color of the second light emitting element 63, for example a blue color, at the second illuminating region 66. Thus, the hour numerals 60a on the dial 60 looks red, and the decorative portion 69 looks blue. Accordingly, the wristwatch which is excellent in color and fanciness can be obtained.

Figure 29:
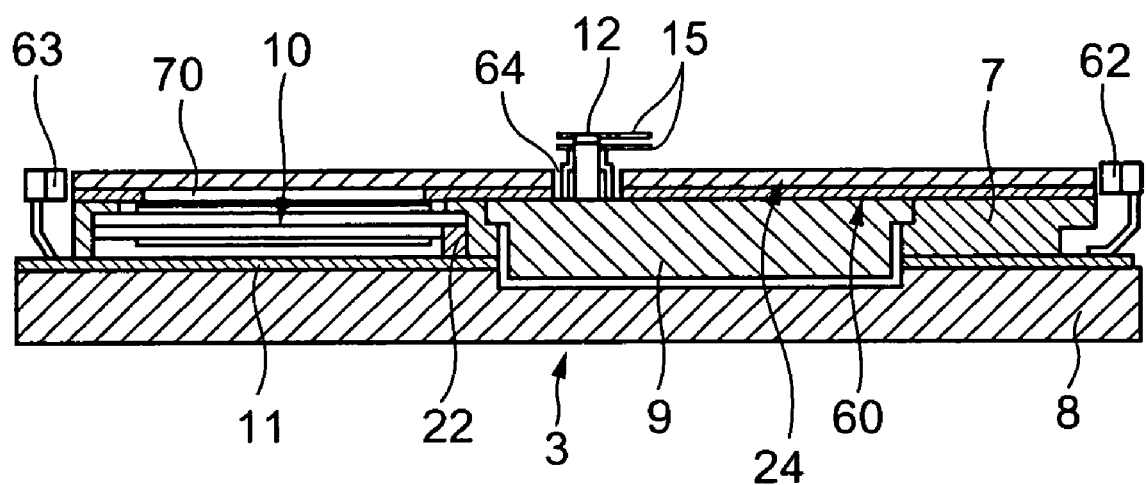
FIG. 29 is an expanded sectional view of a watch module showing a fourth modification of the fifth embodiment.

In the fifth embodiment, it is described about the case where the watch module 3 has only the analogue function, and the decorative portion 69 is provided corresponding to the second illuminating region 66 of the second illuminating portion 61 on the upper surface of the dial 60. However, it is not limited thereto. For example, as in the fourth modification shown in FIG. 29, an opening portion 70 may be provided on the dial 60 corresponding to the second illuminating region 66 of the second illuminating portion 61, and the liquid crystal display element 10 may provided in the upper housing 7 corresponding to the opening portion 70. In this configuration, as with the fifth embodiment, the hour numerals 60a on the dial 60 can be illuminated with a light-emitting color (for example, red color) of the first light emitting element 62, and the liquid crystal display element 10 can be illuminated with a light-emitting color (for example, blue color) of the second light emitting element 63. Thus, even when the liquid crystal display element 10 is provided instead of the decorative portion 69 on the dial 60, the wristwatch which is excellent in color and fanciness can be obtained.

[Sixth Embodiment]

Figure 30:
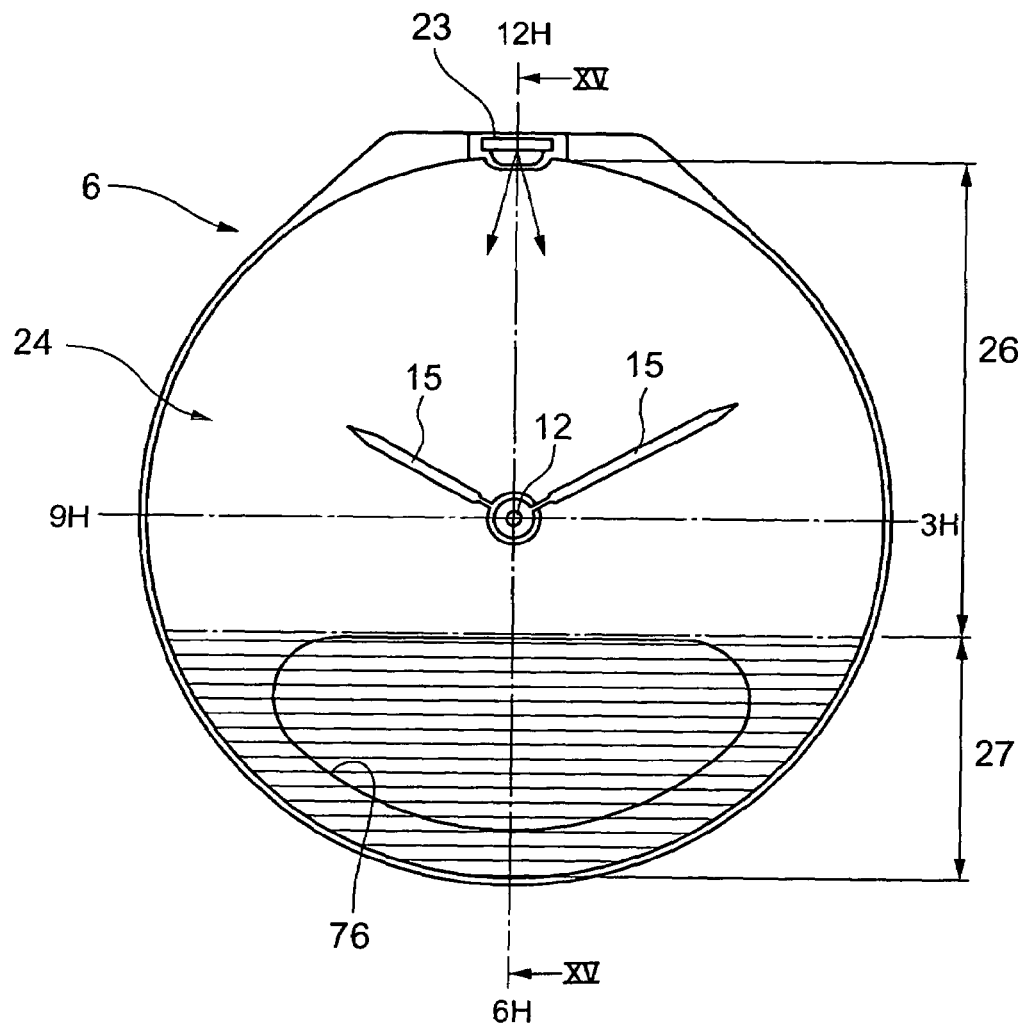
FIG. 30 is an expanded front view of a watch module in the sixth embodiment in which the present invention is applied to a wristwatch.
Figure 31:
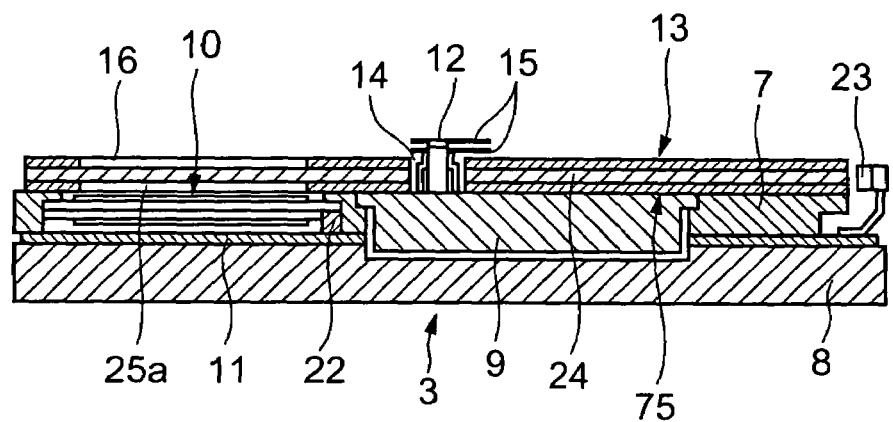
FIG. 31 is a sectional view taken along the line XV—XV in FIG. 30.
Figure 32:
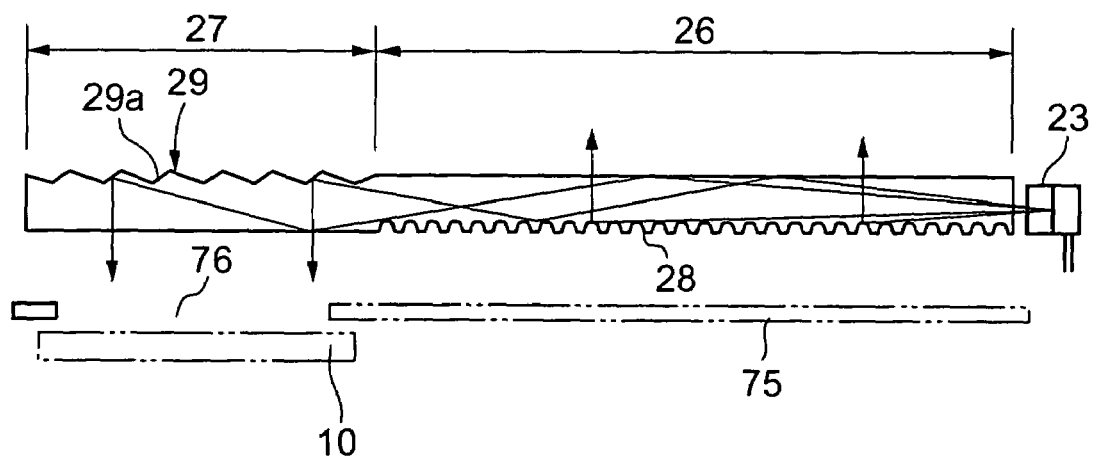
FIG. 32 is an expanded sectional view of a light guide plate taken along the line XV—XV in FIG. 30.
Figure 33:
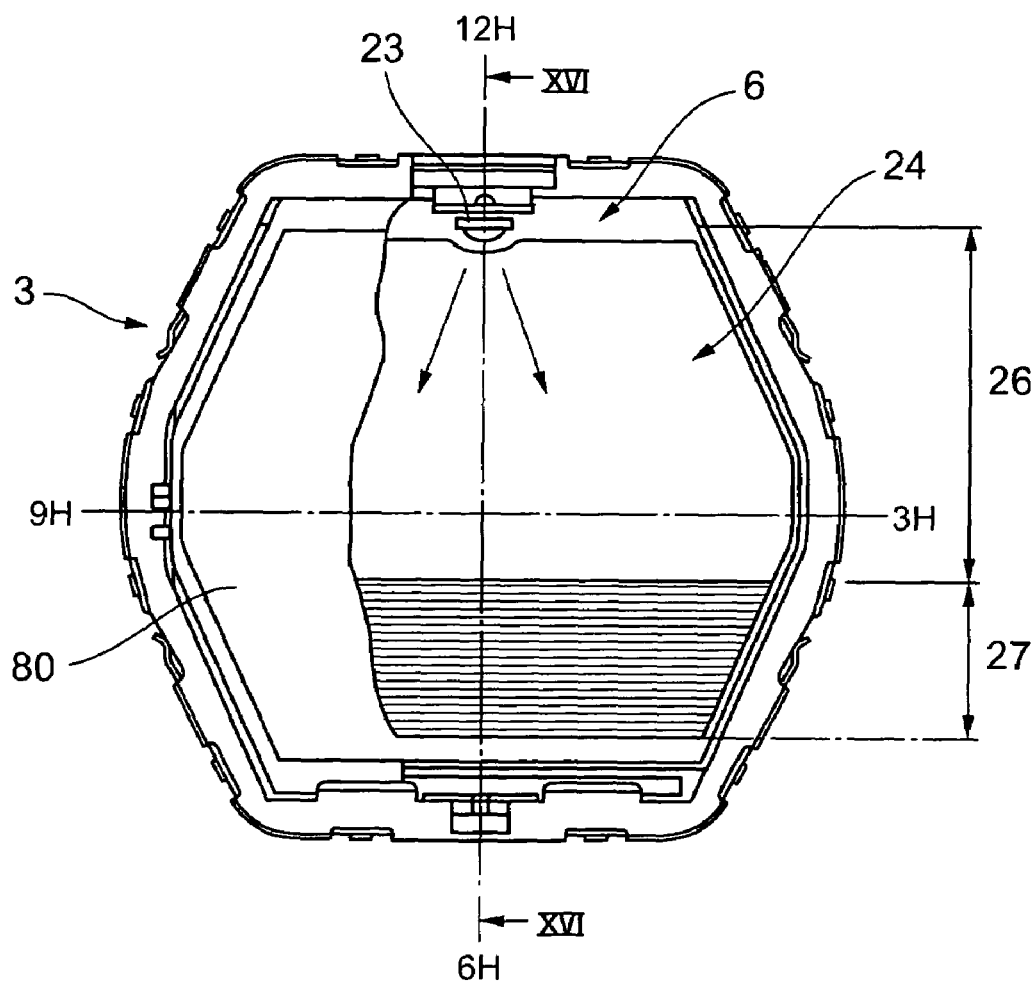
FIG. 33 is an expanded front view of a watch module in the seventh embodiment in which the present invention is applied to a wristwatch.

The sixth embodiment in which the present invention is applied to a wristwatch will be explained below referring to FIGS. 30–32. The constituent elements similar to those of FIGS. 1–6 in the first embodiment are designated by the same reference numerals for explanation.

The wristwatch is configured to be provided with a solar panel 75 instead of the reflection plate 25 on the lower surface of the light guide plate 24. Other configuration is as same as that in the first embodiment. That is, the solar panel 75 has a configuration in which a lower electrode layer made of metal, an amorphous silicon layer, a transparent upper electrode layer, and a transparent protection layer are laminated in this order from below on an insulating substrate. When the solar panel 75 is irradiated with the external light from the upper side, the external light passes through the transparent protection layer and the transparent upper electrode layer to be radiated to the amorphous silicon layer. Moreover, the light which passes through the amorphous silicon layer is reflected from the lower electrode layer. Thus, the solar panel 75 efficiently generates the electromotive force.

The solar panel 75 is configured to be provided with the through hole 14 at the center thereof through which the hand shaft 12 of the analogue movement 9 is inserted, and an opening portion 76 at a portion corresponding to the liquid crystal display element 10. In the sixth embodiment, the light emitting element 23 is disposed to face a portion located at 12 o'clock on the side surface of the light guide plate 24 as with the first embodiment. The light guide plate 24 is provided with the first illuminating portion 26 and the second illuminating portion 27. In the first illuminating portion 26, the light guided in the light guide plate 24 is radiated toward the upper surface side to perform the surface emission.

In this case, in the first illuminating portion 26, the light which leaks to the lower surface side of the light guide plate 24 is reflected from the solar panel 75 toward the upper surface side, and the reflected light is radiated from the upper surface side of the light guide plate 24. In the second illuminating portion 27, each line-shaped prism 29 is provided to be approximately perpendicular to the line connecting the light emitting element 23 and a portion of the side surface of the light guide plate 24 which faces the light emitting element 23, that is, the line connecting 12 o'clock and 6 o'clock, and the reflection surfaces 29a of each prism 29 reflect the light guided in the light guide plate 24 toward the lower surface side.

According to the wristwatch, as with the first embodiment, the external light illuminates the dial 13 and the hands 15 in the bright place. Moreover, the external light is radiated to the light guide plate 24 through the dial 13 and the opening portion 16 thereof, and this radiated external light passes through the light guide plate 24 from the upper surface side to the lower surface side to be radiated to the solar panel 75. Thus, electric power can be generated by the solar panel 75 efficiently and the external light which passes through the opening portion 76 of the solar panel 75 is radiated to the liquid crystal display element 10. Accordingly, information such as time or the like displayed on the liquid crystal display element 10 can be recognized.

When making the light emitting element 23 emit light in the dark place, the light is guided in the surface direction in the light guide plate 24 and is radiated toward the upper surface side of the light guide plate 24 at the first illuminating portion 26 of the light guide plate 24 to perform the surface emission from the first illuminating portion 26. Thus, the upper surface side of the light guide plate 24 can be illuminated. The light guided to the second illuminating portion 27 of the light guide plate 24 is radiated toward the lower surface side of the light guide plate 24 at the second illuminating portion 27 to perform the surface emission from the second illuminating portion 27, thereby illuminating the lower surface side of the light guide plate 24. Since one light guide plate 24 can illuminate the upper and the lower surface sides thereof, the dial 13 and the hands 15 disposed in the upper surface side of the light guide plate 24 and the liquid crystal display element 10 disposed in lower surface side of the light guide plate 24 can be excellently illuminated even in the dark place.

[Seventh Embodiment]

The seventh embodiment in which the present invention is applied to a wristwatch will be explained below referring to FIGS. 33–36. The constituent elements similar to those of FIGS. 1–6 in the first embodiment are designated by the same reference numerals for explanation.

The wristwatch is provided with a first liquid crystal display element 80 of a transmission type and a second liquid crystal display element 81 of a reflection type, and the light guide plate 24 is disposed between the first and second liquid crystal display elements 80, 81. Other configuration is as same as that in the first embodiment.

Figure 34:
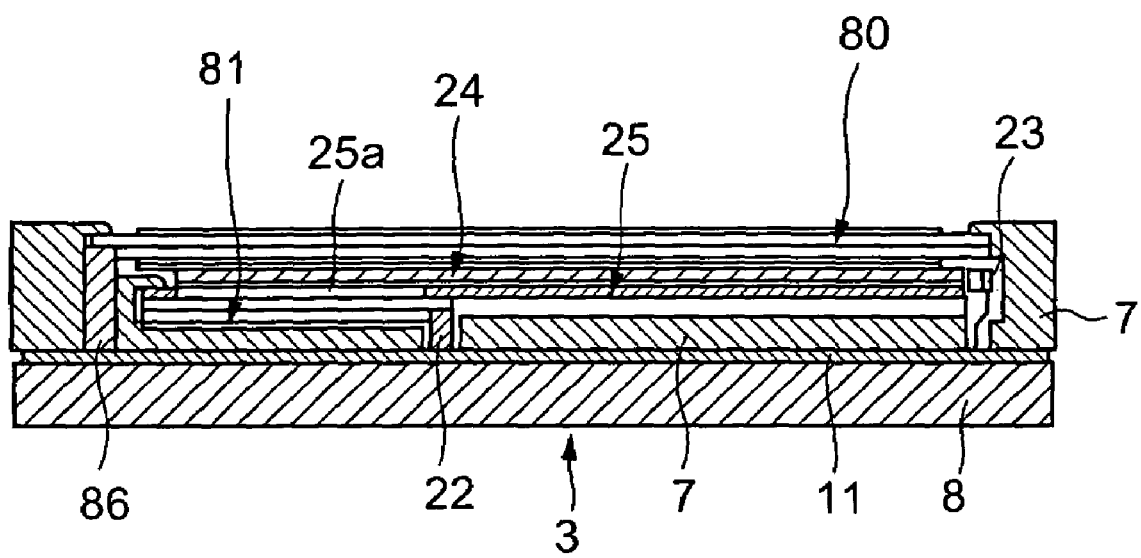
FIG. 34 is a sectional view taken along the line XVI—XVI in FIG. 33.
Figure 35:
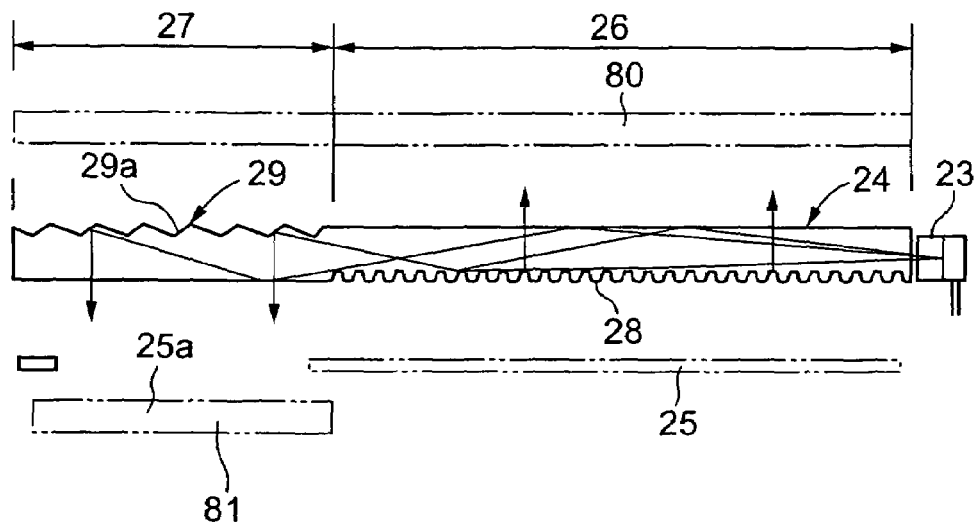
FIG. 35 is an expanded sectional view of a light guide plate taken along the line XVI—XVI in FIG. 33.
Figure 36:
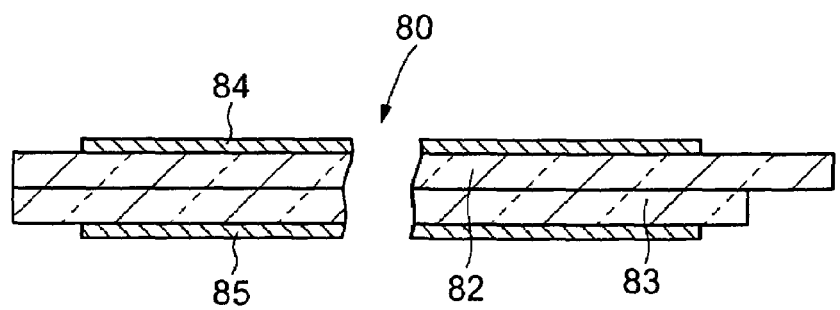
FIG. 36 is an expanded sectional view showing a first liquid crystal display element of FIG. 34.

That is, as shown in FIG. 36, the first liquid crystal display element 80 is of a reflection type, which comprises an enclosed liquid crystal (not shown) sandwiched between a pair of transparent upper and lower electrode substrates 82, 83, and polarizers 84, 85 are provided on the upper surface of the upper electrode substrate 82 and the lower surface of the lower electrode substrate 83, respectively. As shown in FIG. 34, the end of the upper electrode substrate 82 is supported in a state of being electrically connected to the circuit board 11 by an interconnector 86. In this state, voltage is selectively applied between a pair of the upper and lower electrode substrates 82, 83 to electrooptically display information such as time or the like.

As with the first embodiment, the second liquid crystal display element 81 is of a reflection type, which comprises an enclosed liquid crystal (not shown) sandwiched between a pair of the transparent upper and lower electrode substrates 17, 18, the polarizers 19, 20 are provided on the upper surface of the upper electrode substrate 17 and the lower surface of the lower electrode substrate 18, respectively, and the reflection plate 21 is provided on the lower surface of the polarizer 20. The end of the upper electrode substrate 17 is supported in a state of being electrically connected to the circuit board 11 by the interconnector 22. In this state, voltage is selectively applied between a pair of the upper and lower electrode substrates 17, 18 to electrooptically display information such as time or the like.

The first liquid crystal display element 80 on the upper side is formed in a size of the whole upper surface of the light guide plate 24, that is, both of the first illuminating portion 26 and the second illuminating portion 27. The second liquid crystal display element 81 is formed in a size corresponding to the size of the second illuminating portion 27. As with the first embodiment, the light emitting element 23 is disposed to face a portion located at 12 o'clock on the side surface of the light guide plate 24. The reflection plate 25 provided with the opening portion 25a corresponding to the second liquid crystal display element 81 is disposed in the lower surface side of the light guide portion 24. The first illuminating portion 26 of the light guide portion 24 is configured to reflect the light guided in the light guide portion 24 toward the upper surface side. In the second illuminating portion 27, each line-shaped prism 29 is provided to be approximately perpendicular to the line connecting the light emitting element 23 and a portion of the side surface of the light guide plate 24 which faces the light emitting element 23, that is, the line connecting 12 o'clock and 6 o'clock, and the reflection surfaces 29a of each prism 29 reflect the light guided in the light guide plate 24 toward the lower surface side.

According to the wristwatch, the external light enters the wristwatch case 1 through the watch glass 2 in the bright place, and this external light is radiated to the first liquid crystal display element 80, so that information such as time or the like displayed on the first liquid crystal display element 80 can be recognized. That is, when the external light which entered the watch case 1 is radiated to the first liquid crystal display element 80, this irradiated external light passes through the first liquid crystal display element 80 and the light guide plate 24. The light which passes through the first illuminating portion 26 of the light guide plate 24 from the upper surface side to the lower surface side is reflected from the reflection plate 25. Since this reflected light passes through a light path which is opposite to the above to pass through the light guide plate 24 and the first liquid crystal display element 80 again, information such as time or the like displayed on the first liquid crystal display element 80 can be recognized.

In the external light which passes through the second illuminating portion 27 of the light guide plate 24, the external light which passes through the opening portion 25a in the reflection plate 25 is radiated to the second liquid crystal display element 81, and this reflected external light enters the second liquid crystal display element 81 to be reflected from the reflection plate 25 of the second liquid crystal display element 81. This reflected light passes through a light path which is opposite to the above to pass through the second liquid crystal display element 81, the opening portion 25a in the reflection plate 25, the second illuminating portion 27 of the light guide plate 24 and the first liquid crystal display element 80 again, and is radiated upward. Thus, information displayed on the second liquid crystal display element 81 can be recognized through the first liquid crystal display element 80.

When making the light emitting element 23 of the illumination device 6 emit light in the dark place, as with the first embodiment, the light from the light emitting element 23 enters the light guide plate 24 from the side surface and is guided in the surface direction in the light guide plate 24. The light guided to the first illuminating portion 26 of the light guide plate 24 is radiated toward the upper surface side of the light guide plate 24. Also, the light which leaks to the lower surface side of light guide plate 24 is reflected from the reflection plate 25. Thus, as described above, the first liquid crystal display element 80 is illuminated from the lower surface side, so that information such as time or the like displayed on the first liquid crystal display element 80 can be recognized even in the dark place. The light guided by the second illuminating portion 27 of the light guide plate 24 is reflected from the reflection surfaces 29a of each prism 29 of the second illuminating portion 27 toward the lower surface side of the light guide plate 24, and the reflected light passes through the opening portion 25a in the reflection plate 25 to be radiated to the second liquid crystal display element 81. Thus, as described above, information such as time or the like displayed on the second liquid crystal display element 81 can be recognized through the first liquid crystal display element 80 even in the dark place.

According to the wristwatch, when making the light emitting element 23 emit light in the dark place, this emitted light is guided in the surface direction in the light guide plate 24, and is reflected toward the upper surface side of the light guide plate 24 at the first illuminating portion 26 of the light guide plate 24 to perform the surface emission. Thus, the first liquid crystal display element 80 can be illuminated from the lower surface side. When the emitted light is guided to the second illuminating portion 27 of the light guide plate 24, this guided light is reflected toward the lower surface side of the light guide plate 24 at the second illuminating portion 27 of the light guide plate 24 to perform the surface emission. Thus, the second liquid crystal display element 81 can be illuminated from the upper surface side. Therefore, the upper and lower surface sides of the light guide plate 24 can be illuminated with one light guide plate 24, so that information displayed on the first and second liquid crystal display elements 80, 81 can be recognized in both of the bright and the dark places.

In the wristwatch, since one light guide plate 24 can illuminate the upper and the lower surface sides thereof, there is no need to use a flat backlight device such as an EL element (electroluminescence element) on the lower surface of the second liquid crystal display element 81 even when disposing the second liquid crystal display element 81 at the lower surface of the first liquid crystal display element 80 through the light guide plate 24. Thus, a thin shape and space-saving watch module 3 as a whole can be achieved, so that the wristwatch as a whole can be a small size and a thin shape. Since the second liquid crystal display element 81 can be disposed adjacent to the second illuminating portion 27 of the light guide plate 24, it can be suppressed that the outline of information displayed on the second liquid crystal display element 81 by the refraction of light at the light guide plate 24 blurs. Therefore, information displayed on the second liquid crystal display element 81 can be clearly recognized through the first liquid crystal display element 80.

[Eight Embodiment]

The eight embodiment in which the present invention is applied to a cellular phone will be explained below referring to FIGS. 37 and 38. The constituent elements similar to those of FIGS. 33–36 in the seventh embodiment are designated by the same reference numerals for explanation.

Figure 37:
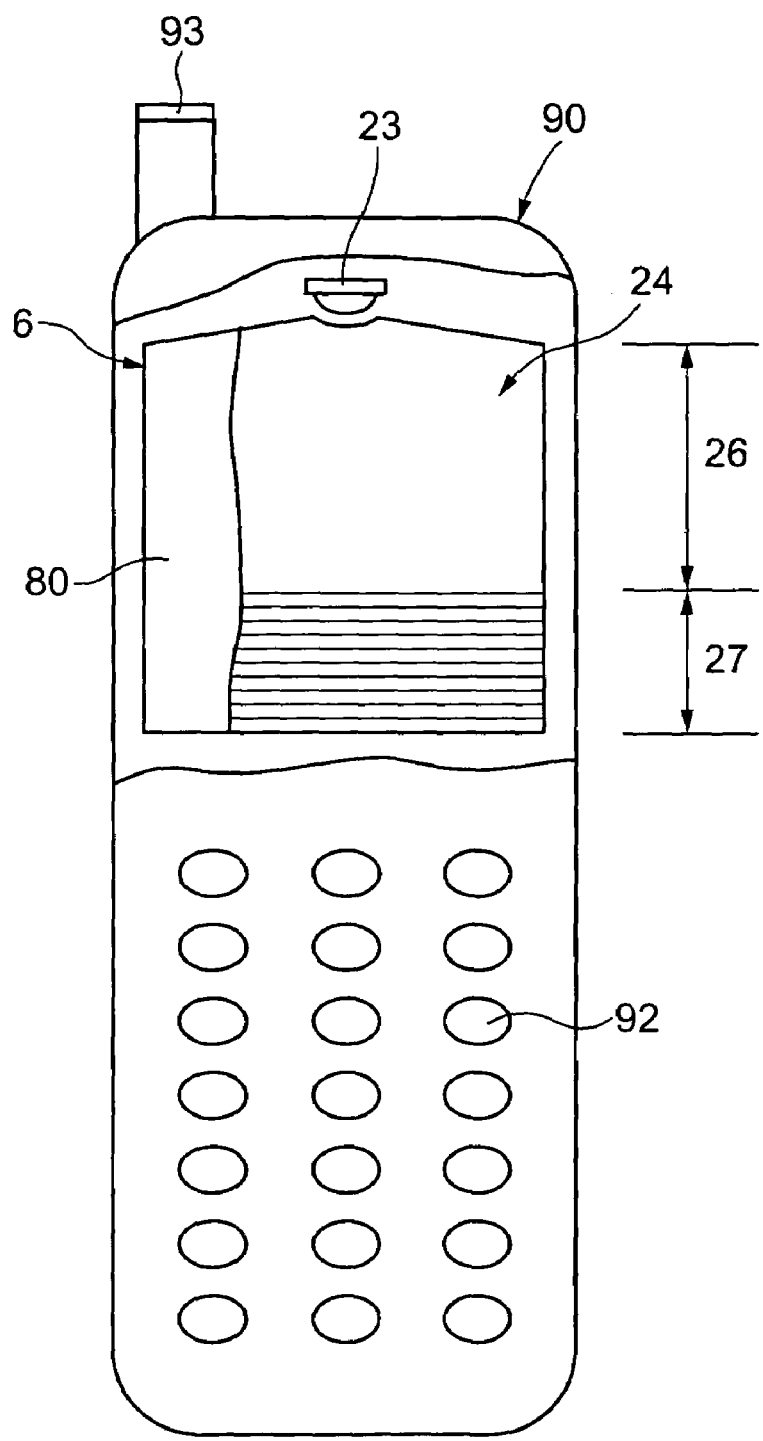
FIG. 37 is an expanded front view showing the eighth embodiment in which the present invention is applied to a cellular phone.
Figure 38:
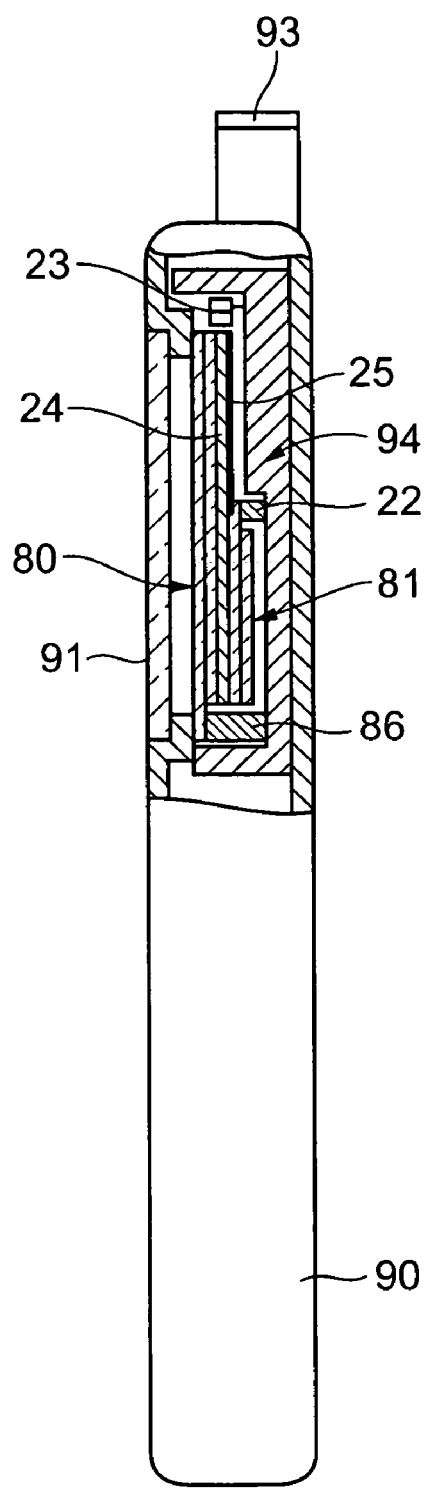
FIG. 38 is a partially broken expanded side view of FIG. 37.

As shown in FIGS. 37 and 38, the cellular phone comprises a device case 90 made of synthetic resin. The device case 90 is provided with an opening portion on one side of the upper surface, in which a transparent protection glass 91 corresponding to a window portion is attached. On the other side of the upper surface, various key bottoms 92 which are necessary as a telephone function are provided. On the one side of the device case 90, an antenna 93 is extendably attached.

Figure 20:
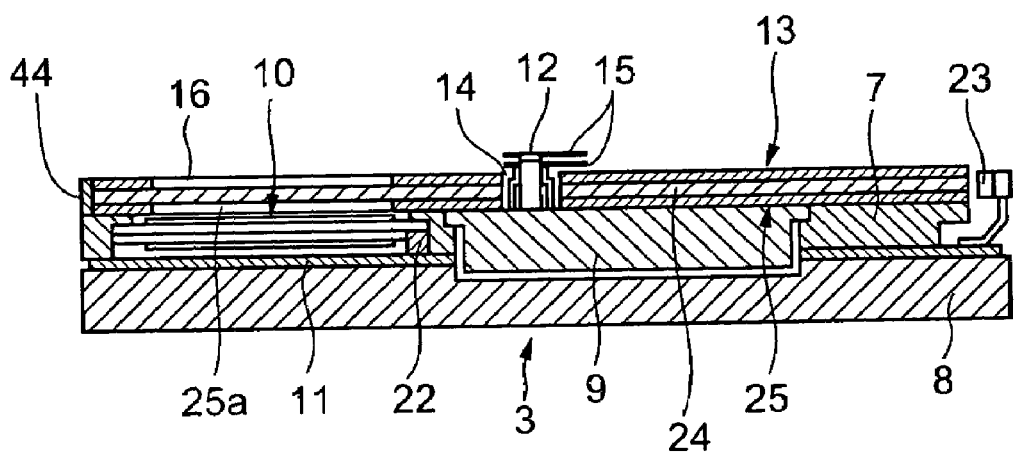
FIG. 20 is a sectional view taken along the line X—X in FIG. 19.
Figure 21:
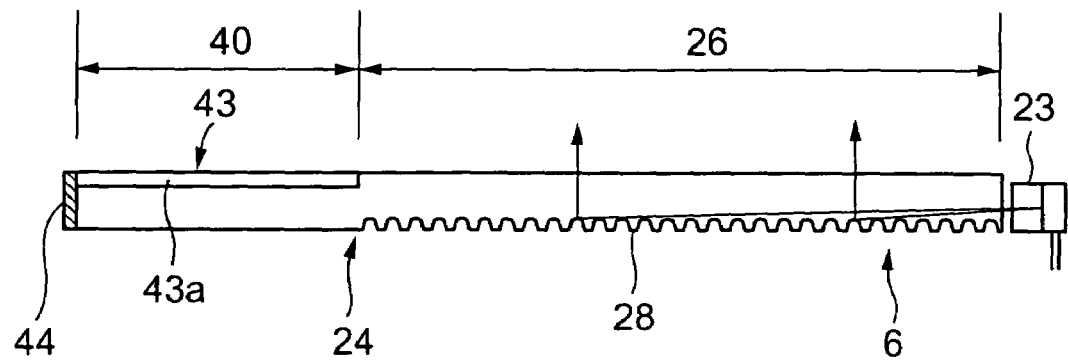
FIG. 21 is an expanded sectional view of a light guide plate taken along the line X—X in FIG. 19.

As shown in FIG. 20, a module 94 for cellular phone is stored inside the device case 90. The module 94 for cellular phone comprises the first and second liquid crystal display elements 80, 81 for displaying information necessary for calling and the illumination device 6. The illumination device 6, as with the seventh embodiment, comprises the light guide plate 24 disposed between the first and second liquid crystal display elements 80, 81, and the light emitting element 23 disposed to face a portion located at 12 o'clock on the side surface of the light guide plate 24. The light guide plate 24 is provided with the first illuminating portion 26 and the second illuminating portion 27, and the reflection plate 25 in which the opening portion 25a is provided corresponding to the second liquid crystal display element 81 is disposed in the lower surface side of the light guide plate 24. The first liquid crystal display elements 80 is of a transmission type, and is formed in a size approximately equal to the size of the light guide plate 24 to be disposed in the lower side of the protection glass 91. The second liquid crystal display elements 81 is of a reflection type, and is formed in a size corresponding to the size of the opening portion 25a in the reflection plate 25 to be disposed in the lower side of the second illuminating portion 27 and the reflection plate 25.

According to the cellular phone, as with the seventh embodiment, the external light enters the device case 90 through the protection glass 91 in the bright place, and this external light is radiated to the first liquid crystal display element 80. Also, the external light passes through the first liquid crystal display element 80, the light guide plate 24 and the opening portion 25a in the reflection plate 25 to be radiated to the second liquid crystal display elements 81. Thus, information displayed on the first and second liquid crystal display elements 80, 81 can be recognized. When making the light emitting element 23 emit light in the dark place, as with the seventh embodiment, the light from the light emitting element 23 is guided in the surface direction in the light guide plate 24 and is radiated toward the upper surface side of the light guide plate 24 at the first illuminating portion 26, so that the surface emission is performed from the first illuminating portion 26 to illuminate the first liquid crystal display element 80 from the lower surface side. The light guided to the second illuminating portion 27 is reflected from the reflection surfaces 29a of each prism 29 of the second illuminating portion 27 toward the lower surface side of the light guide plate 24, so that the surface emission is performed from the second illuminating portion 27 to illuminate the second liquid crystal display element 81 from the upper surface side through the opening portion 25a in the reflection plate 25. Therefore, information displayed on the first and second liquid crystal display elements 80, 81 can be recognized even in the dark place.

As described above, in the cellular phone, when making the light emitting element 23 emit light, the first liquid crystal display element 80 can be illuminated from the lower surface side in the first illuminating portion 26 of the light guide plate 24 and the second liquid crystal display element 81 can be illuminated from the upper surface side in the second illuminating portion 27. Therefore, the upper and lower surface sides of the light guide plate 24 can be illuminated with one light guide plate 24, so that information displayed on the first and second liquid crystal display elements 80, 81 can be recognized in both of the bright and the dark places. In this case, since one light guide plate 24 can illuminate the upper and the lower surface sides thereof, there is no need to use a flat backlight device such as an EL element (electroluminescence element) on the lower surface of the second liquid crystal display element 81. Thus, a thin shape and space-saving module 94 can be achieved, so that the equipment as a whole can be a small size and a thin shape. Since the second liquid crystal display element 81 can be disposed adjacent to the second illuminating portion 27 of the light guide plate 24, it can be suppressed that the outline of information displayed on the second liquid crystal display element 81 by the refraction of light at the light guide plate 24 blurs. Therefore, information displayed on the second liquid crystal display element 81 can be clearly recognized.

In the sixth to eighth embodiments, it is described about the case where the first illuminating portion 26 of the light guide plate 24 is configured to form the concavo-convex portion 28 on the lower surface of the light guide plate 24, however, it is not limited thereto. For example, the concavo-convex portion 28 may be formed on the upper surface of the light guide plate 24 as the second modification shown in FIGS. 10 and 11, or a plurality of line-shaped prisms 32 may be arranged on the lower surface of the light guide plate 24 as the third modification shown in FIGS. 12 and 13.

In the above described sixth to eighth embodiments, the prisms 29 of the second illuminating portion 27 of the light guide plate 24 is provided to be approximately perpendicular to the line connecting the light emitting element 23 and a portion of the side surface of the light guide plate 24 which faces the light emitting element 23, that is, the line connecting 12 o'clock and 6 o'clock, however, it is not limited thereto. For example, as described in the second embodiment shown in FIGS. 14–18 or the fourth embodiment shown in FIGS. 23–25, the prisms 36, 54 of the second illuminating portions 35, 53 may be provided to be approximately in parallel with the line connecting 12 o'clock and 6 o'clock, and the reflection surfaces thereof 36a, 54a may be provided to face the 9 o'clock side or the 3 o'clock side. In this case, the side surface reflection portions 37, 52 are provided on the side surface which is located between 6 o'clock to 9 o'clock or 3 o'clock to 6 o'clock of the light guide plate 24.

As described in the third embodiment shown in FIGS. 19–22, the first illuminating region 41 may comprise the first prisms 43 and the first side surface reflection portion 44 and the second illuminating region 42 may comprise the second prisms 45 and the second side surface reflection portion 46 by dividing the second illuminating portion 40 into the first and second illuminating regions 41, 42.

Further, in the sixth to eighth embodiments, it is described about the case where the light emitting element 23 is provided at a position which is located to the 12 o'clock side, however, it is not limited thereto. For example, as described in the fourth embodiment shown in FIGS. 23–25 or the fifth embodiment shown in FIGS. 26–29, the first light emitting elements 50, 62 and the second light emitting elements 51, 63 may be provided at positions which are located to the 12 o'clock and 6 o'clock.

In the first to eighth embodiments and each of the modifications, it is described about the case where the present invention is applied to a wristwatch or a cellular phone. However, it is not limited thereto. For example, the present invention can be widely applied to various types of electronic equipment such as a personal digital assistance, an electronic dictionary, a mobile computer, a personal computer, a printing machine or the like, various types of equipment such as a gauge for automobile, or each component thereof.

[Ninth Embodiment]

The ninth embodiment in which the present invention is applied to a wristwatch will be explained below referring to FIGS. 39–42.

Figure 39:
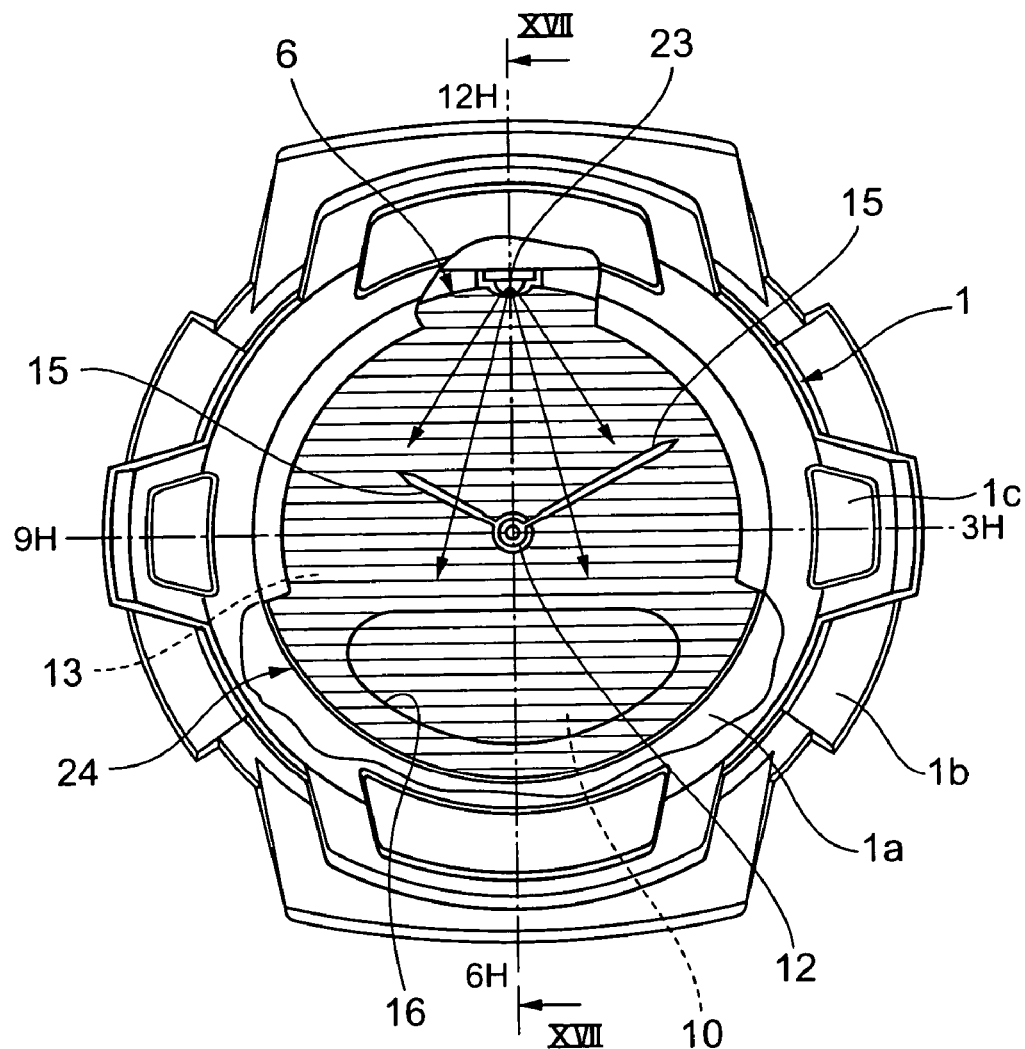
FIG. 39 is a front view showing the ninth embodiment in which the present invention is applied to a wristwatch.
Figure 40:
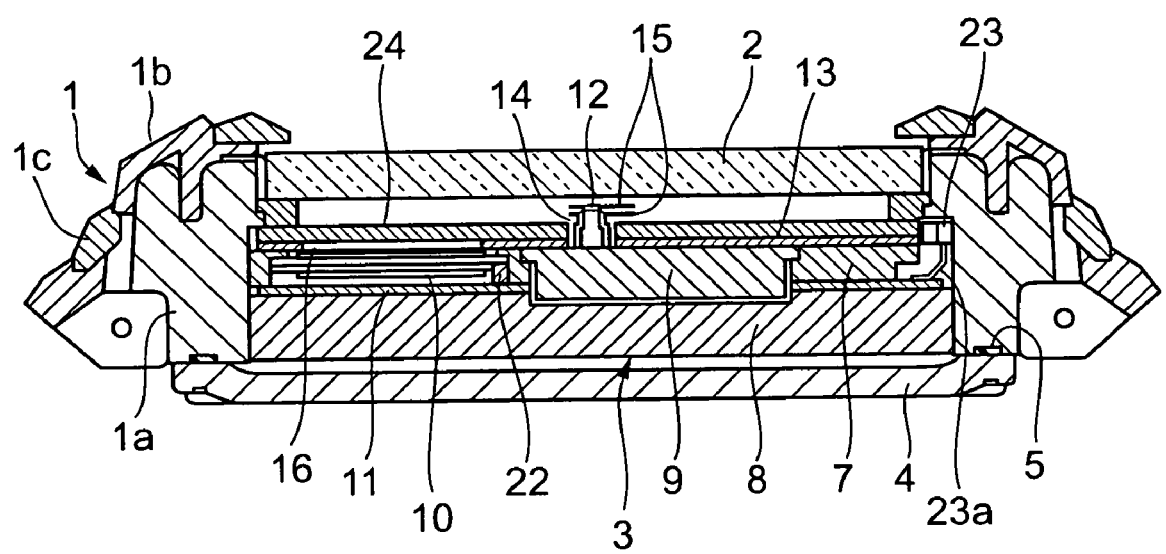
FIG. 40 is an expanded sectional view taken along the line XVII—XVII in FIG. 39.

FIG. 39 is a front view of the wristwatch in the present invention, FIG. 40 is an expanded sectional view of FIG. 1 taken along the line XVII—XVII. As shown in FIGS. 39 and 40, the wristwatch comprises the wristwatch case 1. The wristwatch case 1 is configured to be provided with the first and second bezels 1b, 1c made of synthetic resin on the outer peripheral surface of the case body 1a made of metal. The watch glass 2 is attached to the upper portion of the wristwatch case 1, and the watch module 3 is contained inside the wristwatch case 1. The back lid 4 is attached to the lower portion of the wristwatch case 1 through a waterproof ring 5.

The watch module 3 is configured to have both of an analogue function and a digital function as well as the illumination device 6. That is, as shown in FIG. 40, the watch module 3 comprises the upper housing 7 and the lower housing 8, the upper housing 7 is provided with the analogue movement 9 and the liquid crystal display element 10, and the circuit board 11 is provided between the upper housing 7 and the lower housing 8. In this case, various types of electronic components (not shown) which make up an electronic circuit for electrically driving the analogue movement 9, the liquid crystal display element 10 and the illumination device 6 are mounted on the circuit board 11.

Figure 41:
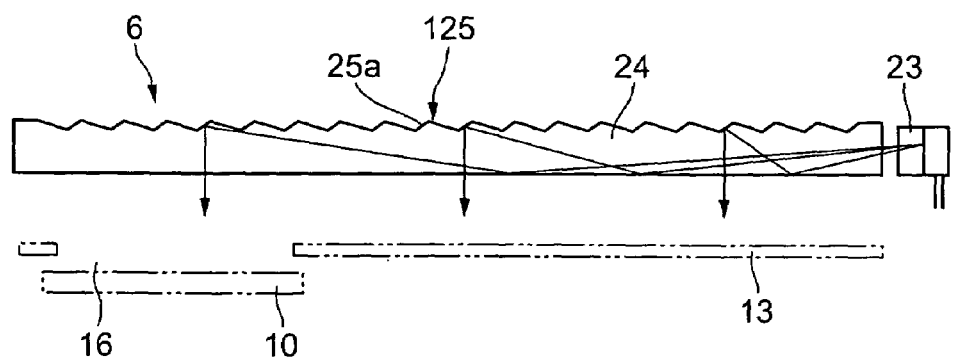
FIG. 41 is an expanded sectional view of a light guide plate taken along the line XVII—XVII in FIG. 39.

In the analogue movement 9, as shown in FIG. 40, the hand shaft 12 thereof protrudes upward through each through hole 14 of the light guide plate 24 of the dial 13 and the illumination device 6 to be hereinafter described which are disposed in the upper side of the upper housing 7, the hands 15 such as a minute hand and a second hand are attached to the upper end of the protruded hand shaft 12, and these hands 15 move above the dial 13. In this case, the dial 13 is formed of metal or synthetic resin. As shown in FIGS. 40 and 41, the opening portion 16 is provided at predetermined position corresponding to the liquid crystal display element 10. A hand display portion comprises the dial 13 and the hands 15, which corresponds to a portion of the display member.

Figure 42:
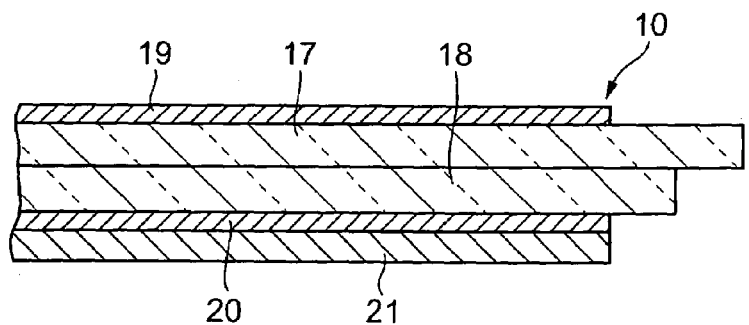
FIG. 42 is an expanded sectional view of a main portion showing a liquid crystal display element of FIG. 40.

As shown in FIG. 42, the liquid crystal display element 10 is of a reflection type, which comprises an enclosed liquid crystal (not shown) sandwiched between a pair of transparent upper and lower electrode substrates 17, 18, the polarizers 19, 20 are provided on the upper surface of the upper electrode substrate 17 and the lower surface of the lower electrode substrate 18, respectively, and the reflection plate 21 is provided on the lower surface of the polarizer 20. As shown in FIG. 40, the end of the upper electrode substrate 17 is supported in a state of being electrically connected to the circuit board 11 by the interconnector 22. In this state, voltage is selectively applied between the pair of upper and lower electrode substrates 17, 18 to electrooptically display information such as time. The liquid crystal display element 10 corresponds to a portion of the display member which comprises the liquid crystal display element 10 and the above described hand display portion.

As shown in FIGS. 39–41, the illumination device 6 comprises the light emitting element 23 as a light source and the light guide plate 24 for receiving light emitted from the light emitting element 23 from the side surface to guide the light in the surface direction. The light emitting element 23 comprises a light emitting diode (LED) or the like which emits light in the visible light range and is disposed corresponding to a portion located in 12 o'clock side on the side surface of the light guide plate 24, and the lead wire 23a thereof is electrically connected to the circuit board 11 as shown in FIGS. 39–41. The light guide plate 24 formed of transparent a material makes the light pass through in a thickness direction thereof or in up-and-down directions, and also, receives light from the light emitting element 23 from the side surface to guide the light in the surface direction for performing the surface emission. The lower surface side of the light guide plate 24 is illuminated by the surface-emitted light. The light guide plate 24 is disposed on the dial 13.

That is, as shown in FIGS. 39–41, a plurality of the line-shaped prisms 125 are arranged on the whole area of the upper surface of the light guide plate 24. As shown in FIG. 39, the prisms 125 are provided to be perpendicular to the diagonal line connecting the light emitting element 23 and a portion of the side surface of the light guide plate 24 which faces the light emitting element 23, that is, the line connecting 12 o'clock and 6 o'clock. The reflection surfaces 25a of the prisms 125 are provided to face the direction of the line connecting 12 o'clock and 6 o'clock, that is, one of the 12 o'clock side and the 9 o'clock side (the 12 o'clock side (right side in FIG. 40) in the ninth embodiment as shown in FIG. 40, in which the light emitting element 23 is disposed).

Therefore, the light which enters the light guide plate 24 and is guided in the light guide plate 24 is reflected toward the lower surface side of the light guide plate 24. In this case, it is preferable that the pitch of the prisms 125 is gradually narrowed as it departs from the light emitting element 23 or the 12 o'clock side to radiate the light from the light emitting element 23 approximately equally toward the lower surface side of the light guide plate 24.

According to the wristwatch, the external light enters the wristwatch case 1 through the watch glass 2 in the bright place, and this external light is radiated to the hands 15 and the light guide plate 24. The external light is also radiated to the dial 13 by passing through the light guide plate 24. Thus, time can be recognized by the hands 15 and the dial 13. The external light radiated to the dial 13 is reflected from the dial 13 to be radiated to the lower surface of the light guide plate 24, and this radiated light passes through the light guide plate 24 to be radiated to the upper surface thereof. Therefore the hands 15 are illuminated, so that time can be recognized more clearly.

The external light is also radiated to the opening portion 16 of the dial 13, so that the external light directly passes through the opening portion 16 of the dial 13 to be radiated to the liquid crystal display element 10. Thus, the liquid crystal display element 10 can be illuminated. Therefore, information such as time or the like displayed on the liquid crystal display element 10 can be recognized. That is, when the external light is radiated to the liquid crystal display element 10, the external light passes through the polarizer 19, the upper and lower electrode substrates 17, 18, and the polarizer 20 to be reflected from the reflection plate 21. This reflected light passes through a light path which is opposite to the above, and is radiated to the light guide plate 24 from the lower surface side through the opening portion 16 of the dial 13 again. This radiated light passes through the light guide plate 24 to be radiated upward. Thus, information such as time or the like displayed on the liquid crystal display element 10 through the watch glass 2 can be recognized from outside of the wristwatch case 1.

When making the light emitting element 23 emit light in the dark place, the light from the light emitting element 23 enters the light guide plate 24 from the side surface and is guided in the surface direction in the light guide plate 24. This guided light is reflected from the reflection surfaces 25a of each prism 125 of the light guide plate 24 toward the lower surface side of the light guide plate 24 to perform the surface emission from the whole light guide plate 24, and this surface-emitted light is radiated to the lower surface side of the light guide plate 24. Thus, the dial 13 disposed in the lower side of the light guide plate 24 and the liquid crystal display element 10 which corresponds to the opening portion 16 of the dial 13 can be illuminated by this radiated light.

The light radiated to the dial 13 is reflected from the dial 13 and passes through the light guide plate 24 from the lower surface side to the upper surface side, and the light which passes through the light guide plate 24 illuminates the hands 15 which move above the light guide plate 24. Thus, time can be recognized by the dial 13 and the hands 15 even in the dark place. The light radiated to the liquid crystal display element 10 enters the liquid crystal display element 10 as above described, and this entered light is reflected from the reflection plate 21 of the liquid crystal display element 10. This reflected light is radiated from the upper surface of the liquid crystal display element 10, and passes through the opening portion 16 of the dial 13 and the light guide plate 24. Thus, information displayed on the liquid crystal display element 10 can be recognized even in the dark place.

According to the wristwatch, when making the light emitting element 23 emit light in the dark place, the light is guided in the surface direction in the light guide plate 24, and this guided light is reflected from the reflection surfaces 25a of the prisms 125 of the light guide plate 24 toward the lower surface side of the light guide plate 24 to perform the surface emission from the whole light guide plate 24. This surface-emitted light can illuminate the dial 13 and the liquid crystal display element 10 disposed in the lower side of the light guide plate 24 approximately equally. Therefore, information such as time can be recognized in both of the bright and dark places.

Since the pitch of the prisms 125 of the light guide plate 24 is gradually narrowed as it departs from the light emitting element 23, the light guided in the light guide plate 24 can be radiated toward the lower surface side of the light guide plate 24 approximately equally. Therefore, the surface emission can be performed from the whole light guide plate 24 with approximately equal brightness. Thus, the dial 13 and the liquid crystal display element 10 can be equally illuminated as a whole. Since the dial 13 is illuminated from the upper surface side by the light guide plate 24, a material of the dial 13 is not limited. Thus, various kinds of materials such as a material with a light transmission property or a material with no light transmission property can be employed.

Figure 43:
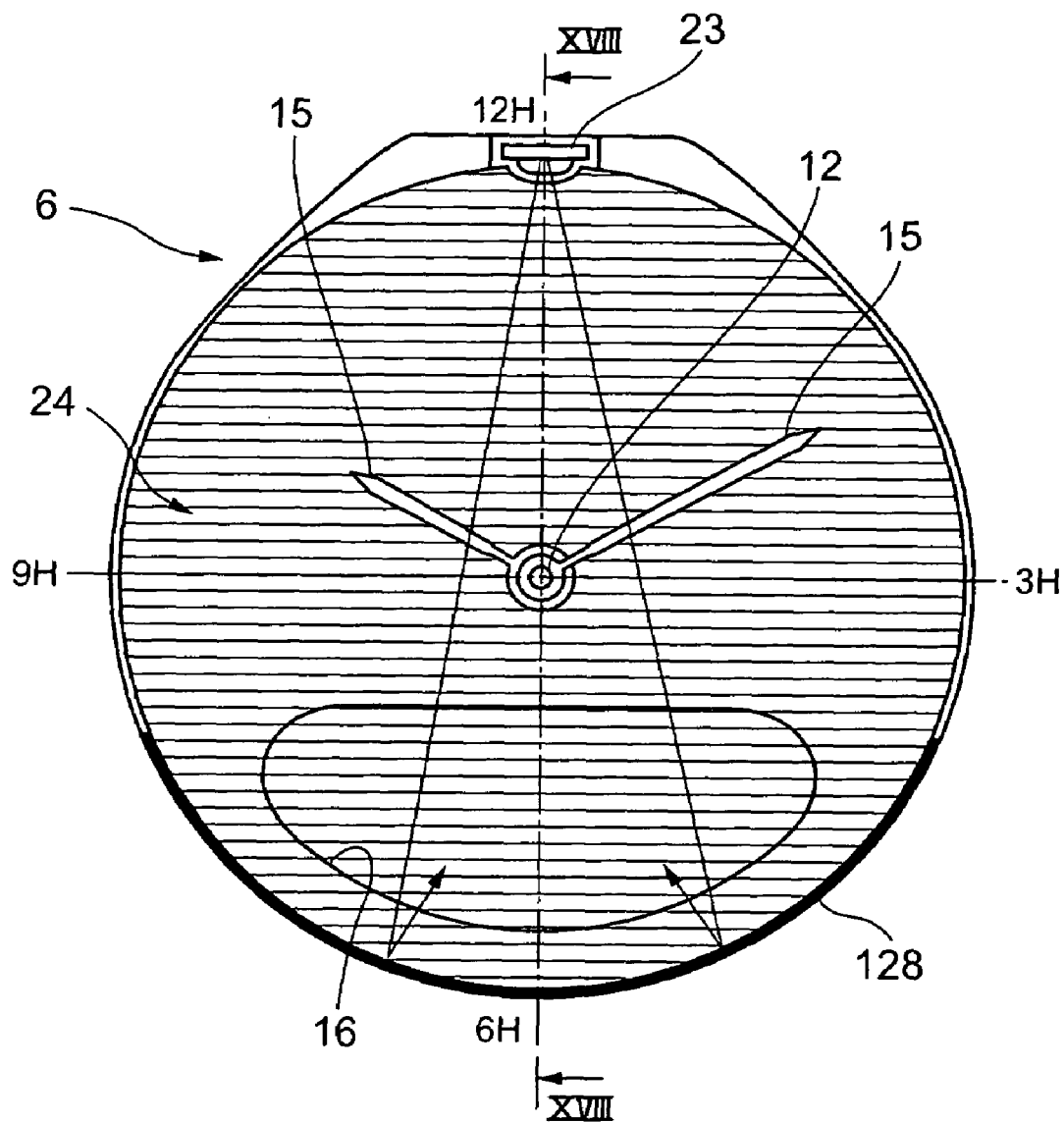
FIG. 43 is an expanded front view of a watch module showing a first modification of the ninth embodiment.

In the ninth embodiment, it is described about the case where the reflection surfaces 25a of the prisms 125 formed on the whole upper surface of the light guide plate 24 are provided to face the 12 o'clock side. However it is not limited thereto. For example, as the first modification according to the ninth embodiment shown in FIGS. 43–45, prisms 127 may be formed to be approximately perpendicular to the diagonal line connecting the light emitting element 23 and a portion of the side surface of the light guide plate 24 which faces the light emitting element 23, that is, the line connecting 12 o'clock and 6 o'clock on the whole upper surface of the light guide plate 24, and reflection surfaces 27a of the prisms 127 may be provided to face the opposite side of the light emitting element 23, that is, the 6 o'clock side (left side in FIG. 45). In this case, as shown in FIG. 43, a side surface reflection portion 128 is provided at a portion of the 6 o'clock side on the side surface of the light guide plate 24, for example, at a portion on the side surface of the light guide plate 24 from 4 o'clock to 8 o'clock through 6 o'clock. It is preferable that the pitch of the prisms 127 is gradually narrowed as it departs from the side surface reflection portion 128 or the 6 o'clock.

In this configuration in the first modification, when the light from the light emitting element 23 enters the light guide plate 24 to be guided in the surface direction, the light is hardly reflected from the reflection surfaces 27*a* of the prisms 127 and is guided in the surface direction in the light guide plate 24. When this guided light reaches the side surface of the light guide plate 24 and is reflected from the side surface reflection portion 128 of the light guide plate 24, the reflected light is guided to the light guide plate 24 again to be reflected from the reflection surfaces 27*a* of the prisms 127 toward the lower surface side of the light guide plate 24. Thus, the light which leaks from the side surface of the light guide plate 24 can be reduced. Moreover, as with the ninth embodiment, the surface emission is performed from the whole light guide plate 24, so that the dial 13 disposed in the lower surface side of the light guide plate 24 and the liquid crystal display element 10 can be equally illuminated as a whole.

[Tenth Embodiment]

The tenth embodiment in which the present invention is applied to a wristwatch will be explained below referring to FIGS. 46–49. The constituent elements similar to those of FIGS. 39–42 in the ninth embodiment are designated by the same reference numerals for explanation.

Figure 46:
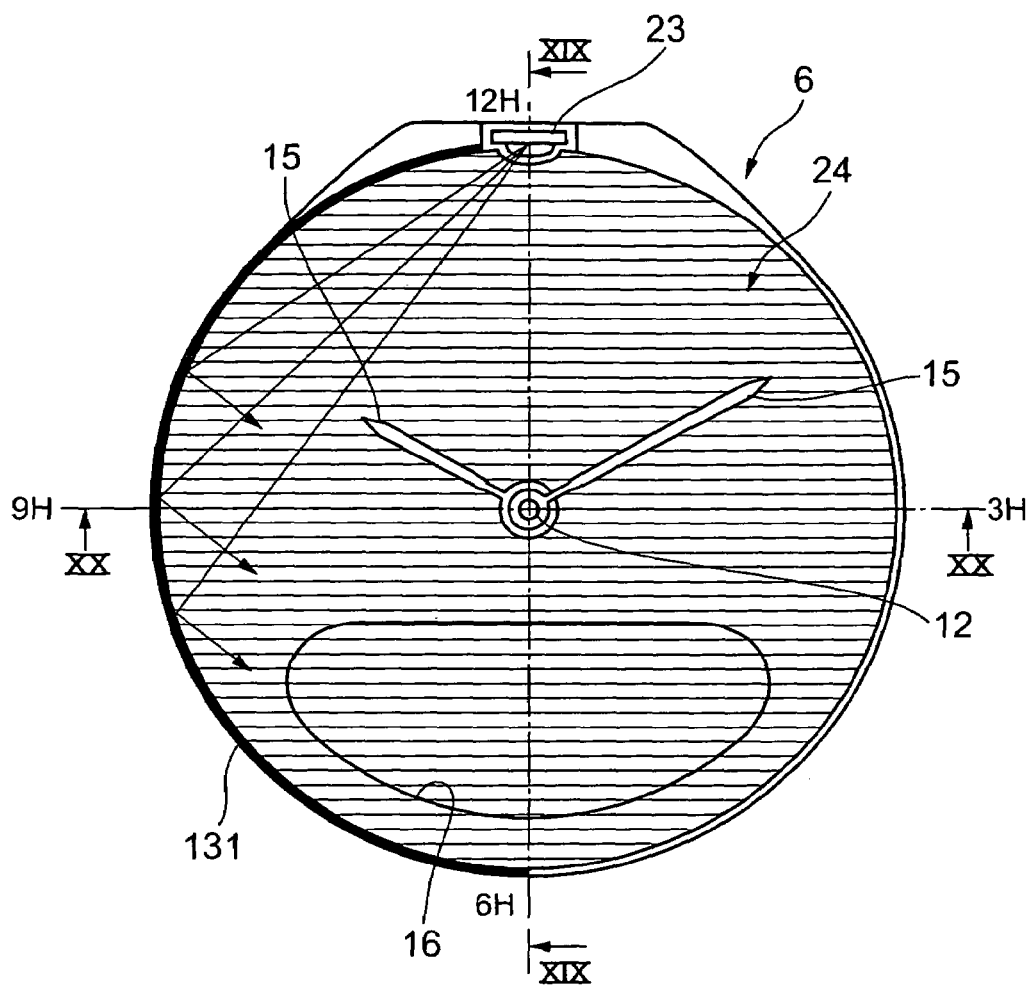
FIG. 46 is an expanded front view of a watch module in the tenth embodiment in which the present invention is applied to a wristwatch.
Figure 47:
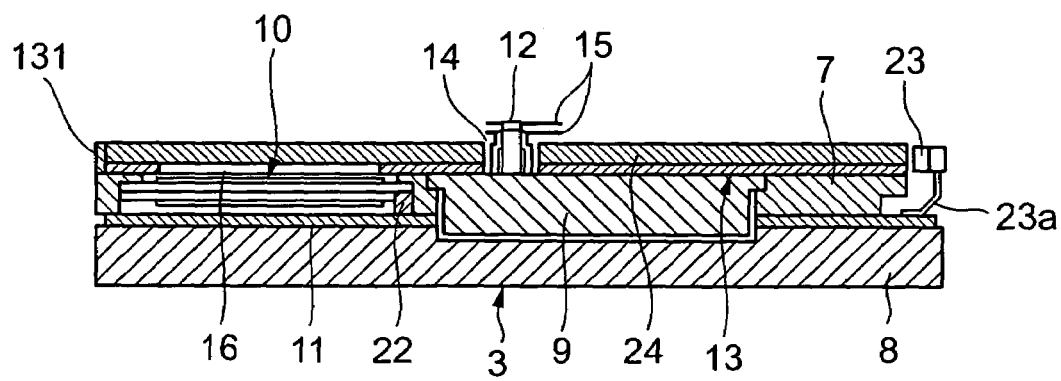
FIG. 47 is an expanded sectional view of a watch module taken along the line XIX—XIX in FIG. 46.

The wristwatch has substantially the same configuration as the ninth embodiment excluding the configuration of prisms 130 which are arranged on the whole upper surface of the light guide plate 24 of the of the illumination device 6. That is, the prisms 130, as shown in FIG. 46, are provided to be approximately in parallel with the diagonal line connecting the light emitting element 23 and a portion of the side surface of the light guide plate 24 which faces the light emitting element 23, that is, the line connecting 12 o'clock and 6 o'clock.

Figure 48:
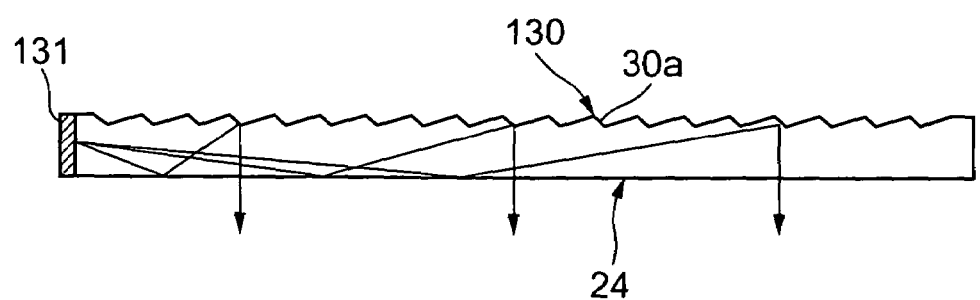
FIG. 48 is an expanded sectional view of a light guide plate taken along the line XX—XX in FIG. 46.

Reflection surfaces 30*a* of the prisms 130 are provided in the direction which is approximately perpendicular to the line connecting 12 o'clock and 6 o'clock, that is, one of the 3 o'clock side and the 9 o'clock side (the 9 o'clock side (left side in FIG. 48) in the tenth embodiment as shown in FIG. 48). Therefore, the light guided from the 9 o'clock side toward the light guide plate 24 is reflected toward the lower surface side of the light guide plate 24. In this case, it is preferable that the pitch of the prisms 130 is gradually narrowed as it departs from the side surface reflection portion 131 side to be hereinafter described or the 9 o'clock side to radiate the light which is reflected from the side surface reflection portion 131 and guided in the light guide plate 24 approximately equally toward the lower surface side of the light guide plate 24.

In the light guide plate 24, the light which enters the light guide plate 24 from the light emitting element 23 and is guided in the surface direction is hardly reflected from the reflection surfaces 30*a* of the prisms 130 to be directly guided in the surface direction. Therefore, the side surface reflection portion 131 is provided on the side surface of the light guide plate 24. As shown in FIG. 46, the side surface reflection portion 131 is provided at a portion on the side surface of the light guide plate 24 from 12 o'clock to 6 o'clock through 9 o'clock. As shown in FIGS. 46 and 48, when the light from the light emitting element 23 is guided in the light guide plate 24 to reach the end surface of the light guide plate 24, this light is reflected toward the inside of the light guide plate 24. In this case, since the light guide plate 24 is formed in approximately disk shape, the side surface reflection portion 131 is formed in approximately semi circular arc shape on the side surface of the light guide plate 24. Therefore, the light which is radiated from the light emitting element 23 to the inside of the light guide plate 24 and reaches the light guide plate 24 is reflected from the side surface reflection portion 131 as approximately parallel beam.

According to the wristwatch, as with the ninth embodiment, the external light is radiated to the hands 15 and the light guide plate 24 in the bright place, and this radiated external light passes through the light guide plate 24 to be radiated to the dial 13 and also, radiated to the liquid crystal display element 10 through the opening portion 16 of the dial 13. Thus, time can be recognized by the hands 15 and the dial 13, and information displayed on the liquid crystal display element 10 can be recognized. When making the light emitting element 23 emit light in the dark place, the light from the light emitting element 23 is guided in the surface direction in the light guide plate 24. This guided light is hardly reflected from the reflection surfaces 30*a* of each prism 130 of the light guide plate 24 to be directly guided in the light guide plate 24 in the surface direction.

Since the prisms 130 of the light guide plate 24 are provided to be approximately in parallel with the line connecting the light emitting element 23 and a portion of the side surface of the light guide plate 24 which faces the light emitting element 23, that is, the line connecting 12 o'clock and 6 o'clock, the light guided in the light guide plate 24 is hardly reflected from the reflection surfaces 30*a* of the prisms 130, and is directly guided in the light guide plate 24. When this guided light reaches the side surface of the light guide plate, as shown in FIGS. 46 and 48, this light is reflected from the side surface reflection portion 131 provided on the side surface of the light guide plate 24 to be guided into the light guide plate 24 again. Since the side surface reflection portion 131 is formed in approximately semi circular arc shape on the side surface of the light guide plate 24 which is approximately a disk shape, the light which reaches the end surface of the light guide plate 24 is reflected from the side surface reflection portion 131 as approximately parallel beam toward the inside of the light guide plate 24.

When the light reflected from the side surface reflection portion 131 is guided into the light guide plate 24, the light is reflected from the reflection surfaces 30*a* of each prism 130 of the light guide plate 24 toward the lower surface side of the light guide plate 24. Thus, the surface emission is performed from the whole light guide plate 24, and this surface-emitted light is radiated to the lower surface side of the light guide plate 24. Accordingly, the dial 13 disposed in the lower side of the light guide plate 24 and the liquid crystal display element 10 which corresponds to the opening portion 16 of the dial 13 as a whole can be illuminated approximately equally by the radiated light. Therefore, time can be recognized by the dial 13 and the hands 15 even in the dark place, and information displayed on the liquid crystal display element 10 can be recognized.

Figure 49:
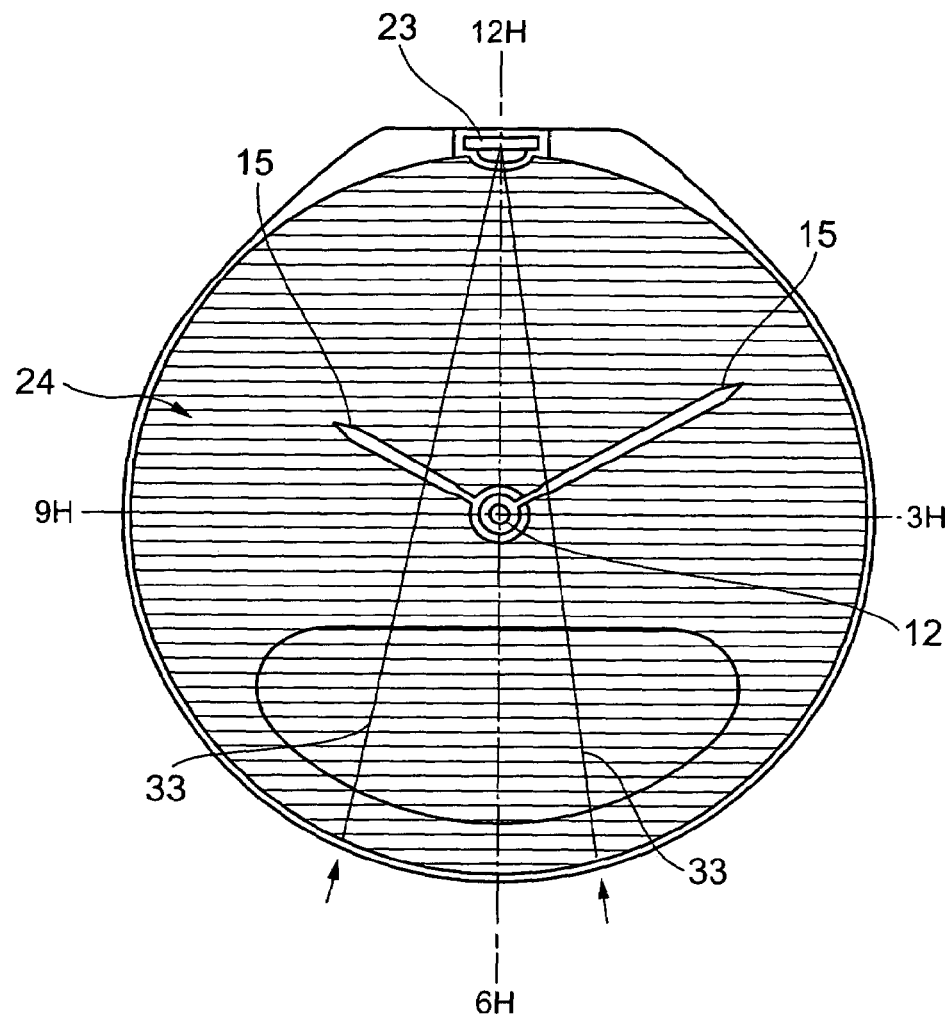
FIG. 49 is a view showing a state of generation of a bright line spectrum in the ninth embodiment of FIG. 39.

Since the light which enters the light guide plate 24 from the light emitting element 23 and is guided in the light guide plate 24 is not reflected from the prisms 130 of the light guide plate 24 to be directly guided in the surface direction, the bright line spectrums 33 as shown in FIG. 49 are not generated. That is, as the ninth embodiment shown in FIG. 39, if the prisms 125 on the upper surface of the light guide plate 24 are provided to be approximately perpendicular to the line connecting the light emitting element 23 and a portion of the side surface of the light guide plate 24 which faces the light emitting element 23, that is, the line connecting 12 o'clock and 6 o'clock, and the reflection surfaces 25*a* of the prisms 125 are provided to face the light emitting element 23 side or the 12 o'clock side, when the light from the light emitting element 23 enters the light guide plate 24 and is guided in the light guide plate 24, the light is reflected from the reflection surfaces 25a of each prism 125 toward the lower surface side of the light guide plate 24. Therefore, as shown in FIG. 49, when portions from which the light is reflected is seen from a traveling direction of the light, the portions are formed in a shape of dotted-lines and look as bright line spectrums 33. However, as the tenth embodiment, when the light which enters the light guide plate 24 from the light emitting element 23 and is guided in the light guide plate 24 is not reflected from the reflection surfaces 30a of the prisms 130 of the light guide plate 24 to be directly guided in the surface direction, the bright line spectrums 33 are not generated.

Accordingly, in the wristwatch, when making the light emitting element 23 emit light in the dark place, the light enters the light guide plate 24 from the side surface and is guided in the surface direction in the light guide plate 24. This guided light is hardly reflected from the reflection surfaces 30a of the prisms 130 of the light guide plate 24 and is directly guided in the surface direction. When this light reaches the end surface of the light guide plate 24, the light is reflected from the side surface reflection portion 131 to the inside of the light guide plate 24. Since this reflected light is reflected from the reflection surfaces 30a of each prism 130 toward the lower surface side of the light guide plate 24, the surface emission is performed from the whole light guide plate 24 to illuminate the dial 13 and the liquid crystal display element 10 disposed thereunder approximately equally as a whole. In this case, since the dotted-line shape bright line spectrums 33 as shown in FIG. 49 are not generated, information and time can be excellently recognized by the dial 13 and the liquid crystal display element 10 without being affected by the bright line spectrums 33.

Figure 50:
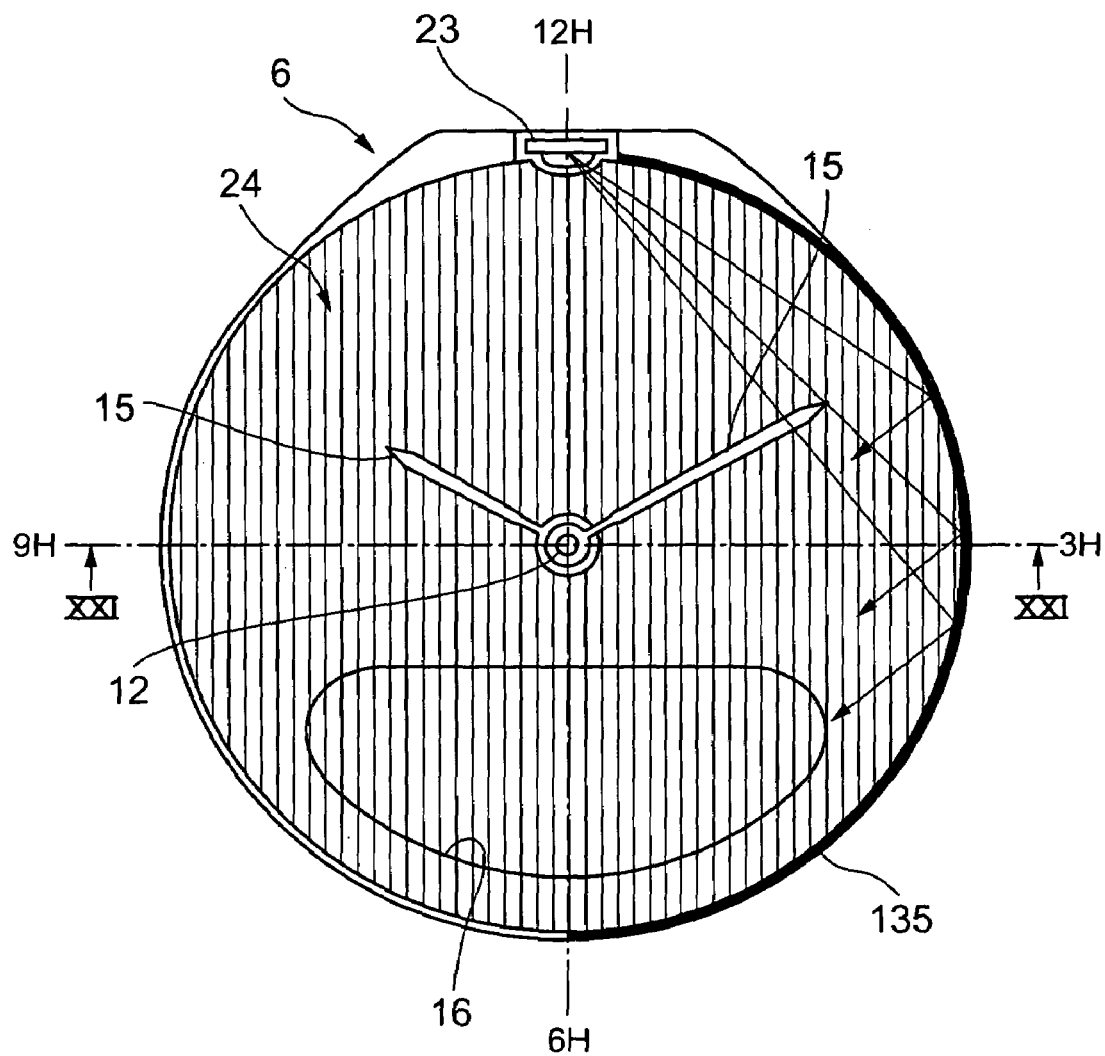
FIG. 50 is an expanded front view of a watch module showing a second modification of the tenth embodiment.
Figure 51:
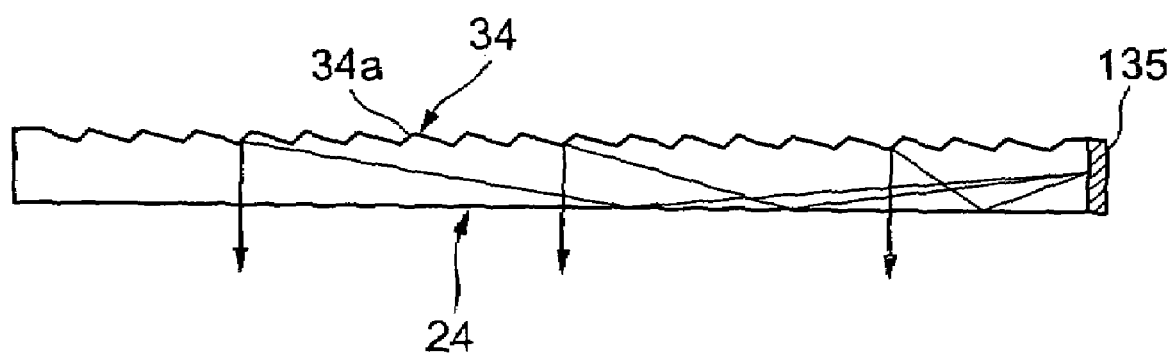
FIG. 51 is an expanded sectional view of a light guide plate taken along the line XXI—XXI in FIG. 50.

In the tenth embodiment, the prisms 130 are formed on the upper surface of the light guide plate 24 to direct the reflection surfaces 30a to the 9 o'clock side, and the side surface reflection portion 131 is provided at a portion on the side surface of the light guide plate 24 from 12 o'clock to 9 o'clock through 6 o'clock. However, it is not limited thereto. For example, as the second modification shown in FIGS. 50 and 51, the prisms 34 may be formed on the upper surface of the light guide plate 24 to direct the reflection surfaces 34a to the 3 o'clock side (right side in FIG. 51), and a side surface reflection portion 135 may be provided at a portion on the side surface of the light guide plate 24 from 12 o'clock to 6 o'clock through 3 o'clock. In this case, it is preferable that the pitch of the prisms 34 is gradually narrowed as it departs from the side surface reflection portion 135 side or the 3 o'clock side.

In this configuration in the second modification, when the light from the light emitting element 23 enters the light guide plate 24 and is guided in the surface direction, and this guided light reaches the side surface of the light guide plate 24 to be reflected from the side surface reflection portion 135, this reflected light is guided in the light guide plate 24 and is reflected from the reflection surface 34a of the prisms 34 toward the lower surface side of the light guide plate 24. Thus, as with the tenth embodiment, the bright line spectrums 33 are not generated, and the dial 13 and the liquid crystal display element 10 can be equally illuminated as a whole.

[Eleventh Embodiment]

The eleventh embodiment in which the present invention is applied to a wristwatch will be explained below referring to FIGS. 52–54. The constituent elements similar to those of FIGS. 46–49 in the tenth embodiment and FIGS. 50 and 51 in the second modification are designated by the same reference numerals for explanation.

In the wristwatch, the light guide plate 24 of the illumination device 6 is divided into a first illuminating region 136 and a second illuminating region 137. The rest of the configuration of the wristwatch is substantially the same as that in the tenth embodiment and the second modification. The light guide plate 24 is divided by the diagonal line connecting the light emitting element 23 and a portion of the side surface of the light guide plate 24 which faces the light emitting element 23, that is, the line connecting 12 o'clock and 6 o'clock as a boundary. The first illuminating region 136 is formed on the 9 o'clock side, and the second illuminating region 137 is formed on the 3 o'clock side.

The first illuminating region 136 comprises first prisms 138 formed on the upper surface of the light guide plate 24 and a first side surface reflection portion 39 provided on the side surface of the light guide plate 24. As shown in FIG. 52, the first prisms 138 are provided to be approximately in parallel with the diagonal line connecting the light emitting element 23 and a portion of the side surface of the light guide plate 24 which faces the light emitting element 23, that is, the line connecting 12 o'clock and 6 o'clock, and the reflection surfaces 38a thereof are provided on the 9 o'clock side (left side in FIG. 54) as shown in FIG. 54. Therefore, the light which is guided from the 9 o'clock side to the light guide plate 24 is reflected toward the lower surface side of the light guide plate 24. In this case, it is preferable that the pitch of the first prisms 138 is gradually narrowed as it departs from the first side surface reflection portion 39 side or the 9 o'clock side. The first side surface reflection portion 39 is provided at a portion on the side surface of the light guide plate 24 from 12 o'clock to 6 o'clock through 9 o'clock as with the tenth embodiment. When the light from the light emitting element 23 is guided in the surface direction in the light guide plate 24 and reaches the end surface of the light guide plate 24, the first side surface reflection portion 39 reflects the light toward the inside of the light guide plate 24.

The second illuminating region 137 comprises second prisms 140 formed on the upper surface of the light guide plate 24 and a second side surface reflection portion 141 provided on the side surface of the light guide plate 24. As shown in FIG. 52, the second prisms 140 are provided to be approximately in parallel with the diagonal line connecting the light emitting element 23 and a portion of the side surface of the light guide plate 24 which faces the light emitting element 23, that is, the line connecting 12 o'clock and 6 o'clock, and the reflection surfaces 40a thereof are provided on the 3 o'clock side (right side in FIG. 54) as shown in FIG. 54. Therefore, the light guided from the 3 o'clock side to the light guide plate 24 is reflected toward the lower surface side of the light guide plate 24. In this case, it is preferable that the pitch of the second prisms 140 is gradually narrowed as it departs from the second side surface reflection portion 141 side or the 3 o'clock side. The second side surface reflection portion 141 is provided at a portion on the side surface of the light guide plate 24 from 12 o'clock to 6 o'clock through 3 o'clock. When the light from the light emitting element 23 is guided in the surface direction in the light guide plate 24 and reaches the end surface of the light guide plate 24, the second side surface reflection portion 141 reflects the light toward the inside of the light guide plate 24.

According to the wristwatch, as with the tenth embodiment, the external light is radiated to the hands 15 and the light guide plate 24 in the bright place, and this radiated external light passes through the light guide plate 24 to be radiated to the dial 13 and also, radiated to the liquid crystal display element 10 through the opening portion 16 of the dial 13. Thus, time can be recognized by the hands 15 and the dial 13, and information displayed on the liquid crystal display element 10 can be seen.

When making the light emitting element 23 emit light in the dark place, the light from the light emitting element 23 is guided in the light guide plate 24 of the illumination device 6, and this guided light is directly guided in the surface direction in the first and second illuminating regions 136, 137. The light guided is reflected from the first and second side surface reflection portions 39, 141 of the first and second illuminating regions 136, 137, and this reflected light is reflected from the first and second prisms 138, 140 of the first and second illuminating regions 136, 137 toward the lower surface side. Accordingly, the dial 13 and the liquid crystal display element 10 can be illuminated.

Since the first and second prisms 138, 140 of the first and second illuminating regions 136, 137 of the light guide plate 24 are provided to be approximately in parallel with the diagonal line connecting the light emitting element 23 and a portion of the side surface of the light guide plate 24 which faces the light emitting element 23, that is, the line connecting 12 o'clock and 6 o'clock, as with the tenth embodiment, the light which enters the light guide plate 24 and is guided in the surface direction is directly guided in the surface direction in the first and second illuminating regions 136, 137. When this guided light reaches the end surface of the light guide plate 24, the light is reflected from the first and second side surface reflection portions 39, 141 provided on the side surface of the light guide plate 24. This reflected light is guided to the first and second illuminating regions 136, 137 of the light guide plate 24 again.

Figure 52:
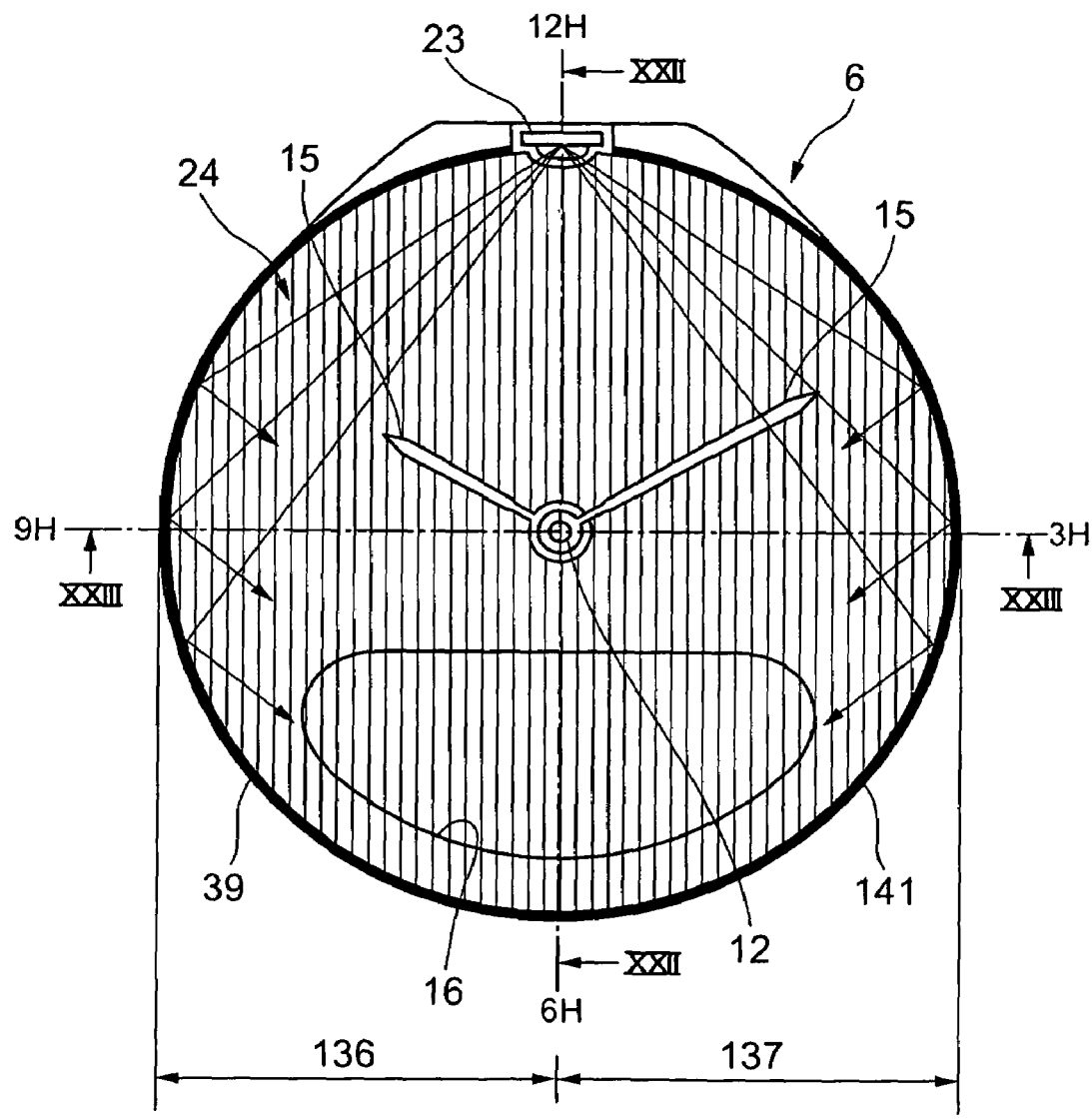
FIG. 52 is an expanded front view of a watch module in the eleventh embodiment in which the present invention is applied to a wristwatch.
Figure 53:
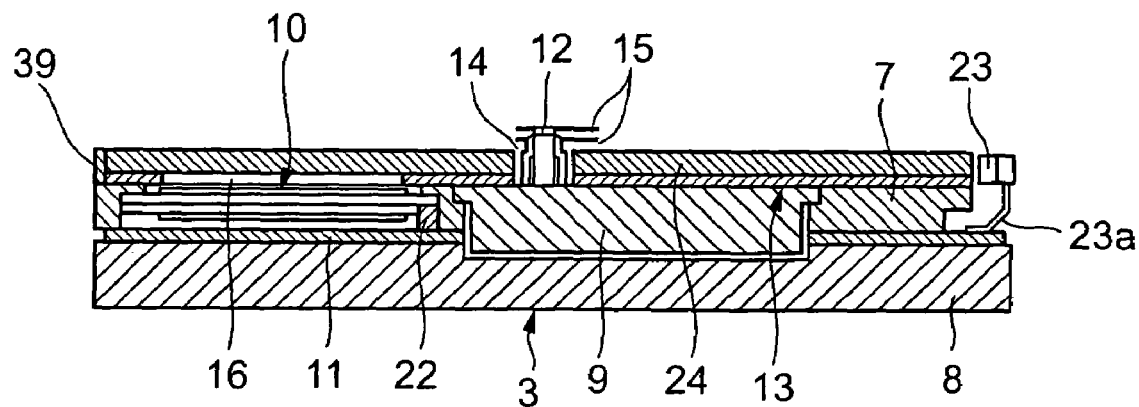
FIG. 53 is an expanded sectional view of a watch module taken along the line XXII—XXII in FIG. 52.
Figure 54:
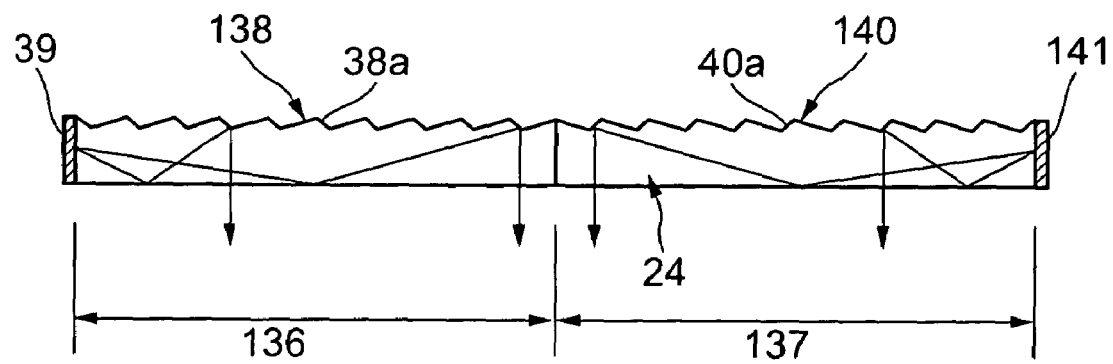
FIG. 54 is an expanded sectional view of a light guide plate taken along the line XXIII—XXIII in FIG. 52.
Figure 55:
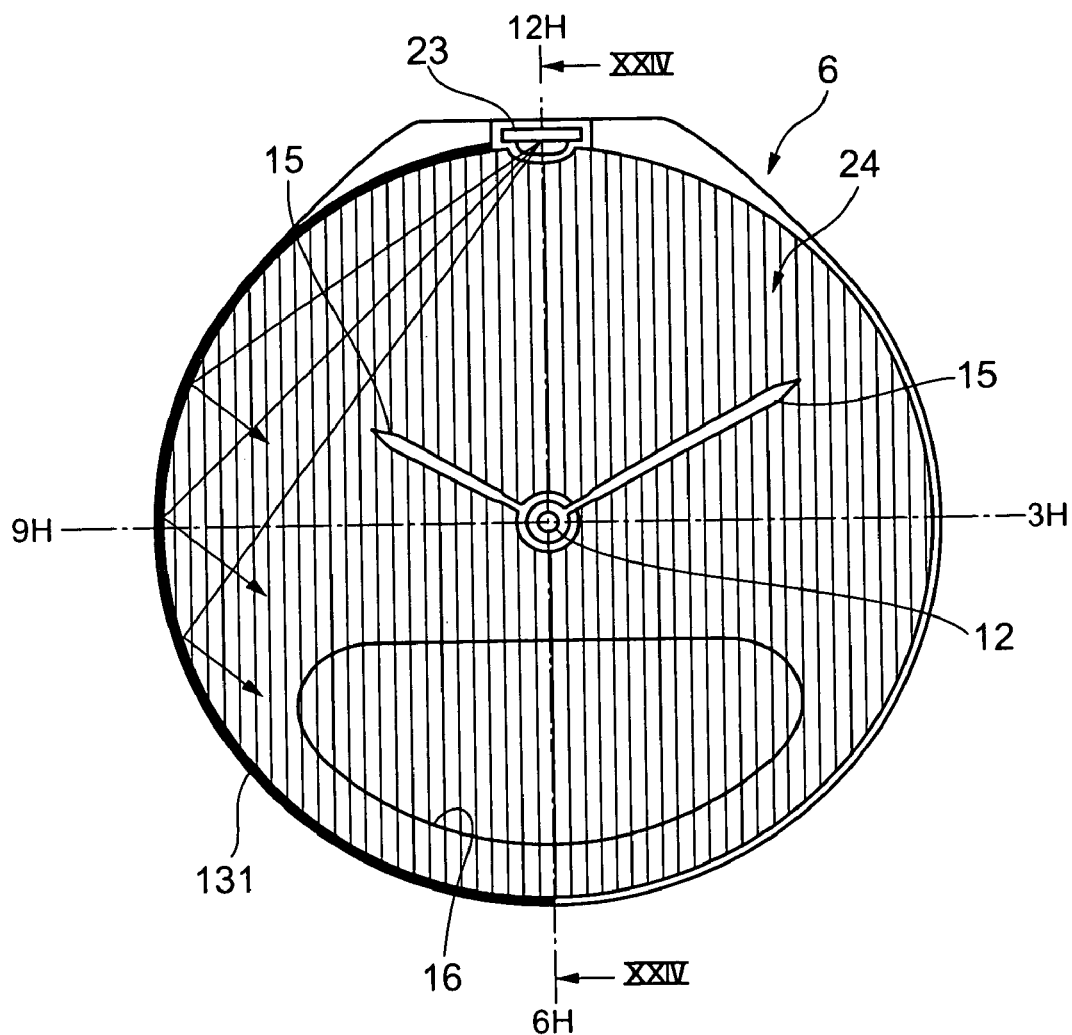
FIG. 55 is an expanded front view of a watch module in the twelfth embodiment in which the present invention is applied to a wristwatch.

As shown in FIGS. 52 and 54, since the reflection surfaces 38a of the first prisms 138 in the first illuminating region 136 are provided to face the 9 o'clock side, the light which is reflected from the first side surface reflection portions 39 provided at a portion on the side surface of the light guide plate 24 from 12 o'clock to 6 o'clock through 9 o'clock is guided to the first illuminating region 136. This guided light is reflected from the reflection surfaces 38a of the first prisms 138 toward the lower surface side of the light guide plate 24. Therefore, the surface emission is performed from the whole first illuminating region 136. Since the reflection surfaces 40a of the second prisms 140 are provided to face the 3 o'clock side in the second illuminating region 137, the light which is reflected from the second side surface reflection portions 141 provided at a portion on the side surface of the light guide plate 24 from 12 o'clock to 6 o'clock through 3 o'clock is guided to the second illuminating region 137. This guided light is reflected from the reflection surfaces 40a of the second prisms 140 toward the lower surface side of the light guide plate 24. Therefore, the surface emission is performed from the whole second illuminating region 137.

Since the light from the light emitting element 23 does not leak from the side surface of the light guide plate 24, the light from the light emitting element 23 can be effectively guided to the first and second illuminating region 136, 137 to perform surface emission brightly. When the surface emission is performed from each of the first and second illuminating regions 136, 137, the light is radiated to the dial 13 and the liquid crystal display element 10. Accordingly, the light from the light emitting element 23 can be radiated to the dial 13 and the liquid crystal display element 10 effectively in comparison with the tenth embodiment. Thus, the dial 13 and the liquid crystal display element 10 can be illuminated more brightly, and time, information or the like can be recognized even in the dark place. Since the first and second prisms 138, 140 are provided to be approximately in parallel with the diagonal line connecting the light emitting element 23 and a portion of the side surface of the light guide plate 24 which faces the light emitting element 23, that is, the line connecting 12 o'clock and 6 o'clock, as with the tenth embodiment, the bright line spectrums 33 are not generated. Thus, the dial 13 and the liquid crystal display element 10 can be recognized excellently without being affected by the bright line spectrums 33.

[Twelfth Embodiment]

The twelfth embodiment in which the present invention is applied to a wristwatch will be explained below referring to FIGS. 55–58. The constituent elements similar to those of FIGS. 46–49 in the tenth embodiment are designated by the same reference numerals for explanation.

Figure 56:
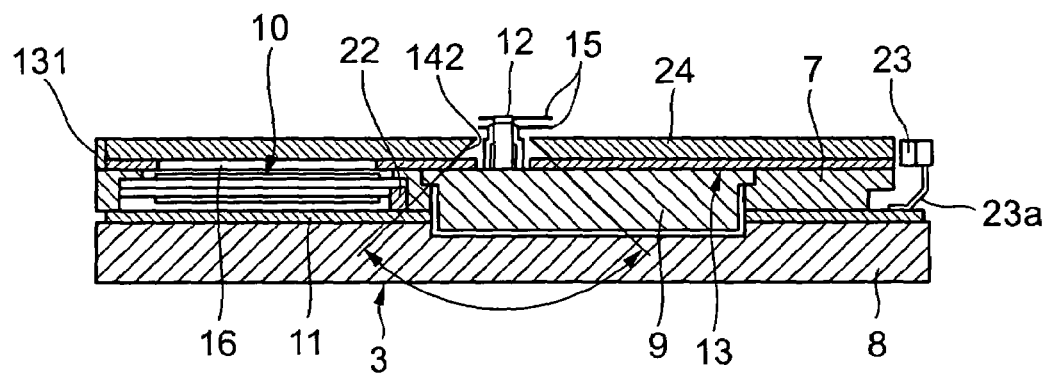
FIG. 56 is an expanded sectional view of a watch module taken along the line XXIV—XXIV in FIG. 55.
Figure 57:
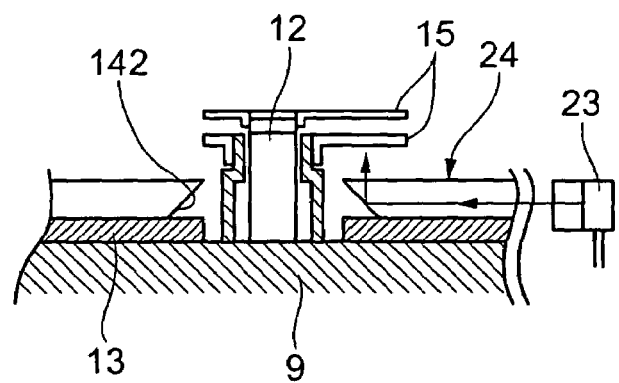
FIG. 57 is a sectional view of further expanded main portion in FIG. 56.

The wristwatch is configured to be provided with a conical through hole 142 in the light guide plate 24, through which the hand shaft 12 is inserted. The rest of the configuration of the wristwatch is substantially the same as that in the tenth embodiment. That is, the through hole 142 of the light guide plate 24 is formed in a conical shape which is wide in the lower surface side of the light guide plate 24 and is tapered toward the upper surface side thereof as shown in FIGS. 56 and 57. Therefore, the peripheral surface of the through hole 54 forms a tapered surface. As with the tenth embodiment, the prisms 130 formed on the upper surface of the light guide plate 24 is provided to direct the reflection surface 30a thereof to the 9 o'clock side of the light guide plate 24, and the side surface reflection portion 131 is provided at a portion on the side surface of the light guide plate 24 from 12 o'clock to 6 o'clock through 9 o'clock.

Figure 58:
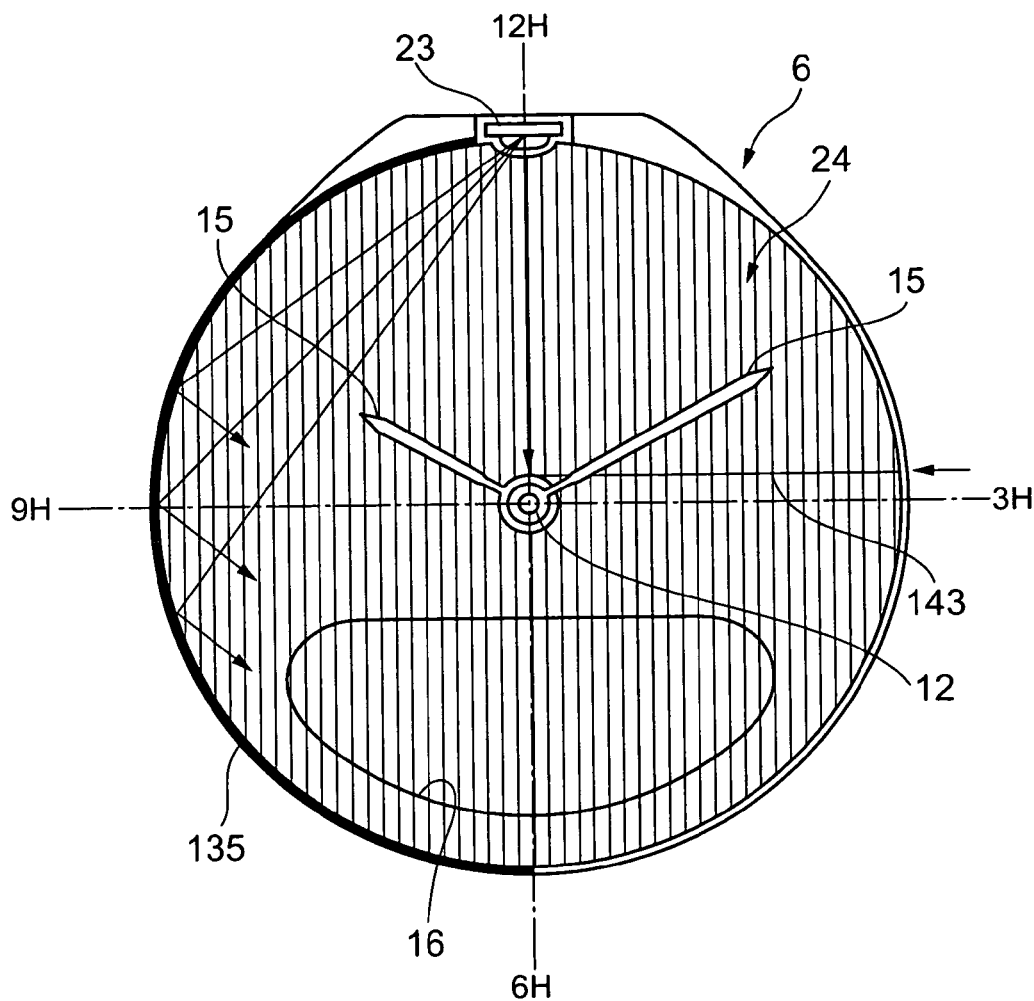
FIG. 58 is a view showing a state of generation of a bright line spectrum in FIG. 55.

According to the wristwatch, similar effect to that in the tenth embodiment can be obtained and also, specially, when the light which enters the light guide plate 24 from the light emitting element 23 and is guided in the light guide plate 24 is radiated to the peripheral surface of the through hole 142 to be reflected, the radiated light is reflected toward upward from the peripheral surface of the through hole 42 as shown in FIG. 57 because the peripheral surface of the through hole 142 forms a tapered surface. Therefore, it is prevented that the bright line spectrums 143 as shown in FIG. 58 are generated. That is, as the tenth embodiment shown in FIG. 47, if the through hole 142 of the light guide plate 24 is formed in a cylindrical shape, when the light which enters the light guide plate 24 from the light emitting element 23 and is guided in the light guide plate 24 is radiated to the peripheral surface of the through hole 14, the light is reflected in a direction which is perpendicular to a traveling direction of the light, that is, the 3 o'clock side denoting right side and the 9 o'clock side denoting left side directions of the light guide plate 24 from the peripheral surface thereof.

Therefore, as shown in FIG. 58, since the light reflected toward the 3 o'clock side is reflected from the reflection surfaces 30a of the prisms 130 toward the lower surface side of the light guide plate 24, when portions from which the light is reflected is seen from a traveling direction of the light, the portions are formed in a shape of dotted-lines and look as bright line spectrums 143. However, as in the twelfth embodiment, since the through hole 142 is formed in a conical shape, the light guided in the surface direction in the light guide plate 24 is not reflected toward the 3 o'clock side from the peripheral surface of the through hole 142. Thus, the bright line spectrums 143 are not generated, and the dial 13 and the liquid crystal display element 10 can be recognized excellently without being affected by the bright line spectrums 143.

Figure 59:
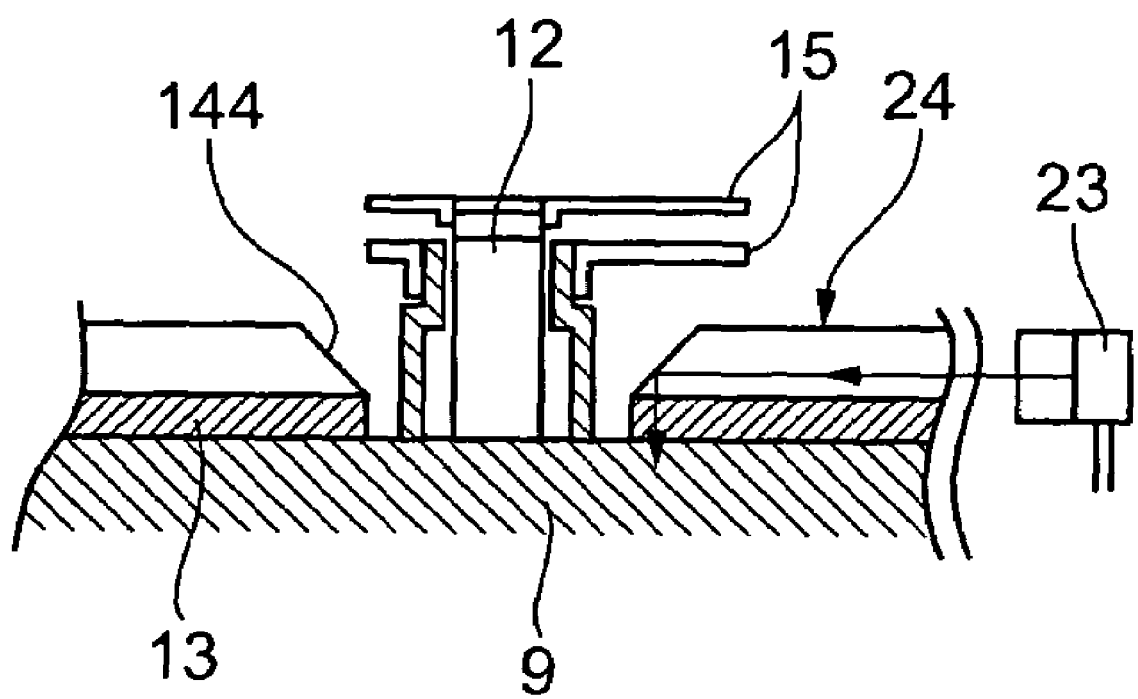
FIG. 59 is an expanded sectional view of a main portion showing a through hole in a light guide plate of a third modification in the twelfth embodiment.

In the above described twelfth embodiment, the through hole 142 of the light guide plate 24 is formed in a conical shape which is wide in the lower surface side of the light guide plate 24 and is tapered toward the upper surface side thereof, however, it is not limited thereto. For example, as shown in FIG. 59, the through hole 142 of the light guide plate 24 may be formed in an inverted conical shape which is wide in the upper surface side of the light guide plate 24 and is tapered toward the lower surface side thereof. In this case, the peripheral surface of the through hole 54 forms a tapered surface which is reverse to the above. In this configuration, as with the twelfth embodiment, since the light guided in the light guide plate 24 is reflected from the peripheral surface of the through hole 144 toward downward, the bright line spectrums 143 are not generated, and the dial 13 and the liquid crystal display element 10 can be recognized excellently without being affected by the bright line spectrums 143.

[Thirteenth Embodiment]

The thirteenth embodiment in which the present invention is applied to a wristwatch will be explained below referring to FIGS. 60–63. The constituent elements similar to those of FIGS. 46–49 in the tenth embodiment are designated by the same reference numerals for explanation.

In the wristwatch, the watch module 3 has an analogue function and the illumination device 6 which is provided with the first and second illuminating regions 145, 146 at a plurality of positions on the light guide plate 24 of the illumination device 6, and the first and second light emitting elements 47, 48 are provided to face portions located at 12 o'clock and 6 o'clock on the side surface of the light guide plate 24 of the illumination device 6, respectively. Other configuration is as same as that in the first embodiment.

Figure 60:
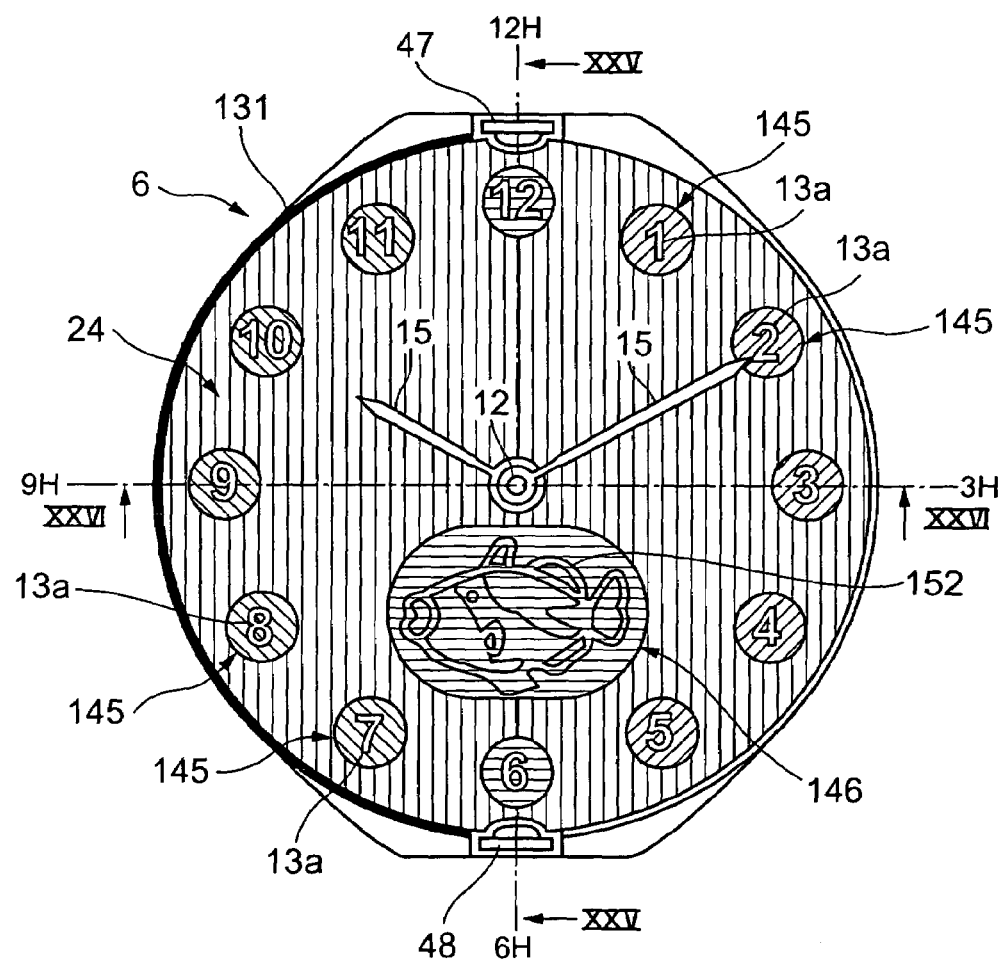
FIG. 60 is an expanded front view of a watch module in the thirteenth embodiment in which the present invention is applied to a wristwatch.
Figure 61:
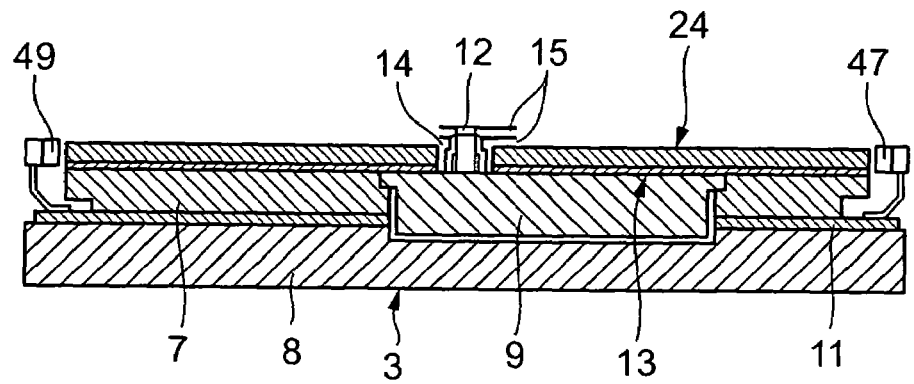
FIG. 61 is an expanded sectional view of a watch module taken along the line XXV—XXV in FIG. 60.

That is, in the watch module 3, as shown in FIG. 61, the upper housing 7 is provided with the analogue movement 9, the dial 13 is disposed on the whole area of the upper surface of the upper housing 7 to cover the analogue movement 9, and the light guide plate 24 of the illumination device 6 is disposed on the dial 13. On the outer periphery portion of the upper surface of the dial 13, the hour numerals 13a are provided corresponding to 1-12 o'clock as shown in FIG. 60. Both of the first and second light emitting elements 47, 48 of the illumination device 6 comprises a light emitting diode or the like which emits light in the visible ray region, and are configured to emit light with a color different to each other. For example, the first light emitting element 47 is configured to be provided at a position located at 12 o'clock and emit red light, and the second light emitting element 48 is configured to be provided at a position located at 6 o'clock and emit blue light.

As shown in FIG. 60, the light guide plate 24 of the illumination device 6 is provided with the prisms 130 which are same as that in the tenth embodiment on almost all the area excluding the plurality of positions of the upper surface of the light guide plate 24. The prisms 130 are approximately in parallel with the diagonal line connecting the first and the second light emitting elements 47, 48. Moreover, the first illuminating region 47 and the second illuminating region 48 are provided at the plurality of positions. The reflection surfaces 30a of the prisms 130 are provided to face the 9 o'clock side as with the tenth embodiment, thereby reflecting the light guided from the 9 o'clock side into the light guide plate 24 toward the lower surface side of the light guide plate 24. The side surface reflection portion 131 is provided at a portion on the side surface of the light guide plate 24 from 12 o'clock to 9 o'clock through 6 o'clock.

Figure 62:
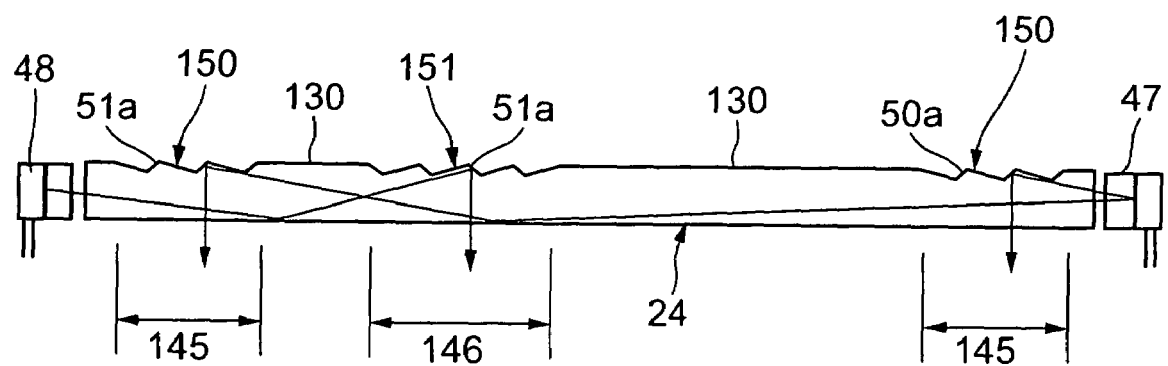
FIG. 62 is an expanded sectional view of a light guide plate taken along the line XXV—XXV in FIG. 60.
Figure 63:
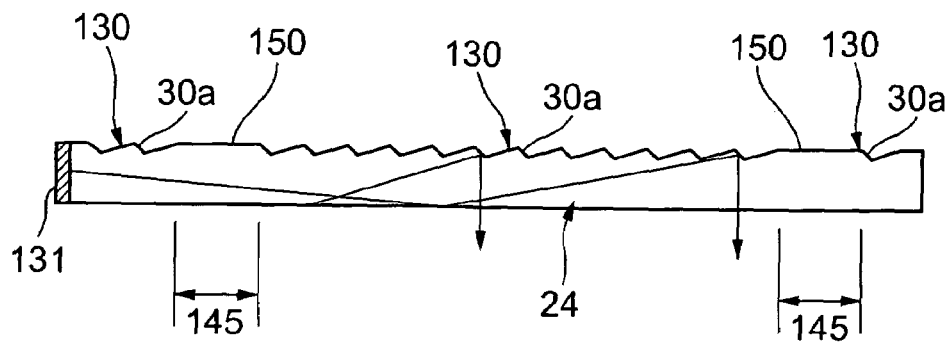
FIG. 63 is an expanded sectional view of a light guide plate taken along the line XXVI—XXVI in FIG. 60.

In the first illuminating region 145, first line-shaped prisms 150 shown in FIGS. 62 and 63 are formed at positions which correspond to each hour numeral 13a of the dial 13 on the upper surface of the light guide plate 24 as shown in FIG. 60. Each first prism 150 is provided in a direction perpendicular to the light radiated from the first light emitting element 47 as shown in FIG. 60, and the reflection surfaces 50a thereof are provided to face the first light emitting element 47 side or the 12 o'clock side (right side in FIG. 62) as shown in FIG. 62. Therefore, the light from the first light emitting element 47 is reflected toward the lower surface side.

In the second illuminating region 146, second line-shaped prisms 151 shown in FIG. 62 are formed at a portion between the hand shaft 12 on the upper surface of the dial 13 and the hour numeral 13a of 6 o'clock on the upper surface of the light guide plate 24 as shown in FIG. 60. Each second prism 151 is provided in a direction perpendicular to the light radiated from the second light emitting element 48 as shown in FIG. 60, and the reflection surfaces 51a thereof are provided to face the second light emitting element 48 side or the 6 o'clock side (left side in FIG. 62) as shown in FIG. 62. Therefore, the light from the second light emitting element 48 is reflected toward the lower surface side. As shown in FIG. 60, a decorative portion 152 such as a figure, drawing, symbol is provided at a portion corresponding to the second illuminating region 146 on the upper surface of the dial 13.

According to the wristwatch, as with the tenth embodiment, the external light enters the wristwatch case 1 through the watch glass 2 in the bright place, and this external light is radiated to the hands 15 and the light guide plate 24. Also this external light passes through the light guide plate 24 to be radiated to the dial 13. Thus, time can be recognized by the hands 15 and the dial 13, and the decorative portion 152 on the dial 13 can also be recognized. The external light radiated to the dial 13 is reflected from the dial 13 to be radiated to the lower surface of the light guide plate 24, and this radiated light passes through the light guide plate 24 to be radiated to the upper surface side. Therefore, the hands 15 are illuminated, so that time can be recognized more clearly.

When the first and second light emitting elements 47, 48 are made to emit light in the dark place, the light enters the light guide plate 24 and is guided in the surface direction. In the guided light, the light which reaches the end surface of the light guide plate 24 is reflected from the side surface reflection portion 131 provided at a portion on the side surface of the light guide plate 24 from 12 o'clock to 9 o'clock through 6 o'clock to be guided into the light guide plate 24 again. This guided light is reflected from the reflection surfaces 30a of each prism 130 of the light guide plate 24 toward the lower surface side of the light guide plate 24. Moreover, the light which enters the light guide plate 24 from the first and second light emitting elements 47, 48 and is guided in the surface direction is radiated toward the lower surface side of the light guide plate 24 in the first and second illuminating regions 145, 146. Therefore, the whole upper surface of the dial 13 including each hour numeral 13a and the decorative portion 152 on the dial 13 can be illuminated.

That is, light with a specific color, for example, red light emitted from the first light emitting element 47, is guided in the light guide plate 24, and the red light which reaches the end surface of the light guide plate 24 to be reflected from the side surface reflection portion 131 in the guided light is reflected from each prism 130 of the light guide plate 24 toward the lower surface side. Therefore, the upper surface of the dial 13 is illuminated with red color excluding each hour numerals 13a and the decorative portion 152. Moreover, the red light which enters the light guide plate 24 from the first light emitting element 47 and is guided in the light guide plate 24 is reflected from the first prisms 150 in the first illuminating region 145 toward the lower surface side of the light guide plate 24. Therefore, each hour numerals 13a on the dial 13 can be illuminated with red color. Since the red light which enters the light guide plate 24 from the first light emitting element 47 is directly guided in the surface direction in the second illuminating region 146, the decorative portion 152 on the dial 13 is hardly illuminated.

The light emitted from the second light emitting element 48, that is, the light with color different from the light from the first light emitting element 47, for example blue light, is guided in the light guide plate 24, and the blue light which reaches the end surface of the light guide plate 24 to be reflected from the side surface reflection portion 131 in the guided light is reflected from each prism 130 of the light guide plate 24 toward the lower surface side. Therefore, the upper surface of the dial 13 is illuminated with blue color excluding each hour numerals 13a and the decorative portion 152. Moreover, the blue light enters the light guide plate 24 from the second light emitting element 48 and is guided in the light guide plate 24 is reflected from the second prisms 151 in the second illuminating region 146 toward the lower surface side of the light guide plate 24. Therefore, each hour numerals 13a on the dial 13 can be illuminated with blue color. Since the blue light which enters the light guide plate 24 from the second light emitting element 48 is directly guided in the surface direction in the first illuminating region 145, the decorative portion 152 on the dial 13 is hardly illuminated.

When making both of the first and second light emitting elements 47, 48 emit light at the same time, both lights from the first and second light emitting elements 47, 48 are reflected from each prism 130 of the light guide plate 24 to the lower surface side of the light guide plate 24. Thus, the upper surface of the dial 13 is illuminated with a mixed color of light-emitting colors of both the first and second light emitting elements 47, 48 excluding each hour numeral 13a and the decorative portion 152. However, only each hour numeral 13a on the dial 13 is illuminated with a light-emitting color of the first light emitting element 47, for example a red color, in the first illuminating region 145, and only the decorative portion 152 on the dial 13 is illuminated with a light-emitting color of the second light emitting element 48, for example a blue color, in the second illuminating region 146. Thus, the hour numerals 13a on the dial 13 looks red, the decorative portion 152 on the dial 13 looks blue, and the upper surface on the dial 13 excluding these portions looks mixed color. Accordingly, the wristwatch which is excellent in color and fanciness can be obtained.

Figure 64:
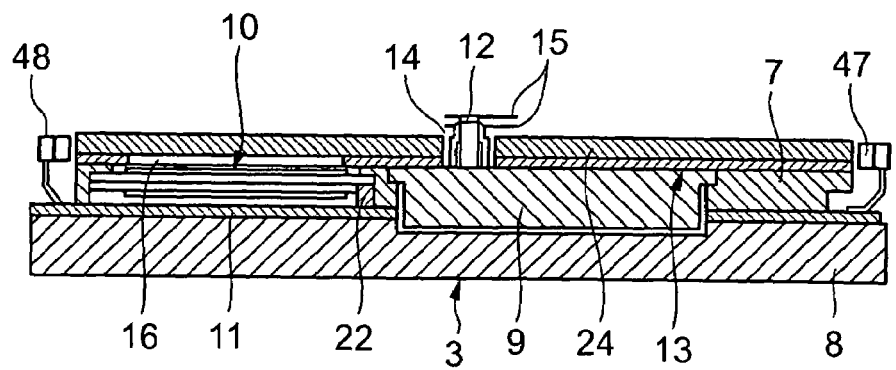
FIG. 64 is an expanded sectional view of a watch module showing a fourth modification of the thirteenth embodiment.

In the thirteenth embodiment, it is described about the case where the watch module 3 has only the analogue function, the decorative portion 152 is provided on the upper surface of the dial 13, and the second illuminating region 146 is provided in the light guide plate 24 corresponding to the decorative portion 152. However, it is not limited thereto. For example, as the third modification shown in FIG. 64, the opening portion 16 may be provided in the dial 13 corresponding to the second illuminating region 146, and the liquid crystal display element 10 may be provided in the upper housing 7 corresponding to the opening portion 16. In this configuration, as with the thirteenth embodiment, each hour numeral 13a on the dial 13 can be illuminated with a light-emitting color (for example, red color) of the first light emitting element 47, and the liquid crystal display element 10 can be illuminated with a light-emitting color (for example, blue color) of the second light emitting element 48. Thus, even when the liquid crystal display element 10 is provided instead of the decorative portion 152 on the dial 13, the wristwatch which is excellent in color and fanciness can be obtained.

[Fourteenth Embodiment]

The fourteenth embodiment in which the present invention is applied to a wristwatch will be explained below referring to FIGS. 65–67. The constituent elements similar to those of FIGS. 46–49 in the tenth embodiment are designated by the same reference numerals for explanation.

The wristwatch comprises first and second light emitting elements 153, 154 which are located at 12 o'clock and 6 o'clock, respectively as a light source, and a side surface reflection portion 155 from 12 o'clock to 6 o'clock through 3 o'clock on the outer periphery surface of the light guide plate 24. A dial 56 with a light transmission property is disposed on the upper surface of the light guide plate 24 and a reflection plate 57 having an opening portion 57a is disposed on the lower surface of the light guide plate 24. The liquid crystal display element 10 is disposed below the opening portion 57a of the reflection plate 57. Other configuration is as same as that in the tenth embodiment.

Figure 66:
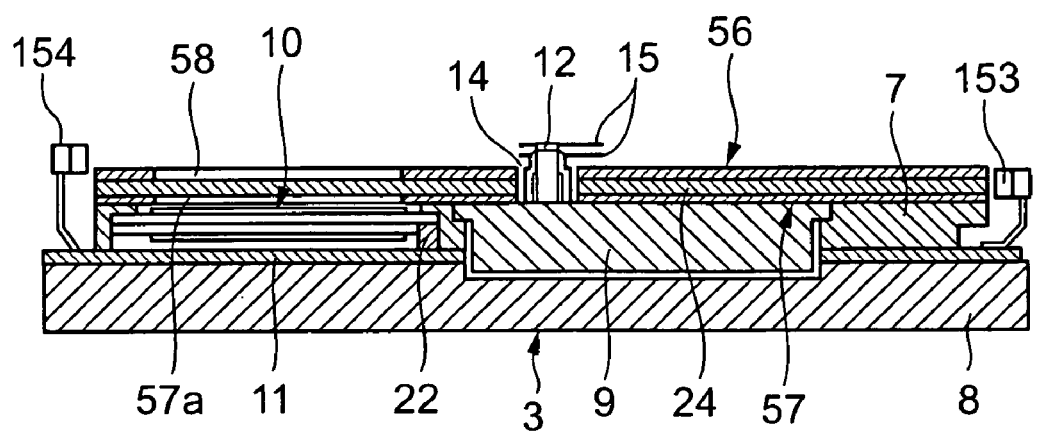
FIG. 66 is an expanded sectional view of a watch module taken along the line XXVII—XXVII in FIG. 65.

That is, in the first and second light emitting elements 153, 154, the first light emitting element 153 located at 12 o'clock of the light guide plate 24, as with the tenth embodiment, comprises a light emitting diode or the like which emits light in the visible ray region, and is disposed to face the side surface of the light guide plate 24 as shown in FIG. 66. The light emitted from the light emitting element 153 enters the light guide plate 24 from the side surface thereof. The second light emitting element 154 located at 6 o'clock of the light guide plate 24 comprises a ultraviolet (UV) light emitting diode, a black light or the like which emits light in the UV-ray region having a wavelength of between 365-385 nm (nm: One nanometer (nm) is equal to one billionth of a meter), and is disposed to be located above the side portion of the dial 56 as shown in FIG. 66. The second light emitting element 154 is configured to radiate the emitted light in the UV-ray region to the upper surface of the dial 56 from above of the side portion thereof.

Figure 65:
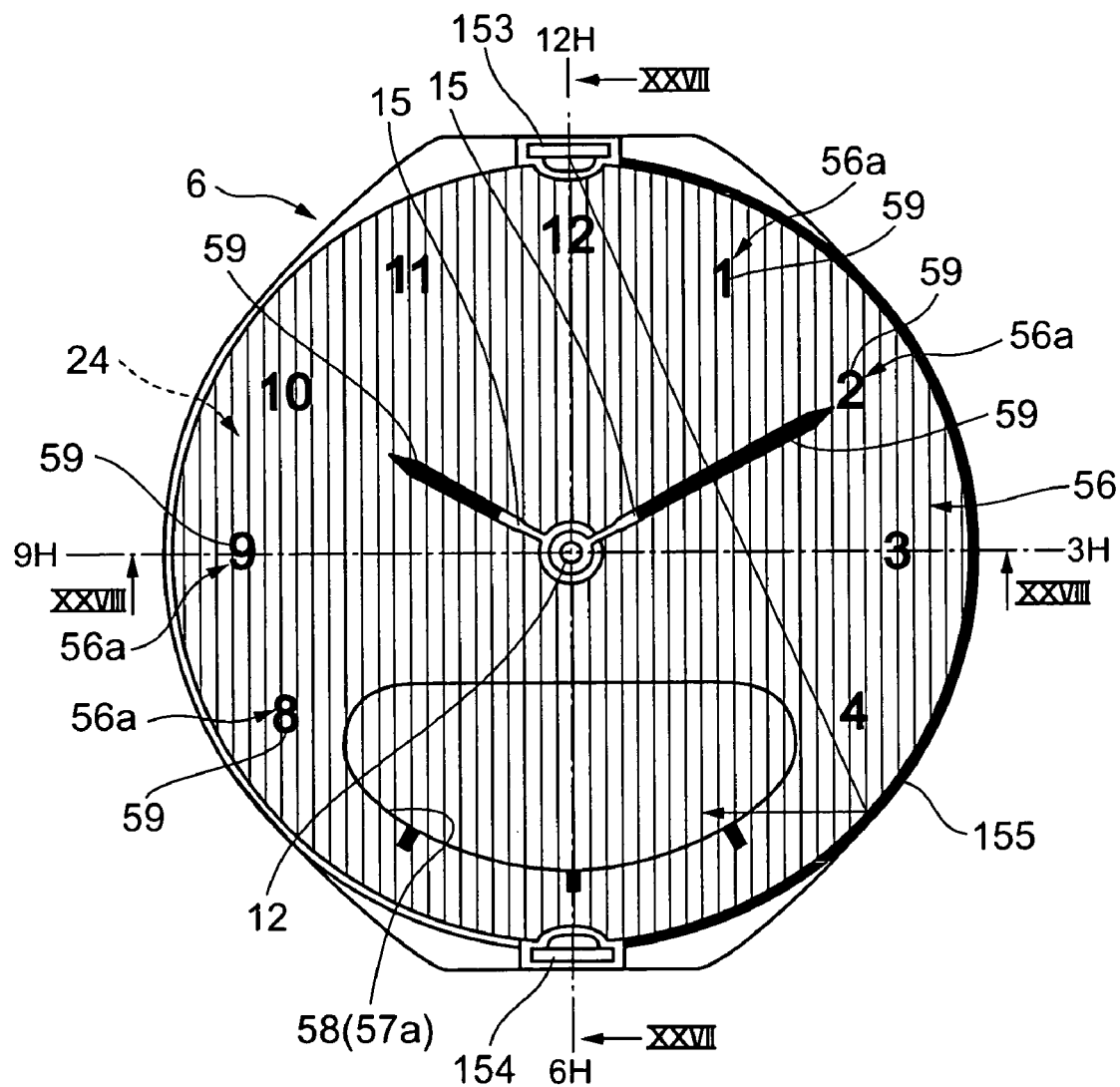
FIG. 65 is an expanded front view of a watch module in the fourteenth embodiment in which the present invention is applied to a wristwatch.
Figure 67:
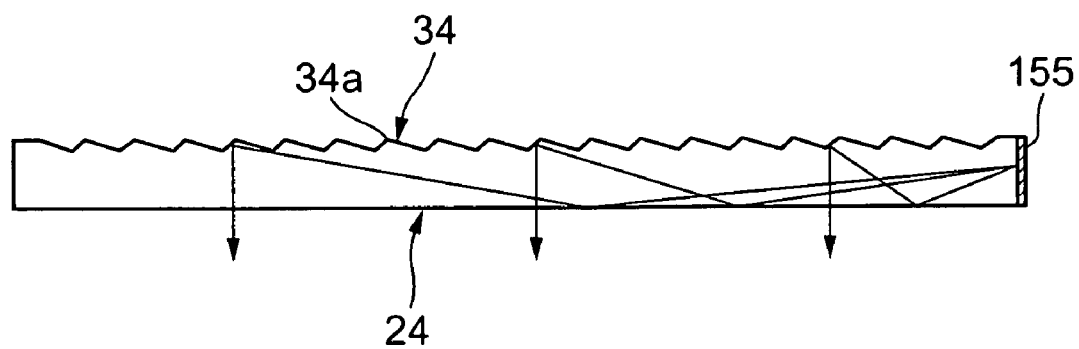
FIG. 67 is an expanded sectional view of a light guide plate taken along the line XXVIII—XXVIII in FIG. 65.

In this case, as shown in FIGS. 65 and 67, a plurality of the line-shaped prisms 34 are arranged on the upper surface of the light guide plate 24. The prisms 34 are provided to be approximately in parallel with the line connecting the first and second light emitting elements 153, 154, that is, the line connecting 12 o'clock and 6 o'clock, and each reflection surface 34a thereof is provided to face the 3 o'clock side (right side in FIG. 67) as shown in FIG. 67. Therefore, the light guided from the 3 o'clock side into the light guide plate 24 is reflected toward the lower surface side of the light guide plate 24. The side surface reflection portion 155 is provided at a portion on the side surface of the light guide plate 24 from 12 o'clock to 6 o'clock through 3 o'clock. When the light from the first light emitting element 153 is guided in the surface direction in the light guide plate 24 and reaches the end surface of the light guide plate 24, the side surface reflection portion 155 reflects the light toward the inside of the light guide plate 24.

The reflection plate 57 is for reflecting the light radiated from the light guide plate 24 toward the lower surface side, and is provided with the opening portion 57a at a predetermined position corresponding to the liquid crystal display element 10. The dial 56 comprises a transparent or translucent material having a light transmission property, and is provided with an opening portion 58 at a predetermined position thereof which corresponds to the opening portion 57a of the reflection plate 57 and the liquid crystal display element 10 disposed below the light guide plate 24. Hour numerals 56a are provided on the outer peripheral portion on the upper surface of the dial 56 corresponding to 1–12 o'clock. A light emitting portion 59 which emits light in the visible ray region in response to the light in the UV-ray region is provided on each hour numeral 56a on the dial 56 and the hands 15 as shown in FIG. 65.

According to the wristwatch, since the external light is radiated to the hands 15 and the dial 56 in the bright place, time can be recognized by the dial 56 and the hands 15. Moreover, the external light radiated to the dial 56 passes through the dial 56 and the opening portion 58 thereof to be radiated to the light guide plate 24, and this radiated external light further passes through the opening portion 57a of the reflection plate 57 to be radiated to the liquid crystal display element 10. Thus, information displayed on the liquid crystal display element 10 can be recognized through the light guide plate 24 and the opening portion 58 of the dial 56.

When making the first light emitting element 153 emit light in the dark place, the first light emitting element 153 emits light in the visible ray region which is perceptible to human vision, and this light in the visible ray region is guided in the surface direction in the light guide plate 24. When this guided light reaches the end surface of the light guide plate 24, the light is reflected from the side surface reflection portion 155 provided on the side surface of the light guide plate 24 to be guided to the light guide plate 24 again. This guided light is reflected from the reflection surfaces 34a of each prism 34 toward the lower surface side of the light guide plate 24. Thus, the surface emission is performed from the whole light guide plate 24. This surface-emitted light is radiated to the reflection plate 57 and also, radiated to the liquid crystal display element 10 through the opening portion 57a of the reflection plate 57. The light radiated to the reflection plate 57 is reflected from the reflection plate 57, and this reflected light passes through the light guide plate 24 to be radiated to the dial 56 and also passes through the dial 56 to be radiated to the hands 15 thereof. Accordingly, time can be recognized by the dial 56 and the hands 15 even in the dark place, and information displayed on the liquid crystal display element 10 can be recognized.

When making the second light emitting element 154 emit light, the second light emitting element 154 emits light in the UV-ray region which is not perceptible to human vision to be radiated to the upper surface of the dial 56 and the hands 15. Thus, the light emitting portions 59 provided on each hour numeral 56a on the dial 56 and the hands 15 emits light in the visible ray region in response to the light in the UV-ray region. Accordingly, the hour numerals 56a on the dial 56 and the hands 15 can be recognized by the light emitting portion 59 even in the dark place. When the light in the UV-ray region emitted from the second light emitting element 154 passes through the dial 56 and the light guide plate 24 to be radiated to the reflection plate 57, and this light is radiated to the liquid crystal display element 10 through the opening portion 57a in the reflection plate 57, information displayed on liquid crystal display element 10 cannot be recognized because the radiated light is in the UV-ray region which is not perceptible to human vision. However, information displayed on the liquid crystal display element 10 can be recognized by the light in the visible ray region from the first light emitting element 153.

Accordingly, in the wristwatch, time can be recognized by the dial 56 and the hands 15, and information displayed on the liquid crystal display element 10 can be recognized in both of the bright and dark places. Moreover, specially, when making the second light emitting element 154 emit light to irradiate the dial 56 and the hands 15 with the light in the UV-ray region, each hour numeral 56a on the dial 56 and each light emitting portion 59 on the hands 15 can be emitted with light in the visible ray region. Thus, the wristwatch which is excellent in fanciness can be obtained.

[Fifthteenth Embodiment]

The fifteenth embodiment in which the present invention is applied to a wristwatch will be explained below referring to FIGS. 68 and 69. The constituent elements similar to those of FIGS. 46–49 in the tenth embodiment and FIGS. 65–67 in the fourteenth embodiment are designated by the same reference numerals for explanation.

In the wristwatch, the dial 56 with a light transmission property is disposed on the upper surface of the light guide plate 24, and a solar panel 160 is disposed on the lower surface of the light guide plate 24 instead of the reflection plate 57 in the fourteenth embodiment. Other configuration is as same as that in the tenth embodiment. That is, the dial 56 comprises a transparent material, which is provided with the opening portion 58 at a predetermined portion corresponding to the liquid crystal display element 10.

The solar panel 160 has a configuration in which a lower electrode layer made of metal, an amorphous silicon layer, a transparent upper electrode layer, and a transparent protection layer are laminated in this order from below on an insulating substrate. When the solar panel 160 is irradiated with the external light from the upper side, the external light passes through the transparent protection layer and the transparent upper electrode layer to be radiated to the amorphous silicon layer. The light which passes through the amorphous silicon layer is reflected from the lower electrode layer. Thus, the solar panel 160 efficiently generates the electromotive force.

The solar panel 160 is configured to be provided with the through hole 14 through which the hand shaft 12 of the analogue movement 9 is inserted, and an opening portion 161 which corresponds to the liquid crystal display element 10 at a portion corresponding to the opening portion 58 in the dial 56.

Figure 68:
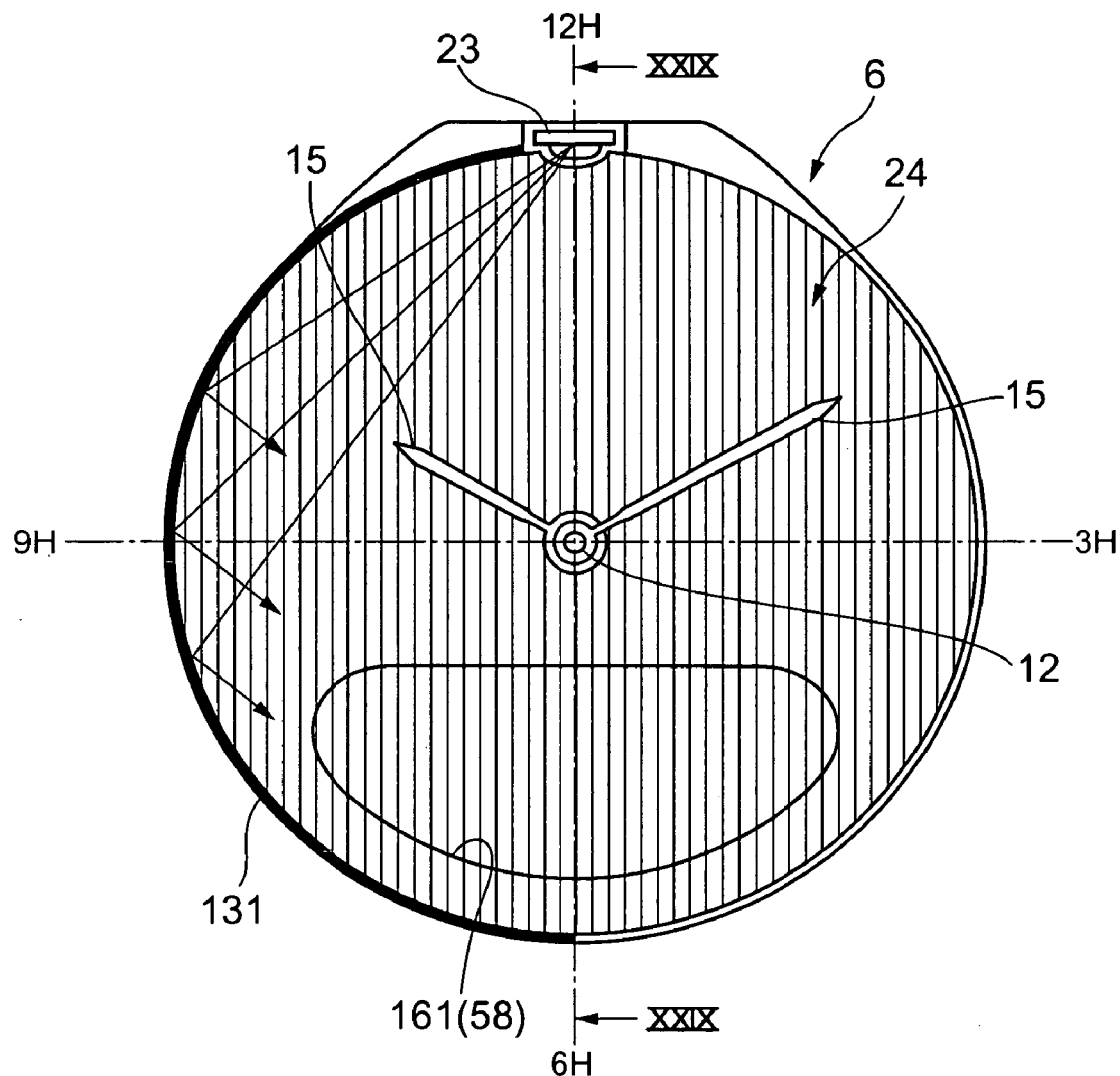
FIG. 68 is an expanded front view of a watch module in the fifteenth embodiment in which the present invention is applied to a wristwatch.

In the fifteenth embodiment, the light emitting element 23 is disposed to face a position located at 12 o'clock on the side surface of the light guide plate 24 as shown in FIG. 68. As with the tenth embodiment, the line-shaped prisms 130 are provided to be approximately in parallel with the line connecting the light emitting element 23 and a portion of the side surface of the light guide plate 24 which faces the light emitting element 23, that is, the line connecting 12 o'clock and 6 o'clock. The reflection surfaces 30a of each prism 130 are provided to face the 9 o'clock side as with the tenth embodiment. The side surface reflection portion 131 is provided at a portion on the side surface of the light guide plate 24 from 12 o'clock to 6 through 9 o'clock as shown in FIG. 68.

According to the wristwatch, as with the fourteenth embodiment, the external light is radiated to the dial 56 and the hands 15 in the bright place, so that time can be recognized by the dial 56 and the hands 15. Moreover, since the external light radiated to the dial 56 passes through the dial 56 and the opening portion 58 thereof to be radiated to the light guide plate 24. This radiated external light passes through the light guide plate 24 to be radiated to the solar panel 160, so that electric power can be generated by the solar panel 160 efficiently. Since the external light passes through the opening portion 161 in the solar panel 160 to be radiated to the liquid crystal display element 10, information such as time or the like displayed on the liquid crystal display element 10 can be recognized.

When making the light emitting element 23 emit light in the dark place, the light enters the light guide plate 24 and is guided in the surface direction. When this guided light reaches the end surface of the light guide plate 24 to be reflected from the side surface reflection portion 131 toward the inside of the light guide plate 24, the reflected light is guided into the light guide plate 24 and is reflected from the reflection surfaces 30a of the prisms 130 toward the lower surface side of the light guide plate 24. Therefore, the surface emission is performed from the whole light guide plate 24, and is radiated to the solar panel 160. The liquid crystal display element 10 can be illuminated from upper surface side by the light which passes through the opening portion 161 of the solar panel 160 in the radiated light. The light radiated to the solar panel 160 is reflected from the solar panel 160, and this reflected light passes through the light guide plate 24 to be radiated to the lower surface of the dial 56. Thus, the dial 56 can be illuminated. Also, since this radiated light further passes through the dial 56, the hands 15 above the dial 56 can also be illuminated. Accordingly, time can be recognized by the dial 56 and the hands 15 even in the dark place, and information displayed on the liquid crystal display element 10 can be recognized.

In the above twelfth to fifteenth embodiments, it is described about the case where the reflection surfaces 30a, 34a of the line-shaped prisms 130, 34 formed on the upper surface of the light guide plate 24 are provided to face any of the 9 o'clock side and the 3 o'clock side. However, it is not limited thereto. For example, as with the eleventh embodiment shown in FIGS. 52–54, the first illuminating region 136 of the 9 o'clock side and the second illuminating region 137 of the 3 o'clock side may be formed on the light guide plate 24. The first illuminating region 136 may comprise the first prisms 138 and the first side surface reflection portion 39, and the second illuminating region 137 may comprise the second prisms 140 and the second side surface reflection portion 141.

In this configuration, as with the eleventh embodiment, when the light guided in the light guide plate 24 is reflected from the first and second side surface reflection portions 39, 141 in the first and second illuminating regions 136, 137 to be guided into the first and second illuminating regions 136, 137 of the light guide plate 24 again, this guided light is reflected from each of the reflection surfaces 38a, 40a of the first and second prisms 138, 140 toward the lower surface side of the light guide plate 24. Thus, the surface emission is performed from the first and second illuminating regions 136, 137 to illuminate the dial 13, 56 and the liquid crystal display element 10, so that the light from the light emitting element 23 can be radiated to the dial 13, 56 and the liquid crystal display element 10 efficiently to illuminate them more brightly.

[Sixteenth Embodiment]

The sixteenth embodiment in which the present invention is applied to a wristwatch will be explained below referring to FIGS. 70–73. The constituent elements similar to those of FIGS. 52–54 in the eleventh embodiment are designated by the same reference numerals for explanation.

The wristwatch comprises a first liquid crystal display element 165 of a transmission type and a second liquid crystal display element 166 of a reflection type, and the light guide plate 24 is disposed between the first and second liquid crystal display elements 165, 166. Other configuration is as same as, that in the eleventh embodiment.

Figure 71:
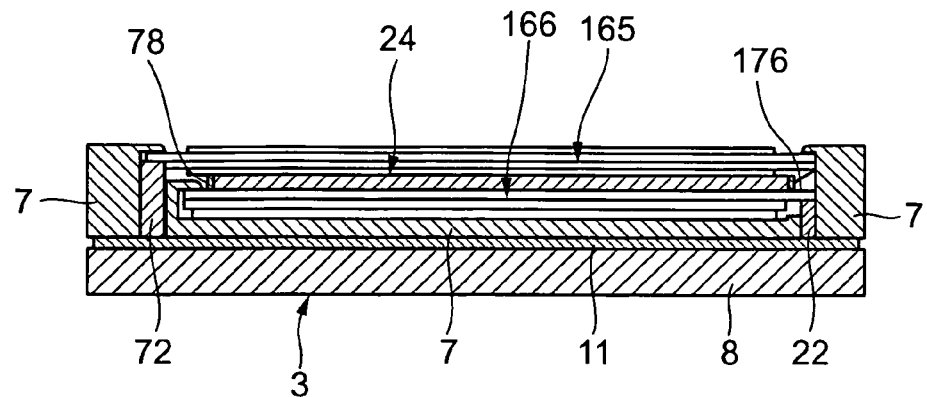
FIG. 71 is an expanded sectional view of a watch module taken along the line XXX—XXX in FIG. 70.
Figure 73:
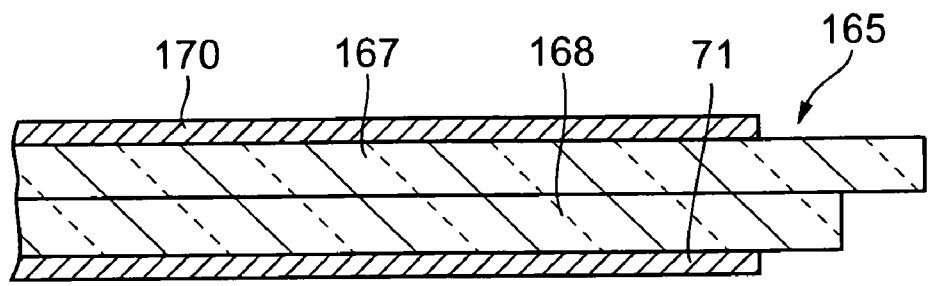
FIG. 73 is an expanded sectional view of a main portion showing a first liquid crystal display element of a transmission type of FIG. 71.

That is, as shown in FIG. 73, the first liquid crystal display element 165 is of a transmission type, which comprises an enclosed liquid crystal (not shown) sandwiched between a pair of transparent upper and lower electrode substrates 167, 168, and polarizers 170, 71 are provided on the upper surface of the upper electrode substrate 167 and the lower surface of the lower electrode substrate 168, respectively. As shown in FIG. 71, the end of the upper electrode substrate 167 is supported in a state of being electrically connected to the circuit board 11 by an interconnector 72. In this state, voltage is selectively applied between a pair of the upper and lower electrode substrates 167, 168 to electrooptically display information such as time or the like.

As with the liquid crystal display element 10 in the ninth embodiment, the second liquid crystal display element 166 is of a reflection type, which comprises an enclosed liquid crystal (not shown) sandwiched between a pair of the transparent upper and lower electrode substrates 17, 18, the polarizers 19, 20 are provided on the upper surface of the upper electrode substrate 17 and the lower surface of the lower electrode substrate 18, respectively, and the reflection plate 21 is provided on the lower surface of the lower electrode substrate 20. As shown in FIG. 71, the end of the upper electrode substrate 17 is supported in a state of being electrically connected to the circuit board 11 by the interconnector 22. In this state, voltage is selectively applied between a pair of the upper and lower electrode substrates 17, 18 to electrooptically display information such as time or the like.

As shown in FIG. 71, the first and second liquid crystal display elements 165, 166 are formed in an almost the same size as the light guide plate 24. The light guide plate 24 is formed in approximately a hexagonal shape, and the light emitting element 23 is disposed to face a portion located in the 3 o'clock side on the side surface of the light guide plate 24. As with the eleventh embodiment, the light guide plate 24 is divided by the line connecting the light emitting element 23 and a portion of the side surface of the light guide plate 24 which faces the light emitting element 23, that is, the line connecting 12 o'clock and 6 o'clock as a boundary. A first illuminating region 73 is formed on the 12 o'clock side and a second illuminating region 74 is formed on the 6 o'clock side.

Figure 70:
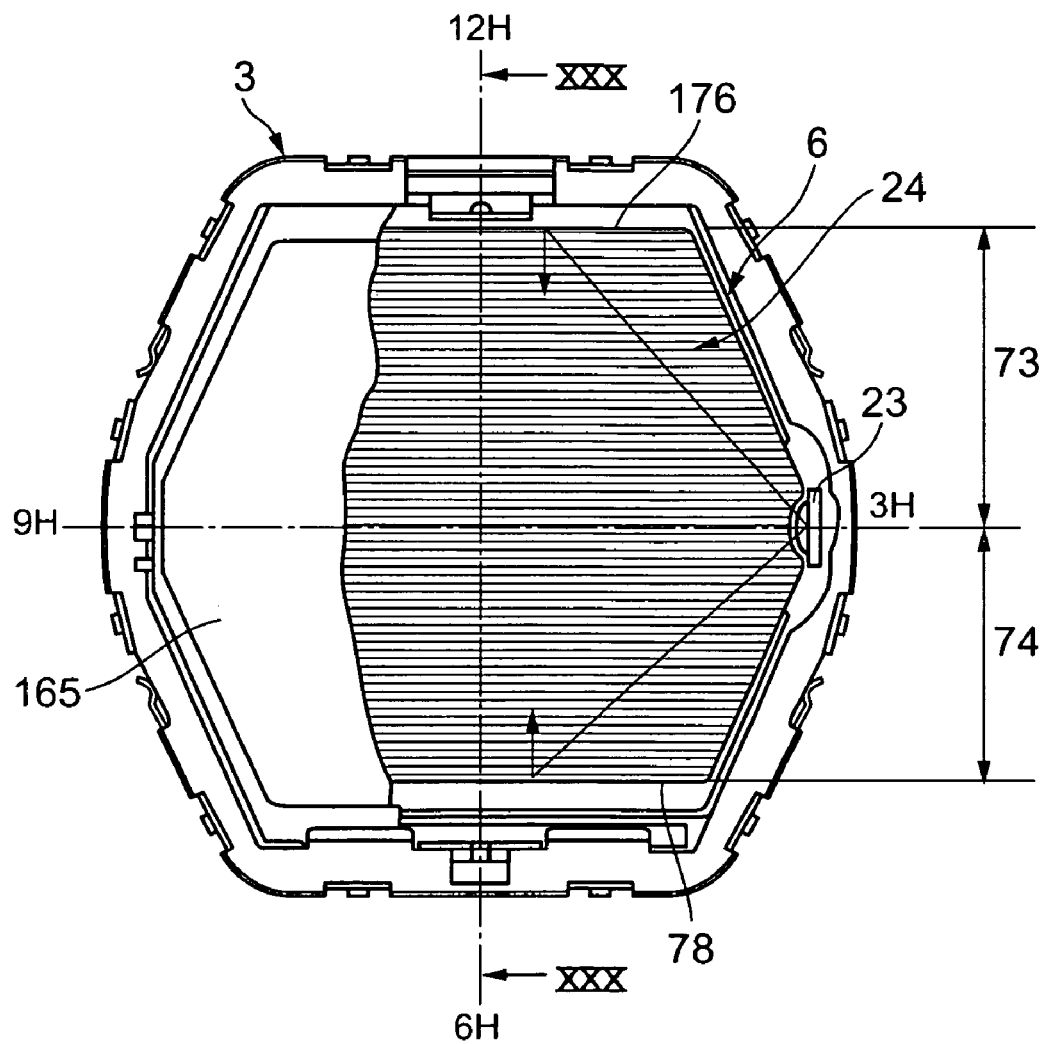
FIG. 70 is an expanded front view of a watch module in the sixteenth embodiment in which the present invention is applied to a wristwatch.
Figure 72:
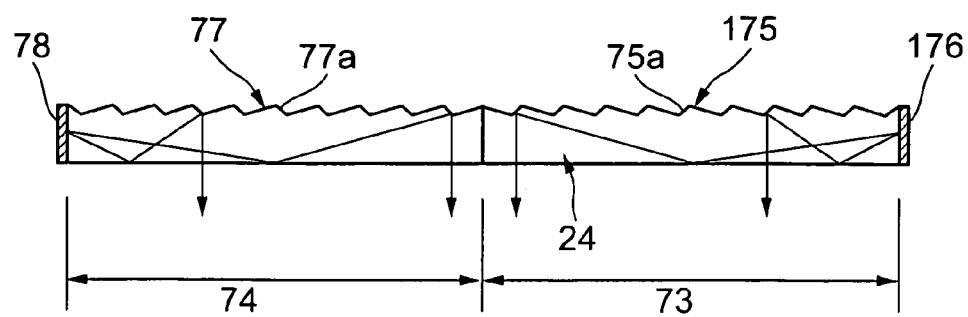
FIG. 72 is an expanded sectional view of a light guide plate taken along the line XXX—XXX in FIG. 70.

The first illuminating region 73 comprises first prisms 175 formed on the upper surface of the light guide plate 24 and a first side surface reflection portion 176 provided on the side surface of the light guide plate 24. As shown in FIG. 70, the first prisms 175 are provided to be approximately in parallel with the diagonal line connecting the light emitting element 23 and a portion of the side surface of the light guide plate 24 which faces the light emitting element 23, that is, the line connecting 3 o'clock and 9 o'clock, and the reflection surfaces 75a thereof are provided to face the 12 o'clock side (right side in FIG. 72) as shown in FIG. 72. Therefore, the light guided from the 12 o'clock side to the light guide plate 24 is reflected toward the lower surface side of the light guide plate 24. In this case, it is preferable that the pitch of the first prisms 175 is gradually narrowed as it departs from the first side surface reflection portion 176 side or the 12 o'clock side. The first side surface reflection portion 176 is provided at a portion located in the 12 o'clock side on the side surface of the light guide plate 24. When the light from the light emitting element 23 is guided in the surface direction in the light guide plate 24 and reaches the end surface of the light guide plate 24, the first side surface reflection portion 176 reflects the light toward the inside of the light guide plate 24.

The second illuminating region 74 comprises second prisms 77 formed on the upper surface of the light guide plate 24 and a second side surface reflection portion 78 provided on the side surface of the light guide plate 24. As shown in FIG. 70, the second prisms 77 are provided to be approximately in parallel with the diagonal line connecting the light emitting element 23 and a portion of the side surface of the light guide plate 24 which faces the light emitting element 23, that is, the line connecting 3 o'clock and 9 o'clock, and the reflection surfaces 77a thereof are provided to face the 6 o'clock side (left side in FIG. 72) as shown in FIG. 72. Therefore, the light guided from the 6 o'clock side to the light guide plate 24 is reflected toward the lower surface side of the light guide plate 24. In this case, it is preferable that the pitch of the second prisms 77 is gradually narrowed as it departs from the second side surface reflection portion 78 side or the 6 o'clock side. The second side surface reflection portion 78 is provided at a portion located in the 6 o'clock side on the side surface of the light guide plate 24. When the light from the light emitting element 23 is guided in the surface direction in the light guide plate 24 and reaches the end surface of the light guide plate 24, the second side surface reflection portion 78 reflects the light toward the inside of the light guide plate 24.

According to the wristwatch, when the external light enters the wristwatch case 1 through the watch glass 2 in the bright place, and this external light is radiated to the first liquid crystal display element 165, this radiated external light passes through the first liquid crystal display element 165 and the light guide plate 24 to be radiated to the second liquid crystal display element 166. This radiated external light enters the second liquid crystal display element 166, and is reflected from the reflection plate 21 of the second liquid crystal display element 166. This reflected light passes through the second liquid crystal display element 166 again through a light path which is opposite to the above to be radiated to the light guide plate 24 from the lower surface side. This radiated light passes through the light guide plate 24 and the first liquid crystal display element 165. Thus, information displayed on the first liquid crystal display element 165 can be recognized, and information displayed on the second liquid crystal display element 166 can be recognized through the light guide plate 24 and the first liquid crystal display element 165.

When making the light emitting element 23 of the illumination device 6 emit light in the dark place, as with the eleventh embodiment, the light from the light emitting element 23 is guided in the light guide plate 24. When this guided light is directly guided in the surface direction in the first and second illuminating regions 73, 74 and reaches the end surface of the light guide plate 24, this light is reflected from the first and second side surface reflection portions 176, 78. This reflected light is guided to the first and second illuminating regions 73, 74 of the light guide plate 24 again to be reflected from the first and second illuminating regions 73, 74 toward lower surface side of the light guide plate 24. Thus, the surface emission is performed from the whole first and second illuminating regions 73, 74, that is, the whole light guide plate 24 to illuminate the second liquid crystal display element 166.

As shown in FIG. 70, when the light reflected from the first side surface reflection portion 176 of the 12 o'clock side is guided to the first illuminating region 73, the light is reflected from the reflection surfaces 75a of the first prisms 175 toward the lower surface side of the light guide plate 24 because the reflection surfaces 75a of the first prisms 175 are provided to face the 12 o'clock side as shown in FIG. 72. Therefore, the surface emission is performed from the first illuminating region 73. When the light reflected from the second side surface reflection portion 78 of the 6 o'clock side is guided to the second illuminating region 74, the light is reflected from the reflection surfaces 77a of the second prisms 77 toward the lower surface side of the light guide plate 24 because the reflection surfaces 77a of the second prisms 77 are provided to face the 6 o'clock side. Therefore, the surface emission is performed in the second illuminating region 74.

When the surface emission is performed in each of the first and second illuminating regions, as with the eleventh embodiment, the light from the light emitting element 23 can be radiated to the second liquid crystal display element 166 efficiently, thereby illuminating the whole second liquid crystal display element 166 equally from the upper surface side. This illuminated light enters the second liquid crystal display element 166 to be reflected from the reflection plate 21, and this reflected light passes through the light guide plate 24 through a light path which is opposite to the above to be radiated to the first liquid crystal display element 165 from the lower surface side of the light guide plate 24. Thus, information displayed on the first liquid crystal display element 165 can be recognized, and information displayed on the second liquid crystal display element 166 can be recognized through the light guide plate 24 and the first liquid crystal display element 165. In this case, since the bright line spectrums 33 shown in FIG. 49 are not generated, information displayed on the first and second liquid crystal display elements 165, 166 can be clearly recognized without being affected by the bright line spectrums 33.

Figure 74:
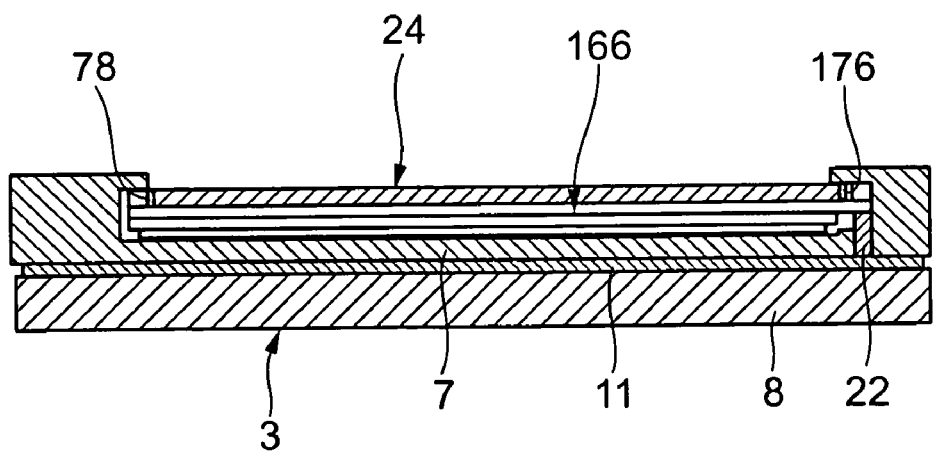
FIG. 74 is an expanded sectional view of a watch module showing a fifth modification of the sixteenth embodiment.

In the above described sixteenth embodiment, the light guide plate 24 is disposed between the first and second liquid crystal display elements 165, 166, however, the light guide plate 24 is not necessarily disposed between the first and second liquid crystal display elements 165, 166. The light guide plate 24 may be disposed in the upper side of the first and second liquid crystal display elements 165, 166, or as the fourth modification shown in FIG. 74, only the second liquid crystal display element 166 may be disposed on the lower surface of the light guide plate 24. In this configuration, the same effect as in the sixteenth embodiment can be obtained. Moreover, information can be displayed more brightly in comparison with the sixteenth embodiment, and the wristwatch as a whole can be a small size and a thin shape.

[Seventeenth Embodiment]

The seventeenth embodiment in which the present invention is applied to a cellular phone will be explained below referring to FIGS. 75 and 76. The constituent elements similar to those of FIGS. 52–54 in the eleventh embodiment and FIGS. 70–73 in the sixteenth embodiment are designated by the same reference numerals for explanation.

Figure 75:
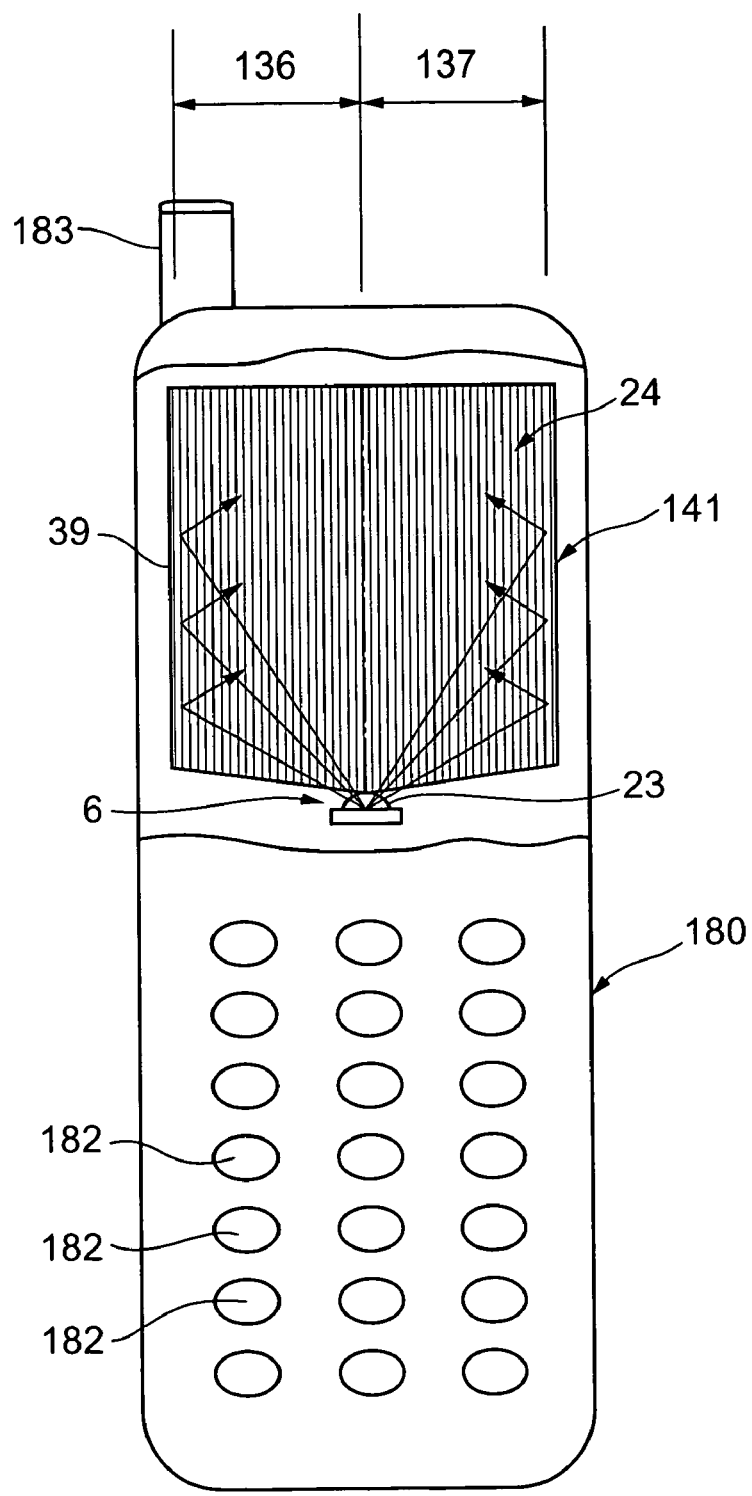
FIG. 75 is a partially broken expanded front view showing the seventeenth embodiment in which the present invention is applied to a cellular phone.
Figure 76:
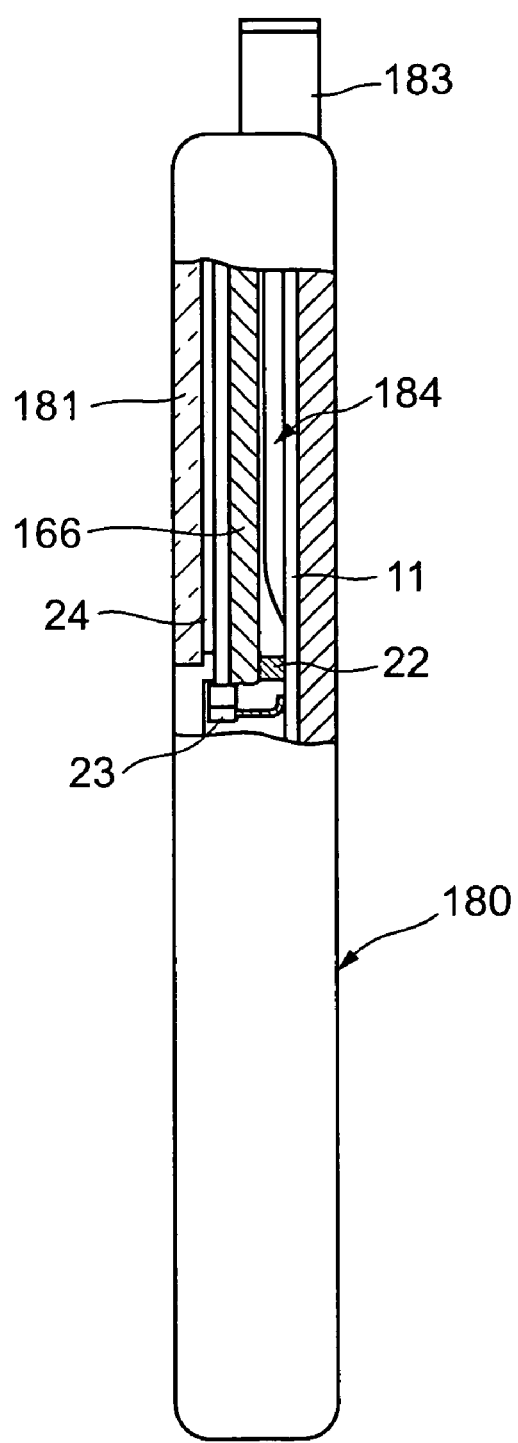
FIG. 76 is a partially broken expanded side view of FIG. 75.

As shown in FIGS. 75 and 76, the cellular phone comprises a device case 180 made of synthetic resin. The device case 180 is provided with an opening portion on one side of the upper surface, in which a transparent protection glass 181 corresponding to a window portion is attached. On the other side of the upper surface, various key bottoms 182 which are necessary as a telephone function are provided. On the one side of the device case 180, an antenna 183 is extendably attached.

As shown in FIG. 76, a module 184 for cellular phone is stored inside the device case 180. The module 184 for cellular phone comprises the liquid crystal display element 166 for displaying information necessary for calling and the illumination device 6. The illumination device 6, as with the sixteenth embodiment, comprises the light guide plate 24 disposed on the upper surface of the liquid crystal display element 166 and the light emitting element 23 disposed to face the side surface of the light guide plate 24 located at 6 o'clock. The light guide plate 24 is formed in approximately a square shape, and the light emitting element 23 is disposed to face the light guide plate 24 on the side surface located at 6 o'clock as shown in FIG. 76. As with the eleventh embodiment, the light guide plate 24 is divided by the diagonal line connecting the light emitting element 23 and a portion of the side surface of the light guide plate 24 which faces the light emitting element 23, that is, the line connecting 12 o'clock and 6 o'clock as a boundary. The first illuminating region 136 is formed on the 9 o'clock side and the second illuminating region 137 is formed on the 3 o'clock side on the upper surface of the light guide plate 24.

The first illuminating region 136, as with the eleventh embodiment, comprises the first prisms 138 formed on the upper surface of the light guide plate 24 and the first side surface reflection portion 39 provided on the side surface of the 9 o'clock side of the light guide plate 24. The reflection surfaces 38a of the first prisms 138 are provided to face the 9 o'clock side, so that the light which is reflected from the first side surface reflection portion 39 of the 9 o'clock side and is guided in the light guide plate 24 is reflected from the reflection surfaces 38a of the first prisms 138 toward the lower surface side of the light guide plate 24 (refer to FIGS. 52 and 54). The second illuminating region 137 comprises the second prisms 140 formed on the upper surface of the light guide plate 24 and the second side surface reflection portion 141 provided on the side surface of the 3 o'clock side of the light guide plate 24. The reflection surfaces 40a of the second prisms 140 are provided to face the 3 o'clock side, so that the light which is reflected from the second side surface reflection portion 141 of the 3 o'clock side and is guided in the light guide plate 24 is reflected from the reflection surfaces 40a of the second prisms 140 toward the lower surface side of the light guide plate 24 (refer to FIGS. 52 and 54).

According to the cellular phone, the external light enters the device case 180 through the protection glass 181 in the bright place, and this external light passes through the light guide plate 24 to be radiated to the liquid crystal display element 166. Thus, information displayed on the liquid crystal display element 166 can be recognized through the light guide plate 24. When making the light emitting element 23 emit light in the dark place, as with the eleventh embodiment, the light from the light emitting element 23 is guided in the surface direction in the light guide plate 24. When this guided light is directly guided in the surface direction in the first and second illuminating regions 136, 137 and reaches the end surface of the light guide plate 24, the light is reflected from the first and second side surface reflection portions 39, 141 of the light guide plate 24, and this reflected light is guided into the first and second illuminating regions 136, 137 of the light guide plate 24 to be reflected toward the lower surface side of the of the light guide plate 24. Therefore, the surface emission is performed in the first and second illuminating regions 136, 137 to illuminate the liquid crystal display element 166.

As with the eleventh embodiment, when the light reflected from the first side surface reflection portion 39 of the 12 o'clock side of the first illuminating region 136 is guided in the first illuminating region 136, the light is reflected from the reflection surface 38a of the first prisms 138 toward the lower surface side of the light guide plate 24 to perform the surface emission in the first illuminating region 136. When the light reflected from the second side surface reflection portion 141 of the 6 o'clock side of the second illuminating region 137 is guided in the second illuminating region 137, the light is reflected from the reflection surface 40a of the second prisms 140 toward the lower surface side of the light guide plate 24 to perform the surface emission in the second illuminating region 137. Therefore, the surface emission is performed in each of the first and second illuminating regions 136, 137 to illuminate the liquid crystal display element 166. Thus, as with the eleventh embodiment, the light from the light emitting element 23 can be radiated to the liquid crystal display element 166 efficiently. Moreover, since the bright line spectrums 33 shown in FIG. 49 are not generated, information displayed on the liquid crystal display element 166 can be clearly recognized without being affected by the bright line spectrums 33.

In the above sixteenth and seventeenth embodiments, the light guide plate 24 is provided with the first and second illuminating regions 73 and 74, or 136 and 137, however it is not limited thereto. As the ninth embodiment shown in FIGS. 39–42, the first modification shown in FIGS. 43–45, the tenth embodiment shown in FIGS. 46–49, and the second modification shown in FIGS. 50 and 51, the light guide plate 24 may be configured to be provided with the prisms 125, 127, 130, 34 on the whole upper surface.

In the above sixteenth and seventeenth embodiments, the light emitting element 23 is provided only at a position located at 3 o'clock or 6 o'clock of the light guide plate 24, however it is not limited thereto. For example, as the thirteenth embodiment shown in FIGS. 60–62 and the fourteenth embodiment shown in FIGS. 65–67, the first and second light emitting elements 47, 48, or 153 154 may be provided at two positions located at 3 o'clock and 9 o'clock, or 12 o'clock and 6 o'clock of the light guide plate 24, respectively.

In the above ninth to seventeenth embodiments and each modification, it is described about the case where the present invention is applied to a wristwatch or a cellular phone, however it is not limited thereto. For example, the present invention can be widely applied to various types of electronic equipment such as, a personal digital assistance, an electronic dictionary, a mobile computer, a personal computer, a printing machine or the like, various types of equipment such as a gauge for automobile, or each component thereof.

As described above, in the embodiment shown in FIGS. 39–76, the illumination device in which light from a light source enters a light guide plate from a side surface thereof and is guided in a surface direction in the light guide plate to perform a surface emission from the light guide plate for illuminating a display member (13, 15, 10, 166): wherein the light guide plate (24) has a light transmission property in a thickness direction thereof, a plurality of line-shaped prisms (125, 127, 130, 34; first prism 138, 150, 175; second prism 140, 151, 77) having reflection surfaces (25a, 27a, 30a, 34a, 38a, 40a, 50a, 51a, 75a, 77a) for reflecting light guided in the light guide plate in a surface direction toward a lower surface side of the light guide plate are formed on a whole upper surface of the light guide plate, and the display member (dial 13 and hands 15, liquid crystal display element 10, or second liquid crystal display element 166) is disposed at least in a lower surface side of the light guide plate.

According to the embodiment, since the external light passes through the light guide plate from the upper surface side to the lower surface side in the bright place, the display member disposed in the lower side of the light guide plate can be excellently illuminated. Thus, the display member can be recognized through the light guide plate. When making the light source emit light, the light enters the light guide plate from the side surface to be guided in the surface direction. Since this guided light is reflected from the reflection surfaces of each prism toward the lower surface side of the light guide plate, the surface emission is performed from the whole light guide plate to illuminate the whole display member disposed in the lower side of the light guide plate approximately equally. Moreover, the display member is illuminated from the upper surface side by the surface emission from the light guide plate, so that any material such as a material having a light transmission property or having no light transmission property can be employed for the display member.

In the embodiment shown in FIGS. 39–45, the line-shaped prisms (125, 127) are provided to be approximately perpendicular to a line connecting the light source (light emitting element 23) and a portion of the side surface of the light guide plate (24) which faces the light source, and the reflection surfaces (25a, 27a) of the line-shaped prisms are provided to face one side.

According to the embodiment, when the light from the light source enters the light guide plate and is guided in the surface direction, this guided light is reflected from the reflection surfaces of the prisms toward the lower surface side of the light guide plate. Thus, the surface emission is performed from the whole light guide plate. Since this surface-emitted light is radiated to the lower surface side of the light guide plate, the whole display member disposed in the lower surface side of the light guide plate can be illuminated approximately equally.

Figure 44:
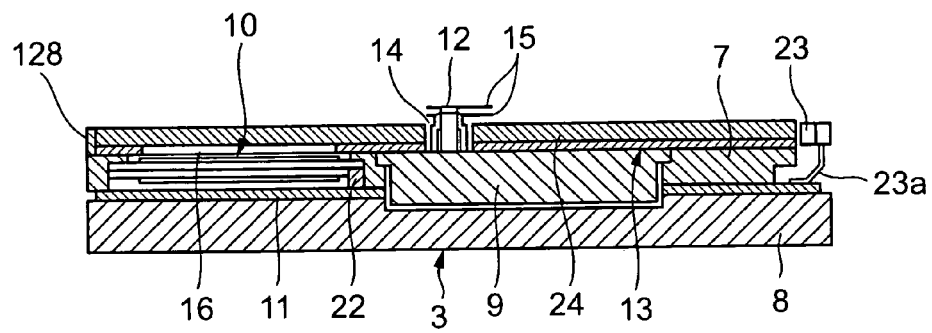
FIG. 44 is an expanded sectional view of a watch module taken along the line XVIII—XVIII in FIG. 43.
Figure 45:
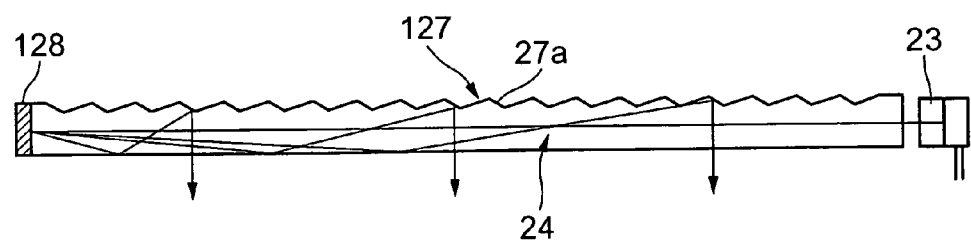
FIG. 45 is an expanded sectional view of a light guide plate taken along the line XVIII—XVIII in FIG. 43.

In the embodiment shown in FIGS. 43–45, a side surface reflection portion (128) is provided on the side surface of the light guide plate (24), the side surface reflection portion reflecting light which is guided in the light guide plate in the surface direction and reaches an end surface of the light guide plate toward inside of the light guide plate.

According to the embodiment, when the light which is guided in the surface direction in the light guide plate reaches the end surface of the light guide plate, this light is reflected from the side surface reflection portion provided on the side surface of the light guide plate toward the inside of the light guide plate. Thus, the leakage of light from the side surface of the light guide plate can be prevented. Moreover, when the reflection surfaces of the prisms of the light guide plate are provided to face the side opposite to the light source, the light reflected from the side surface reflection portion is reflected from the prisms of the light guide plate toward the lower surface side thereof. Therefore, the surface emission can be performed from the whole light guide plate, and this surface-emitted light is radiated to the lower surface side of the light guide plate. Thus, the whole display member disposed in the lower surface side of the light guide plate can be illuminated approximately equally.

In the embodiment shown in FIGS. 46–76, the line-shaped prisms (prism 130, 134; first prism 138, 175; second prism 140, 77) are provided to be approximately in parallel with a line connecting the light source (light emitting element 23; first light emitting element 47, 153; second light emitting element 48, 154) and a portion of the side surface of the light guide plate (24) which faces the light source; and the reflection surfaces (30a, 34a, 38a, 40a, 75a, 77a) of the line-shaped prisms are provided to face one side; and a side surface reflection portion (side surface reflection portion 131, 135, 155; first side surface reflection portion 39, 176; second side surface reflection portion 141, 78) for reflecting light which is guided in the light guide plate and reaches an end surface of the light guide plate toward inside of the light guide plate is provided on the side surface of the light guide plate located in a side of the reflection surfaces of the prisms.

According to the embodiment, when the light which is guided in the surface direction in the light guide plate reaches the end surface of the light guide plate, this light is reflected from the side surface reflection portion toward the inside of the light guide plate. This reflected light is reflected from the reflection surfaces of each prism toward the lower surface side of the light guide plate. Therefore, the surface emission is performed from the light guide plate, and this surface-emitted light is radiated to the lower surface side the light guide plate. Thus, the whole display member disposed in the lower surface side of the light guide plate can be illuminated approximately equally. When the light which enters the light guide plate from the light source is guided in the surface direction of the light guide plate, the light is hardly reflected from the reflection surfaces of the prisms toward the lower surface side the light guide plate. Accordingly, the bright line spectrums are not generated, and display member can be clearly recognized without being affected by the bright line spectrums.

In the embodiment shown in FIGS. 52–54 and FIGS. 70–76, the light guide plate (24) comprises: a first illuminating region (136, 73) comprising a first prism (138, 175) provided with a reflection surface (35a, 75a) which faces one side, and a first side surface reflection portion (39, 176) provided on the surface side of the light guide plate located in a side of the reflection surface of the first prism; and the second illuminating region (137, 74) comprising a second prism (140, 77) provided with a reflection surface (44a, 77a) which faces an opposite side of the reflection surface of the first prism, and a second side surface reflection portion (141, 78) provided on the surface side of the light guide plate located in a side of the reflection surface of the second prism.

According to the embodiment, when the light enters the light guide plate from the light source and guided in the surface direction in the light guide plate, the light is hardly reflected from each reflection surface of the first and second prisms toward the lower surface side of the light guide plate, and is directly guided in the surface direction. When this guided light is reflected from the first and second side surface reflection portions provided on the side surface of the light guide plate toward the inside of the light guide plate, the light reflected from the first side surface reflection portion is reflected from the reflection surfaces of the first prisms toward the lower surface side of the light guide plate and the light reflected from the second side surface reflection portion is reflected from the reflection surfaces of the second prisms toward the lower surface side of the light guide plate. Therefore, the surface emission is performed in each of the first and second illuminating regions, and the light from the light source can be radiated to the lower surface side of the light guide plate efficiently. Thus, the whole display member disposed in the lower surface side of the light guide can be illuminated equally and brightly.

In the embodiment shown in FIGS. 60–64, the light source comprises a first light emitting element (47) disposed to face a predetermined position of an outer peripheral portion of the light guide plate (24) and a second light emitting element (48) disposed to face a predetermined position of the outer peripheral portion of the light guide plate located on a diagonal line from the first light emitting element, and the first and the second light emitting elements emit light with a color different to each other.

According to the embodiment, when making the first light emitting element emit light, the lower surface side of the light guide plate can be illuminated with a specific color. When making the second light emitting element emit light, the lower surface side of the light guide plate can be illuminated with a color different from that of the first light emitting element. Moreover, when both of the first and second light emitting elements are made to emit light at the same time, the lower surface side of the light guide plate can be illuminated with a mixed color of both of them. Accordingly, the wristwatch which is excellent in color and fanciness can be obtained.

In the embodiment shown in FIGS. 60–64, the light guide plate (24) comprises a first illuminating region (145) for radiating light from the first light emitting element (47) toward the lower surface side of the light guide plate, and a second illuminating region (146) for radiating light from the second light emitting element (48) toward the lower surface side of the light guide plate.

According to the embodiment, when making the first light emitting element emit light, the light with a specific color is radiated toward the lower surface side of the light guide plate in the first illuminating region, so that the lower surface side of the light guide plate can be illuminated with the light with a specific color. When making the second light emitting element emit light, light with a color different from that of the first light emitting element is radiated toward the lower surface side of the light guide plate in the second illuminating region, so that the lower surface side of the light guide plate can be illuminated with the light with a color different from that of the first light emitting element. Specifically, when the both of the first and second light emitting elements are made to emit light at the same time, the lower surface side of the light guide plate can be illuminated in each of the first and second illuminating regions with a color different to each other. Accordingly, the wristwatch which is excellent in color and fanciness can be obtained.

In the embodiment shown in FIGS. 65–67, the light source comprises a first light emitting element (50) disposed at a predetermined position of an outer peripheral portion of the light guide plate (24), and a second light emitting element (51) disposed at a predetermined position of the outer peripheral portion of the light guide plate located on a diagonal line from the first light emitting element; and one of the first and the second light emitting elements emits light in a visible ray region and the other emits light in a ultraviolet ray region, and a portion of the display member (hour numerals 56a on dial 56 and hands 15) comprises a light emitting portion (59) for emitting light in a visible ray region in response to light in a ultraviolet ray region.

According to the embodiment, when making one of the first and the second light emitting elements, for example, the first light emitting element (153) emit light, the first light emitting element emits light in the visible ray region which is perceptible to human vision. The lower surface side of the light guide plate can be illuminated with this light in the visible ray region, so that the display member can be recognized. When making the other of the first and the second light emitting elements, for example, the second light emitting element (154) emit light, the second light emitting element emits light in the UV-ray region which is not perceptible to human vision. When this light in the UV-ray region is radiated to the display member, the light emitting portion of the display member responds to the light in the UV-ray region to emit light in the visible ray region. Thus, the display member can be recognized with the light in the visible ray region emitted from the light emitting portion. Accordingly, the wristwatch which is excellent in fanciness can be obtained.

In the embodiment shown in FIGS. 39–64, the display member comprises a dial (13) above which a hand (15) moves and/or a flat display element (liquid crystal display element 10) for displaying information electrooptically.

According to the embodiment, the light from the light source is guided in the light guide plate to perform the surface emission, and this surface-emitted light is radiated toward the lower surface side of the light guide plate approximately equally. Thus, when the display member comprises a dial and/or a flat display element, the whole display member can be excellently illuminated from the upper surface side by the surface emission from the light guide plate.

In the embodiment shown in FIGS. 55–59, the light guide plate (24) has a through hole (142, 144) through which a hand shaft (12) of the hand (15) which moves above the dial (13) is inserted, and a peripheral surface of the through hole is formed in a tapered shape.

According to the embodiment, when the light from the light source is guided in the surface direction in the light guide plate and reaches the peripheral surface of the through hole, this light can be reflected in a upper-and-lower directions of the light guide plate because the peripheral surface of the through hole is formed in the tapered shape. Therefore, it can be prevented that the bright line spectrums are generated. That is, if the through hole is formed in a cylindrical shape, the light which enters the light guide plate from the light emitting element and is guided in the light guide plate is reflected in a direction perpendicular to the traveling direction of the light, and this reflected light runs straight in the light guide plate in a state perpendicular to the prisms. Thus, the bright line spectrums shown in FIG. 58 are generated. However, in the present invention, the reflected light is reflected to the upper and lower surface sides of the light guide plate, so that the bright line spectrums are not generated.

Figure 69:
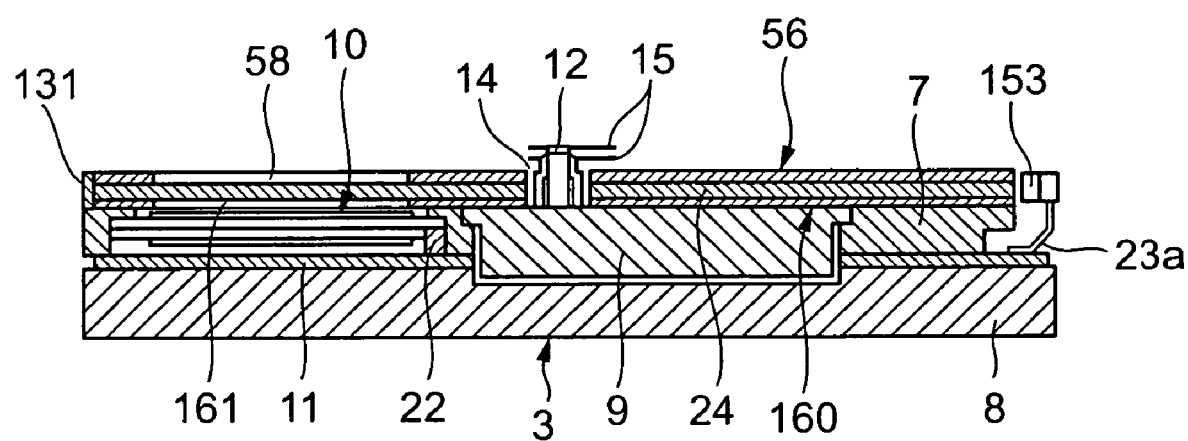
FIG. 69 is an expanded sectional view of a watch module taken along the line XXIX—XXIX in FIG. 68.

In the embodiment shown in FIGS. 68–69, the display member (dial 56) has a light transmission property, and a solar panel (160) is disposed in a lower surface side of the display member.

According to the embodiment, since the display member has a light transmission property, the display member can be disposed on the upper or lower surface of the light guide plate. Therefore, since the external light passes through the light guide plate and the display portion from the upper surface side toward he lower surface side in the bright place, the external light can be radiated to the solar panel. Thus, electric power can be generated by the solar panel efficiently.

When the light from the light source is guided to the light guide plate to illuminate the lower surface side of the light guide plate, if the display member is disposed in the lower surface side of the light guide plate, the display member can be illuminated from the upper surface side. Also, if the display member is disposed in the upper surface side of the light guide plate, the light radiated from the light guide plate is reflected from the solar panel and the reflected light passes through the light guide plate. Thus, the display members can be illuminated from the lower surface side.

In the embodiment shown in FIGS. 65–73, the display member comprises a first display member (dial 56, first liquid crystal display element 165) having a light transmission property and a second display member (liquid crystal display element 10, second liquid crystal display element 166) having a light reflection property, and the light guide plate (24) is disposed between the first and the second display members.

According to the embodiment, when the light from the light source is guided in the light guide plate to be radiated to the second display member, this radiated light is reflected from the second display member which has a light transmission property. This reflected light passes through the light guide plate from the lower surface side toward the upper surface side, and the light which passes through the light guide plate illuminates the first display member having a light transmission property. Thus, the first display member can be recognized, and information displayed on the second display member through the first display member and the light guide plate can be recognized. Accordingly, information displayed on both of the first and second display members can be recognized.

In the embodiment shown in FIGS. 70–73, the display member comprises a first display member (first liquid crystal display element 165) of a light transmission type for electrooptically displaying information and a second display member (second liquid crystal display element 166) of a reflection type for electrooptically displaying information.

According to the embodiment, when the light from the light source is guided in the light guide plate and is radiated to the second display element, the light is reflected from the reflection type second display element. This reflected light passes through the light guide plate from the lower surface side toward the upper surface side to be radiated to the transmission type first display element from the lower surface side. Thus information displayed on the first display element can be recognized and information displayed on the second display member through the first display member and the light guide plate can be recognized. Accordingly, information displayed on both of the first and second display members can be recognized.

In the embodiment shown in FIGS. 39–76, an electronic apparatus comprising the illumination device (6) as claimed in claim 18-and a device case (case 1, 180) for storing the illumination device, wherein the device case is provided with a window portion (2, 181) corresponding to the display portion (13, 56, 15, 10, 165, 166) of the illumination device.

According to the embodiment, since the lower surface side of the light guide plate can be illuminated by the illumination device, the display member disposed in the lower surface side of the light guide plate can be excellently illuminated. Moreover, the display member can be recognized through the window portion of the light guide plate and the device case from outside of the device case.

The invention claimed is:
1. An illumination device comprising:
a light source to radiate light;
a light guide plate to receive the light radiated from the light source through a side surface of the light guide plate and to guide the received light in a surface direction of an upper surface and a lower surface of the light guide plate to perform a surface emission;
a hand member disposed at an upper surface side of the light guide plate; and
a liquid crystal display member at a lower surface side of the light guide plate;
wherein the light guide plate comprises:
an upper illuminating portion to guide the received light from the light source in the surface direction and to radiate the light toward the upper surface side of the light guide plate;
a lower illuminating portion to guide the received light from the light source in the surface direction and to radiate the light toward the lower surface side of the light guide plate, wherein the lower illuminating portion comprises a plurality of line-shaped prisms having reflection surfaces on the upper surface of the light guide plate, wherein each of the reflection surfaces of the line-shaped prisms is configured to reflect the light guided in the light guide plate toward the lower surface side of the light guide plate, and wherein each of the line-shaped prisms is provided to be approximately in parallel with a line connecting the light source and a portion of a side surface of the light guide plate which faces the light source; and
a side surface reflection portion provided on a side surface of the light guide plate adjacent to the lower illuminating portion, to reflect light which is transmitted straight through the lower illuminating portion and reaches the side surface of the light guide plate toward an inside of the lower illuminating portion;
wherein the upper illuminating portion comprises a fine concavo-convex portion formed on the lower surface of the light guide plate, and the concavo-convex portion diffusely reflects the light guided in the light guide plate toward the hand member disposed at the upper surface side of the light guide plate.

2. The illumination device as claimed in claim 1, further comprising a reflection plate disposed on a lower surface of the upper illuminating portion.

3. The illumination device as claimed in claim 1, wherein the lower illuminating portion comprises:
a first illuminating region comprising a first prism provided to be approximately in parallel with the line connecting the light source the portion of the side surface of the light guide plate which faces the light source, and
a second illuminating region comprising a second prism provided to be approximately in parallel with the line connecting the light source and the portion of the side surface of the light guide plate which faces the light source; and
wherein the side surface reflecting portion comprises:
a first side surface reflection region for reflecting light which is transmitted straight through the lower illuminating portion and reaches the surface of the light guide plate, toward inside of the lower illuminating portion; and
a second side surface reflection region for reflecting light which is transmitted straight through the lower illuminating portion and reaches the side surface of the light guide plate, toward inside of the lower illuminating portion.

4. The illumination device as claimed in claim 1, wherein the light source comprises a first light emitting element disposed at a predetermined position of an outer peripheral portion of the light guide plate located adjacent to the upper illuminating portion, and a second light emitting element disposed at a predetermined position of the outer peripheral portion of the light guide plate located adjacent to the lower illuminating portion, and the first and the second light emitting elements emit light with respective different colors.

5. The illumination device as claimed in claim 1, wherein the lower illuminating portion comprises a first illuminating region for radiating light from the first light emitting element toward the lower surface side of the light guide plate, and a second illuminating region for radiating light from the second light emitting element toward the lower surface side of the light guide plate.

6. The illumination device as claimed in claim 1, wherein the light source comprises a first light emitting element disposed at a predetermined position of an outer peripheral portion of the light guide plate located adjacent to the upper illuminating portion, and a second light emitting element disposed at a predetermined position of the outer peripheral portion of the light guide plate located adjacent to the lower illuminating portion;

wherein one of the first and the second light emitting elements emits light in a visible ray region, and the other emits light in an ultraviolet ray region; and wherein the hand member comprises a light emitting portion for emitting light in a visible ray region in response to light in an ultraviolet ray region.

7. The illumination device as claimed in claim 1, wherein the hand member moves above a dial having a light transmission property.

8. The illumination device as claimed in claim 7, further comprising a solar panel which is disposed on the lower surface of the light guide plate and has an opening portion corresponding to the liquid crystal display member.

9. An electronic apparatus comprising the illumination device as claimed in claim 1 and a device case for storing the illumination device, wherein the device case includes a window portion to expose the hand member of the illumination device.

* * * * *